US006826566B2

(12) United States Patent
Lewak et al.

(10) Patent No.: US 6,826,566 B2
(45) Date of Patent: Nov. 30, 2004

(54) IDENTIFIER VOCABULARY DATA ACCESS METHOD AND SYSTEM

(75) Inventors: Jerzy Lewak, Del Mar, CA (US); Miles Kevin Yano, Yorba Linda, CA (US)

(73) Assignee: Speedtrack, Inc., Solana Beach, CA (US)

( * ) Notice: Subject to any disclaimer, the term of this patent is extended or adjusted under 35 U.S.C. 154(b) by 0 days.

(21) Appl. No.: 10/345,093

(22) Filed: Jan. 14, 2003

(65) Prior Publication Data

US 2003/0195873 A1 Oct. 16, 2003

Related U.S. Application Data

(60) Provisional application No. 60/348,616, filed on Jan. 14, 2002.

(51) Int. Cl.[7] ............................................. G06F 17/30
(52) U.S. Cl. ............................. 707/4; 707/5; 707/101; 345/762; 345/853; 345/968
(58) Field of Search ............................. 707/3, 4, 5, 6, 707/100, 101, 102; 345/968, 762, 853

(56) References Cited

U.S. PATENT DOCUMENTS

| | | | | |
|---|---|---|---|---|
| 5,175,814 A | * | 12/1992 | Anick et al. ................. | 345/835 |
| 5,428,737 A | * | 6/1995 | Li et al. ........................ | 707/4 |
| 5,428,776 A | * | 6/1995 | Rothfield ...................... | 707/4 |
| 5,544,360 A | * | 8/1996 | Lewak et al. ................. | 707/1 |
| 5,701,456 A | * | 12/1997 | Jacopi et al. ................. | 707/4 |
| 5,721,900 A | * | 2/1998 | Banning et al. .............. | 707/4 |
| 5,933,145 A | | 8/1999 | Meek .......................... | 345/348 |
| 5,950,190 A | | 9/1999 | Yeager et al. ................. | 707/3 |
| 5,966,126 A | * | 10/1999 | Szabo .......................... | 345/762 |
| 6,003,034 A | * | 12/1999 | Tuli ............................. | 707/101 |
| 6,012,055 A | * | 1/2000 | Campbell et al. ............. | 707/5 |
| 6,439,783 B1 | * | 8/2002 | Antoshenkov ................. | 707/3 |
| 2002/0129012 A1 | * | 9/2002 | Green .......................... | 707/3 |

OTHER PUBLICATIONS

Anick et al., "A Direct Manipulation Interface for Boolean Information Retrieval via Natural Language", Proceeding of the 13th annual International ACM SIGIR conference on Research and Development in Information Retrieval, 1989, pp. 135–150.*

Anick et al., "Adapting a full–text Information Retrieval System to the Computer Troubleshooting Domain", Proceeding of the 17 annual International ACM SIGIR conference on Research and Development in Information Retrieval, 1994, pp. 349–358.*

* cited by examiner

Primary Examiner—Srirama Channavajjala
Assistant Examiner—Khanh Pham
(74) Attorney, Agent, or Firm—Jaquez & Associates; Martin J. Jaquez; William C. Boling

(57) ABSTRACT

A method of organizing, managing, and providing interactive access to data in a database is disclosed, along with a program and a system for implementing the method. Associations between each data Item and at least one ItemSelector are established and stored. A predefined (but modifiable) Vocabulary of ItemSelectors sufficient to describe each Item of the database is created. Presently selected Items are described by a combination of associations defined by an appropriate Boolean combination of each ItemSelector in a presently selected set of ItemSelectors. A user controls the presently selected set by adding an ItemSelector from a presented group, or by removing a previously selected ItemSelector. The system ideally makes available to the user all relevant ItemSelectors—those which, if added to the presently selected set, would result in a set that describes at least one extant data Item. The system ideally makes all presently selected Items available to the user.

48 Claims, 4 Drawing Sheets

IDENTIFIER VOCABULARY DATA ACCESS METHOD AND SYSTEM

CROSS REFERENCE TO RELATED APPLICATIONS

This application claims priority under 35 USC 119 to U.S. Provisional Application No. 60/348,616 filed Jan. 14, 2002 and entitled "New Database Design Using Language Based Category Identifiers and Their Association with Data," the contents of which are hereby incorporated in their entirety by reference.

FIELD OF THE INVENTION

This invention relates to the field of computers, more particularly to computer information storage and retrieval, and particularly to information organizational structures such as databases.

BACKGROUND

Data access is becoming increasingly important, as the extent of information sources that are available to computers increases with the exponential growth of networks, such as the Internet. Unfortunately, current database designs are inflexible and impose severe demands on user and computing power effort during unplanned queries.

Inflexibilities and high processing demands result from the current structure of known databases. Such structures generally seek to achieve quick access to records within the database by calculating the precise location of the record within the whole database. Inconvenient structural limitations are often imposed to facilitate this common database goal. For example, each record may be required to be the same size. This limitation may be avoided by using pointers, but a pointer structure requires user foresight and decisions at the outset, if database restructuring is to be avoided.

A fixed record size requirement only assures quick access when the record number is known. To have quick access when searching on field values, indexing needs to be performed linking those values with the record ID. In a typical database many index tables are needed. Maintenance of such tables requires an update of all of them whenever anything requires a change in the record identifiers—which in practice happens too often.

Numerous legacy databases need to be integrated with newer database systems. Normally this is done by converting them all to a single, modern relational database. This is an extremely difficult and time-consuming task under present systems, requiring a great deal of work to reconcile the different legacy structures into one new structure. Such integrations often incur extremely large costs, taking a very long time, disrupt business, and yet produce only partly satisfactory outcomes.

Accordingly, there is a need for a method and system that facilitates queries for data from data sources. Because of the wide range of different organizational structures for the data sources that are available to many computers, it is desirable that improved data access be capable of operation across a range of computing platforms and organizational structures.

SUMMARY

In response to the needs identified above, a new approach is described herein that is based on a universal data structure, and is developed and applied to structured databases. Some foundations for this approach may be found in U.S. Pat. No. 5,544,360, (Lewak et al.). Using a generalized Vocabulary of Identifiers (called ItemSelectors) of each data fragment (called Items), this approach will be referred to as software Technology for Information Engineering™ or TIE, and is applicable to most or all information systems. TIE databases eliminate inflexibilities associated with current databases, and reduce processing demands. They allow virtually any number, and any organization, of fields for each record. Moreover, they significantly enhance the effective speed of query responses.

TIE databases typically provide an intuitive Guided Information Access (GIA) interface to the user that is based upon Vocabulary terms. As the user selects presented Vocabulary terms, the portion of the Vocabulary that is presented thereafter may be constrained, dynamically and in real time, by such previous selection, such that only ItemSelectors that will yield viable (non-null) results remain available to be selected. Such dynamic constraints are difficult or impossible to achieve in known technologies.

Associations resulting from choosing ItemSelectors are immediately apparent to the user, are easy to implement and edit, and facilitate search queries. Associations between the Identifiers and the individual data Items (which may be, for example, Records or Linked Records) are organized in a binary matrix that facilitates quick access. With such organization, substantial change in the relationship between fields (or Items), even disruptive changes, typically require a change of data within just one universal data structure, generally implemented in TIE systems as a Universal Matrix Structure (UMS).

The Items in a TIE database may be referenced through a path, URL, or any other suitable identifier. The references themselves may be hidden to avoid confusion. The actual data may be located anywhere that can be accessed by a computing system employing TIE, sometimes even across a Wide Area Network such as the Internet. Such flexible referencing techniques, particularly in combination with a universal structure described further below, facilitates an easy, non-invasive integration of disparate legacy databases. The TIE system permits conversion of legacy databases into a new database structure in an intuitive manner that need not disrupt the legacy system, which can continue to be used in parallel.

DETAILED DESCRIPTION

Introduction

Figure 1:
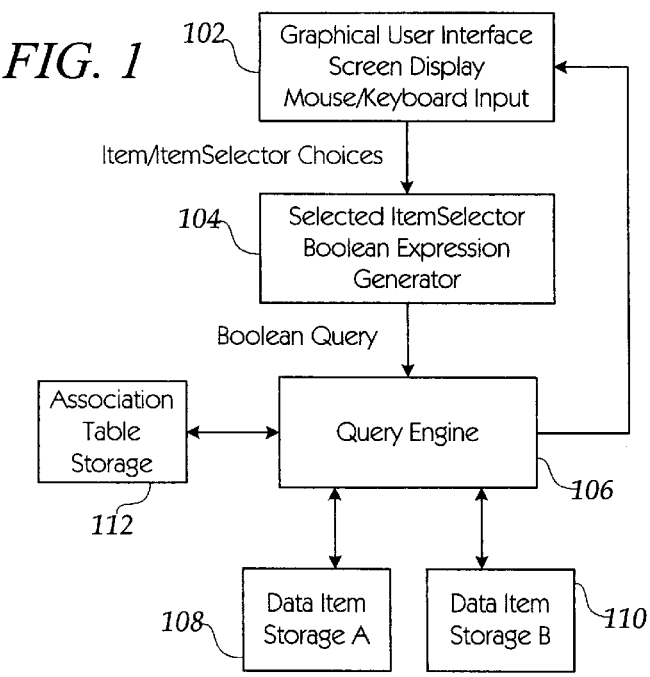
FIG. 1 is a block diagram showing typical information flow in a TIE system.

Extremely flexible databases can be achieved by employing a universal matrix structure ("UMS"). For background on such structures, see U.S. Pat. No. 5,544,360 (Lewak et al.) ("the '360 patent").

In TIE (Technology for Information Engineering™) system databases described herein, each element of information is called an Item, and each Item has its own unique identifier (typically an ID number). Each Item may be described using a set of one or more descriptors (ItemSelectors), each of which represents an attribute of the Item. Some combination of meaningful ItemSelectors (which may be key words, phrases, or other descriptors, each uniquely identified within the system), will suffice to distinguish a particular Item within the constellation of Items available in a database. Such meaningful descriptive key words or phrases may therefore be used to select an Item. The meaningful descriptive key words or phrases will be referred to as "ItemSelectors." (Note that in the Provisional Application upon which this application is based, these key words or phrases were referred to as "Categories." The terminology is substantially arbitrary, and, though different, is internally consistent within each document.) As with any search, a set of ItemSelectors will typically describe a first set of Items consistent therewith. One or more additional ItemSelectors may be needed to uniquely describe a single Item from the first set of Items. Conversely, Items may be described as belonging to, or associated with, one or more ItemSelectors.

Because as many ItemSelectors as needed may be associated with each Item, relationships between Items may be as complicated as will be helpful. In a TIE database, associations between records, and between fields within such records, need not be restricted to a fixed hierarchy such as is imposed by known legacy databases, but may have much greater flexibility due to association via a virtually unlimited number of ItemSelectors. The relationships between Items may thus mimic those that naturally form in the mind of the user, through associations conveyed by meanings of the name given to each ItemSelector associated with such Items.

One TIE database described herein uses a single universal table, referred to as a Matrix because of its theoretical (and, in some implementations, physical) structure. This Matrix may be maintained in readily accessible memory for quick access. A two-matrix alternative TIE database approach is also described, which may permit increased response speed under some circumstances.

The Matrix holds all associations between Items and ItemSelectors. Changes in the ItemSelectors, or in the relationships between the ItemSelectors and information Items, require the update of just this one universal matrix and so are relatively easy and quick to achieve. Each TIE database is characterized by a Vocabulary of ItemSelectors that are sufficient to describe each information Item in the database. The Vocabulary is typically structured into Groups of ItemSelectors, and sometimes into Subgroups.

The use of ItemSelectors as Language-Based Identifiers (or descriptors) of each field and record, along with an appropriate software implementation, reduces processing demands while making the database organization extremely flexible. A TIE database may contain any number of Items, and may effectively permit a user to select virtually any organization of "fields" for each "record." Moreover, query responses may be almost instantaneous. A TIE database typically employs a GUI that allows users to both view and interrogate the data intuitively, by selection ("point and click") of descriptors (ItemSelectors) that are presented. The Associations resulting from the use of such descriptors are immediately apparent to the user, and yet permit the software underlying the organization to be simple and fast.

Many other advantages result from the TIE approach. In particular, it is easy to combine legacy databases across any number of platforms and any number of different data types, into one uniform, intuitive interface, without the need to disturb the current legacy databases. The only decisions that need to be made when merging databases involve the Vocabulary of ItemSelectors and their properties. Such decisions are orders of magnitude easier than the complicated structure decisions required when current databases, each with its own structure or data model, must be merged into a single new structure or data model.

A TIE user interface is preferably uniform, and typically may be customized. The user interface generally allows users to actually view portions or representations of the available data, by displaying the structured Vocabulary (of ItemSelectors, which are descriptors/identifiers) for such data, even before initiating any actual search. Thus, the interface permits users to search through the data interactively, generally by adding or removing an ItemSelector (descriptor or identifier) to a present search query. After each such modification of a search query, the TIE interface may incrementally adjust both the data Items that are available in view of the modified query, and also adjust the further ItemSelectors (descriptors) that are available to further narrow the query. Such incremental adjustment may indicate to the user the new scope of available data, without a need to actually retrieve the data specified by the search query. By thus incrementally indicating the scope of data specified to the current point, a TIE interface may guide a user through to the completion of each search. Moreover, the interface may prevent the user from selecting combinations of descriptors (ItemSelectors) that lead to a null set of data Items, by presenting to the user only that subset of the ItemSelector Vocabulary which, when added to the present query, will still identify at least one data Item. Consequently, no actual search need ever encounter zero hits, because an absence of data may be seen before the search is even performed, which eliminates the frustration and wasted time of "dead end" searches.

Integration of existing databases using TIE requires only a relatively easy choice of an ItemSelector Vocabulary. A user may define the ItemSelectors (and their properties) that are associated with data Items, thereby establishing ItemSelector relationships to data Items as the data is entered. To integrate two different TIE databases, the user may choose a starting Vocabulary (of ItemSelectors) that is simply the union of the individual Vocabularies for each database, accounting for synonyms. Such a selection of Vocabulary requires virtually no decisions at all. However, a more optimized Vocabulary is recommended, and can readily be developed, which could reduce the number of ItemSelectors in the Vocabulary. All of the associations between Items and ItemSelectors are established by the final, united Vocabulary.

FIG. 1 is a block diagram illustrating information flow in a typical TIE system. Interaction with the user takes place at a graphical user interface 102, with the user choosing ItemSelectors from those offered by the system to describe information that is sought. The selections of ItemSelectors and/or Items entered by the user are passed on to a Boolean expression generator 104, where a Boolean search expression is created from the entered information. This important step is described subsequently in much more detail. The Boolean search expression may be passed to a query engine 106 (which may, of course, be part of the same computing hardware as item 104). The query engine may access data Item information from any number of different locations, represented here by just two: Storage A 108 and Storage B 110. The query engine accesses relationship data, such as association tables in storage 112, which information may be organized in a TIE system as a Universal Matrix System.

Definitions and Usage

Database users have evolved a language specific to database tasks. In order to describe the TIE system, it is necessary to extend this language. The following is a glossary of terms relevant to TIE systems. Some definitions explain methods used within TIE, and thus provide a description of some TIE procedures.

Some of these definitions relate to current, structured databases, while others to the TIE database and to unstructured databases.

Item: Information Items are the elementary data objects stored in a database. Users may choose to define Items in different ways, according to their previous experience and needs. Thus, the user of a particular TIE database may treat a traditional "Field" as an Item, or may treat a collection of Field Components (i.e., Subfields), or Records, or any other identifiable data entity, as an Item by simply providing the appropriate ItemSelectors (descriptors) related to such data entity, thereby permitting it to be accessed by the system. In general, Items may constitute any type of data, such as Text, Graphics, Sound Recordings, Movies, and so on. Users may define, and then later redefine, what data entities constitute an Item. Thus, when converting an existing database to the TIE system it may be convenient to first define a record or a row of the existing database as an Item, and then to change the initial definition upon determining a more convenient linking of records, to form more appropriate or useful Items. Quite often Items are concurrently defined in a plurality of different ways, which is to say that what constitutes an Item may be easily changed. Such flexibility flows naturally from the TIE system.

Derived Item: These are special Items that are not contained within the database, but are derived from the information contained within the database. For example, in a Police Department's Overtime Database, records of work hours and pay are kept for each individual and each occasion. When converting from a traditional structured database, it may be convenient to derive new fields having totals of both the pay and the hours, for each person, for each department subdivision, for each kind of activity etc. In the TIE database, such totals may be added as explicit new data Items, or may alternatively be made available indirectly as Derived Items by simply defining the treatment of explicit Items that will produce each Derived Item. For example, graphical plots and associated tables of total spending for each kind of activity and each department subdivision may be Derived Items that are produced as needed from underlying data Items, rather than being maintained within the database as explicit Items (which, of course, require storage space). Such Derived Items may be defined when converting to a TIE system, or, more flexibly, may be created upon user request. Such Derived Items are accessed using the overall TIE database Vocabulary, which accordingly must be amended to include any terms needed to define the desired Derived Items.

Field: This term belongs to the terminology of previous databases, and is used somewhat loosely in the context of TIE databases. A Field is generally the smallest fragment of information having a separate meaning within a database, but different database organizations will generally have different Field definitions. "Address" records in one database, for example, may be defined to contain a field "street address" that includes a street number and street name, and such "street address" information would not be subdivided into further fields in such database. However, another database may define separate "Street Name" and "Street Number" fields within the "Address" record.

Subfileld: This term again is appropriate to previous databases, and is loosely used with respect to TIE databases. A Subfield is not a separate entity within a database, but refers to a portion of a Field. For example, if a Field "Address" contains both street name and number, then the street name and the street number may each be considered a subfield of the "Address" Field. While subfields are not formally maintained as separate information fragments within a database, it may be a simple matter to either enter such subfields separately, or to separate the information from a particular field into subfields. With a TIE database, the distinction between Subfields and Fields is rarely significant, as either may be defined by the user as an Item for direct access.

ItemSelector: A TIE ItemSelector is simply a descriptor, or identifier, of information. Words, phrases, letters and numbers may all be used to specify a particular ItemSelector. A single letter or number may be an ItemSelector, as may "Sick and Vacation Time." Like a name, an ItemSelector may be indicated by any unique (within a Group, see below) combination of symbols. Though the symbols are typically simple alphanumerics and spaces, they may be mathematical expressions, symbols associated with chemical expressions, or icons, or graphics or pictures of any sort. Also like a name, a particular ItemSelector may refer to a single entity (e.g., Frederic B. Remington, Exxon Corporation), or may encompass many entities (e.g., Fred, Corporation). Due to this broad usage within TIE systems, it is useful to further define many different kinds of ItemSelectors. A partial list follows:

AlphaSelector: individual letter or number values (a special case of SingularSelector, below). For example, "House Number Digit 1" and "House Number Digit 2" are names of ItemSelector Groups. The individual digits 0–9 are ItemSelectors that belong to such group, and are AlphaSelectors because they are single alphanumeric characters. Thus, when a user is searching and selects the AlphaSelector "3" from the Group "House Number Digit 1" and the AlphaSelector "4" from the Group "House Number Digit 2," the Vocabulary choices thereafter presented will typically be limited to the available AlphaSelectors for any as-yet unspecified position Group. If other information that has already been selected in a search process (e.g., the street name) narrows the possible range of "House Number Digit 1," then it is possible that only one or two such AlphaSelectors will then be available for selection by the user. On a short street, for example, all of the house numbers may begin with either 7 or 8, and thus only the AlphaSelectors "7" and "8" will be presented to the user as selectable Vocabulary choices (within the Group "House Number Digit 1") after such street name has been selected.

RangeSelector: (or ValueRangeSelector) a range of values sharing a common descriptor (which is the RangeSelector). For example, "180–185 lbs." is a RangeSelector that describes all weight values between 180 and 185 lbs.

ImpreciseSelector: a descriptor that is not precise, and thus conveys some potentially ambiguous scope of equivalents. Colors are good examples of this type of ItemSelector; for example, "Brown" is an ImpreciseSelector that generally encompasses light brown, dark brown, brunette, etc.

SingularSelector: Some ItemSelectors (descriptors) identify just a single value. For example, phone numbers may be split up into "area code" and "prefix" and "last four" "Area codes" can only take on certain values (specifically, between 200 and 999). Each value of an area code, such as "601" or "503" is a SingularSelector.

FieldSelector (Field ItemSelector): Terms used to describe Fields, such as Billing Address, Shipping Address, and Costs. A FieldSelector is an ItemSelector (and thus a descriptor) of a Group of ItemSelectors that have a logical association with each other. For example, an "Area Code" is a descriptor (ItemSelector) of an entity that is often considered a "Field." Because it describes a Field, "Area Code" is a FieldSelector.

SubfieldSelector This is a descriptor of a subfield. Last Name, First Name, Street Name, and Number may all be SubfieldSelectors for a Field such as "Mailing Address" that encompasses all of this information (or more).

GroupSelector: a descriptor or identifier (ItemSelector) of a Group of ItemSelectors that are, perhaps arbitrarily, included in such group; see Group, below.

WildSelector: is a class of ItemSelectors, specifically a descriptor of a data value that is position independent. It is most commonly used with AlphaSelectors, such as "LicensePlateCharacter." However, it can also be a descriptor of a DNA sequence of a number of amino acids, and within a gene it may be searched for irrespective of position.

PositionDependentSelector (PD ItemSelector) describes any class of ItemSelectors that happen to be position dependent, such as "LicensePlateCharacter1" or "Area Code" (which, of course, is the first three digits of a phone number.) Both Wild and PD AlphaSelectors are useful, for example, in a Police Department crime database that includes data on license plates. There, Wild AlphaSelectors may classify each license plate by all of its character components, independently of character position within the license plate sequence. In contrast, there may be a separate set of PD AlphaSelectors that apply to each character position within a license plate. When searching for a partially known license plate, selections of characters whose position is known may be made form PD AlphaSelectors, while Wild AlphaSelectors may be used for characters whose position is unknown.

Group: In practice, ItemSelectors are usually organized into logical Groups of ItemSelectors for easier access by a user. Upon user selection, Group membership defines the query Boolean that is used internally. ItemSelectors need only be unique within a Group; that is, a particular Group may contain an ItemSelector that has the same name as a different ItemSelector in a different Group. For example, a Group "Licensed Drivers" may contain an ItemSelector "Hair color," but it would not be the same as an identically-named ItemSelector "Hair color" in a Group "Registered Owners." Thus, membership in a, Group effectively distinguishes an ItemSelector from a same-named ItemSelector that is in another Group, or in no Group. This hierarchical structure within the organization of the Vocabulary will be familiar to most users of computers, due to its similarity to typical directory organization. Indeed, although most TIE databases need zero, one or two levels of such hierarchy within the Vocabulary, TIE system software generally may readily be extended to utilize any number of hierarchical levels as may suit the needs for a particular database Vocabulary. No hierarchy is typically required in the organization of associations between Items and ItemSelectors.

Vocabulary: This is simply the union of all ItemSelectors, and forms the entire scope of descriptors (ItemSelectors) that may be selected by a user to locate or describe each and every Item in a TIE database. The available Vocabulary is intuitively similar to words that may be used to describe a desired Item. A TIE Vocabulary is a limited set of descriptors (ItemSelectors) that is sufficient to describe all Items within a TIE database. During a search, a user initially may select any ItemSelector from the entire TIE database Vocabulary, and thereafter the TIE interface typically presents only that subset of the Vocabulary of ItemSelectors which, if any one is selected to make a further combination with those ItemSelectors already chosen, describes at least one data Item.

Boolean "Conjunctive" ItemSelectors are those that a TIE system treats as if they are invoked with a Boolean "AND" between such descriptors (ItemSelectors that have the Conjunctive attribute). Accordingly, Items so described must contain the attributes of all of the Conjunctive ItemSelectors chosen. A plurality of Conjunctive ItemSelectors may be assigned to an Item, so that they act in an overlapping fashion to identify the Item. For example, the ItemSelectors "Software," "Development," "Tools," "C++" may be overlapped or conjoined to describe a set of Items, and thus they may each be Conjunctive ItemSelectors.

Boolean "Disjunctive" ItemSelectors are those which, when selected by a user in the process of describing an Item, are treated by a TIE system as having an "OR" disjunction between them. ItemSelectors are often divided into several separate Disjunctive Groups. When a plurality of ItemSelectors is chosen from within a Disjunctive Group, they are combined with the "OR" disjunction between themselves. The resulting disjunctive combination of ItemSelectors from such Disjunctive Group, however, is "parenthesized" and combined, using the conjunctive "AND," with selected Conjunctive ItemSelectors and with any other parenthetical expressions of ItemSelectors, in accordance with Boolean logic rules (e.g., distribution of the "AND" operation that is external to a parenthetical expression over those ItemSelectors that are "OR'd" within such parenthetical expression).

ItemSelectors that would not normally be assigned in plurality to any Item (that is, would normally be assigned only one at a time) are good candidates for a Disjunctive Group. Consider a database of events that is catalogued according to the particular date and time at which they begin. Various date-related ItemSelector Groups (such as Year, Month, Day, and Day-of-Week ItemSelector Groups) are disjunctive because an event cannot begin at two different times or dates.

Boolean "Bijunctive" ItemSelectors are those that are used in both Conjunctive and Disjunctive contexts. For example, when considering or searching on towns in the US, the ItemSelector group "State" (in which each town is located) is a disjunctive ItemSelector because each town is located in only one state. However, when considering or searching on other geographical features (that overlap states), such as lakes, national parks, rivers, etc., the ItemSelector group "State" may need to be conjunctive. Thus, the same Group is sometimes conjunctive (e.g., when searching for rivers) and disjunctive (e.g., when searching for towns). One way to manage the bijunctive nature of such a Group is to start with disjunctive search rules, and then to automatically switch to conjunctive search rules when the user chooses any ItemSelector indicating Items that are described by more than one ItemSelector within the Group. Another way is to have two parallel Groups of ItemSelectors: "States for Towns" and "States for Lakes," in this example.

Boolean "Exclusive, Disjunctive" ("ED") ItemSelectors are treated by a TIE system as connected by a Boolean exclusive "OR" or "XOR" operator. Groups of ItemSelectors that share this property are very useful in minimizing the number of disjunctive ItemSelectors in a Boolean query when ranges of values are selected by the user. For example, in a database regarding persons, it is often useful to have an age Group of ItemSelectors in which each age is represented in years. A user searching for someone between 30 and 40 could select each of the Disjunctive ItemSelectors 30, 31, 32, . . . 40. However, each ValueSelector, such as "30," may be interpreted (particularly if more than one is chosen) to indicate an age of up to 30 years, that is, an age of 0 to 30 years old. If, moreover, the ItemSelectors in "Age" are all ED ItemSelectors, then simply selecting "30" and "40 " defines the range between these two (because that is the "XOR" of the defined ranges. Thus, "ED" properties may reduce the selection actions from eleven separate "clicks" to just two.

Negative ItemSelectors: Sometimes it is convenient to invoke a Boolean negative of certain ItemSelectors. For example, in a database of people where the race of each person is stored, it may be necessary to search for non-Europeans. If "European" is an ItemSelector, using its negation would serve the purpose. This could, of course, be implemented by adding an ItemSelector "Non-European" whose synonyms are all the non-European ItemSelectors, but may be more conveniently implemented by using a modifier key (such as the Control key) while clicking on the ItemSelector to indicate that an negative or inverse of the ItemSelector is being selected.

ItemSelector Group Properties: Each Group of ItemSelectors has a Boolean property that is associated with each ItemSelector in the Group. When a user selects an ItemSelector, a query Boolean is automatically created by the TIE software which then executes an Item search based on this Boolean query and evaluates the Item hits and the remaining Available ItemSelectors. In creating this Boolean query, the TIE software takes its cue from the Boolean property of the group to which the selected ItemSelector belongs. Exemplary Boolean properties are described below, but are best understood in the context of TIE system functions, which are set forth in a functional description that follows these definitions.

Conjunctive/Dislunctive/ED Decisions: The decision as to which ItemSelectors to treat as Conjunctive and which as Disjunctive is a matter of choice and meaning, based on the specific type of data and the types of searches required through the data. Guidance for handling these decisions in a TIE system is provided below.

A TIE system may assign the ED (Exclusive-Disjunctive) property to appropriate ItemSelectors, and may present them graphically to a user with instructions to select endpoints of a range. As one alternative, a TIE system may present (or permit to be entered) values for certain Groups of ItemSelectors, such as "Age." The system may then interpret a first selected ValueSelector as ED with the immediately succeeding ValueSelector in the Group (effectively treating it as identifying a unique ValueSelector), but, upon selection by the user of a second ValueSelector, treat the two as ED with each other.

A Bijunctive Group may be expanded into two separate groups,: one treated Conjunctively and one Disjunctively, each displayed so as to make the treatment clear. ItemSelectors that are never assigned together to the same Item are always Disjunctive, because if used Conjunctively, they would find zero Items.

ValueRangeSelectors, when users may need varying ranges, may be presented as Exclusive Disjunctive, so that any range can be selected by choosing the two boundary ranges. Below is a further example of an appropriate use of Exclusive Disjunctive (ED) properties with ValueRangeSelectors:

Suppose Items are described with the following ValueRangeSelectors:

$0–>$10   $10.01–>$20   $20.01–>$30

Such ItemSelectors could appropriately be designated as "Disjunctive," whereupon each range could be selected individually, or ranges could be combined to create broader ranges. Thus, if the range $0–$30 was desired, all three ItemSelectors could be chosen.

Now suppose instead, the same data was described by the following, alternative ItemSelectors:

$0–>$10   $0–>$20   $0–>$30 and these were all designated as ED ItemSelectors (for example, by attaching ED attribute to the entire Group of ItemSelectors). With this change, any contiguous range may be chosen by selecting one range, or by combining just two ItemSelectors. Combining the first and the last yields the range $10–>$30.

A better way to present such an Exclusive disjunctive Group would be:

$0   $10   $20   $30 with instructions that a user pick the two range boundaries.

ItemSelector Groups and Group Properties: When designing the GUI, the various types of ItemSelectors are usually logically grouped into ItemSelector Groups. It has not been found convenient to combine ItemSelectors having different Boolean properties within the same group. Therefore, ItemSelector groups are typically divided into (Boolean) Disjunctive, Conjunctive, Exclusive Disjunctive, and sometimes Negative types. It is convenient to refer to each group by name (i.e., the GroupSelector for such Group), and to describe attributes of each group by a property called Kind. "Kind" itself is a name (GroupSelector) for a Group of ItemSelectors that determines the rules by which ItemSelectors are assigned to Items.

Figure 2:
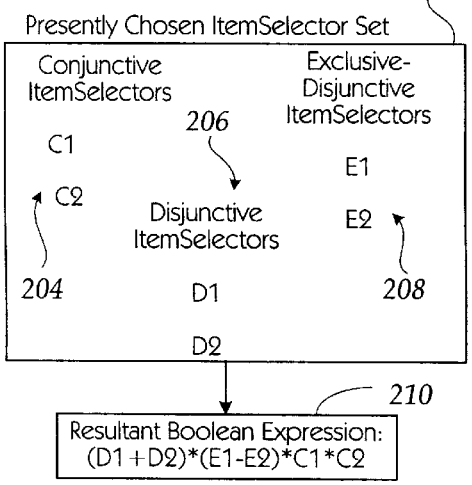
FIG. 2 illustrates derivation of a Boolean expression from ItemSelectors in groups.
Figure 3:
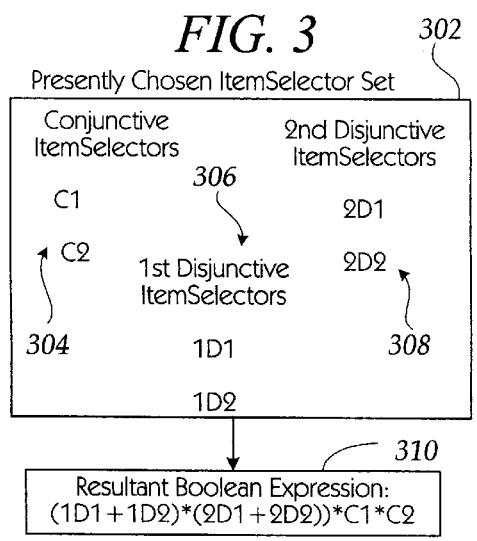
FIG. 3 illustrates Boolean derivation for ItemSelectors differing from those of FIG. 2.

FIGS. 2 and 3 illustrate rules that may be used for creating a Boolean expression from ItemSelectors chosen from different groups having different Boolean properties associated therewith. FIG. 2 indicates that a presently chosen set of ItemSelectors 202 includes a pair 204 of ItemSelectors C1 and C2 that are from a Conjunctive group (or are otherwise associated the conjunctive Boolean property. A pair 206 of Disjunctive ItemSelectors D1 and D2 are also in the chosen set, as are a pair 208 of ItemSelectors E1 and E2 that are associated with the Boolean Exclusive-Disjunctive property (at least as to each other). The fact that pairs of such items is merely for convenience; any number may be selected. The resulting Boolean Expression is created by first relating chosen ItemSelectors having the same Boolean property with respect to each other (such as D1 and D2, or E1 and E2) according to such Boolean property, within a parenthetical expression. In this case the result is parenthetical expressions (D1+D2) and (E1−E2), where "+" indicates "OR," "−" indicates "XOR," and "*" indicates "AND." The resulting parenthetical expressions are then conjunctively combined with each other, generally irrespective of the Boolean property associated with the ItemSelectors. Due to the nature of Boolean logic, it does not matter if C1 and C2 are originally parenthesized or not, because they in any event are eventually related to the rest of the overall Boolean search expression conjunctively.

FIG. 3 illustrates a slightly different situation that FIG. 2. The same Conjunctive pair C1 and C2 (304) is present, but also two different disjunctive pairs, 1st Disjunctive ItemSelectors 306 and 2nd Disjunctive ItemSelectors 308. These different pairs are presumably from different disjunctive groups; in any event, they are disjunctive only as to the other member of the pair (or larger group). Accordingly, the parenthetical expressions that result include (1D1+1D2), as well as (2D1+2D2). As in FIG. 2, the resulting parenthetical expressions are conjunctively associated with all other parts of the Boolean search expression, and again it is not necessary to actually put C1 and C2 within a parenthesis, because they will be related conjunctively with or without such parenthetical.

ItemSelectors may be assigned to Items in diverse, selectable ways. The desirable rules will generally be selected depending upon the nature of the data contained within the associated Items. For example, consider a Group of ItemSelectors broadly described by the term (GroupSelector) "Address." Subgroups of "Address" may be identified by the following ItemSelectors:

House Number; Street Name; Street Type; City; Zip; State

Exact Kind Groups. Consider the House Number. A list of all the house numbers in the database may be designated as the House Number group. An appropriate Kind designation for that group would be Exact, because the assignment of each ItemSelector from the list of house numbers would occur only if the ItemSelector matched exactly the data in the House Number field.

Alpha Wild Groups. Presenting a list of every possible house number for the user to choose from is usually too cumbersome. So an easy alternative, though very much less precise, is to list a single column of digits from 0 through 9, each of which is an ItemSelector, and is assigned to an Item whenever it is contained in any position of the house number. For example, if a house number was 3421, the Item containing this number would be assigned the four ItemSelectors 1, 2, 3 and 4. When the user chooses these four ItemSelectors from the available list (in any order), all numbers that contain these digits, in any order would be selected. In addition, any house number that contains other digits in addition to these, would also be selected. The Kind property of this group is referred Alpha Wild—that is, Alpha-Numeric and Wild. The Alpha Wild designation does not distinguish between purely numeric ItemSelectors and those including letters.

Although an ItemSelector from an Alpha Wild Selector group does not narrow down a search as much as those from an Exact group, ItemSelectors of this type useful in many applications, particularly when only partial information is known. In combination with other ItemSelectors, it is very effective at narrowing down possibilities when searching or browsing through data.

Digit Number Groups. ItemSelectors describing the number of digits in numbers, such as house numbers, can also form a useful ItemSelector group. In combination with an Alpha Wild group, for example an ItemSelector from such a group can considerably narrow down the possible matches. A group of number ItemSelectors that designates the number of Digits in a house number that is the target of a search would be described as being of Digit Number Kind.

Alpha Position Groups. One precise way of classifying a house number (or indeed any number, name or word) is to select ItemSelectors from an appropriate set of ItemSelectors of Alpha Position Kind. A "set" of such groups is needed, the complete set including one group for each digit position. Each group consists of all possible AlphaPosition ItemSelectors for its associated digit position, which for house numbers (for example) is generally limited to the numerals 0–9. An ItemSelector Group Set of this Kind is designated Alpha Position n, where n is the number of character positions, and therefore is also the number of Groups within the set.

Subfield Values Groups: The abstraction of a Subfield, such as for example the Last Name, is instantiated with a Subfield Value when the data is entered. So for example if the name Smith is entered into the Last Name Subfield, then Smith is the Value of that Subfield.

Subfield Value Types: The following broad three Value Types can be easily identified: Text, Numbers, and Dates. Other Value Types can be introduced as the need arises in specific applications. The words used to describe the Value Types can also be implemented as ItemSelectors. When choosing Subfield Value Selectors, each of these Value Types can be treated differently by the software. In some cases, the individual Values can be used as ItemSelectors. In other cases ranges of values can be defined as ItemSelectors.

Subfield Derived ItemSelectors: For example, when the database contains product sales information about a very large number of products, the individual sales prices could be used as ItemSelectors or alternatively price ranges, optionally defined by the user, can be used as ItemSelectors, or both these sets of ItemSelectors can be used.

The Price Range Selectors would be the derived ItemSelectors. Another, less obvious example is the day-of-week ItemSelector in a database where the entries are dates, because the day-of-week can be derived from the date. Yet another example: the first letter of the last name in a long list of names can be a (Disjunctive) ItemSelector to help narrow down the list of name ItemSelectors.

ItemSelector Synonyms: ItemSelector Synonyms are useful in many different contexts. The ItemSelector Synonym here is used with a broader meaning then the dictionary synonym. A synonym normally means a word with a similar meaning. ItemSelector Synonym includes that meaning but additionally includes any word whose meaning is narrower than, but contained within that of the ItemSelector.

So for example, if the original ItemSelector is Correspondence, then Email, Letter, Fax, and Voice Mail, could be that ItemSelector's Synonyms. When considering Subfield Value Selectors and using ItemSelector ranges, the values within a range are that range's synonyms.

ItemSelector Synonyms are not symmetrically related. So in the Correspondence ItemSelector example above, every Item that has the Email ItemSelector would also have assigned to it the ItemSelector Correspondence, but the converse could not be asserted: not every Correspondence is an Email.

Synonyms of ItemSelector Booleans: More generally the Synonym of an ItemSelector Boolean is the ItemSelector equivalent to a Boolean expression of other ItemSelectors. The example of Subfield Value Selectors, which represent ranges of values, can equivalently be considered as the Synonym of the disjunctive Boolean of all the detailed Value Selectors within the range.

Conventional & TIE DB Designs Compared: There are two levels of description of databases: the Logical Level and the Physical Level. At the Logical Level, a conventional Relational Database is described in terms of a logical Schema within a data definition language. The purpose of the Schema is to specify those properties (such as relationships, value types etc.) of a database that are permanently true, regardless of the particular data details or situation that applies at any particular time. The data dictionary is used to catalog the various data attributes and relations.

In contrast, the TIE system does not care how or where the data is stored because it is based entirely on data about data—usually called "Meta-Data"—not directly on the data itself. This allows total flexibility in the storage and the type of data stored. We will call this data about data the "Data BLOBS" because Meta-Data is already being used with a completely different meaning in the database context and its use here could cause misunderstanding. (BLOBS stands for Binary Linked and Organized Binary System.)

It is well known in other contexts (particularly in programming data structures) that it is much easier to track dynamic data when only references to the data are used. A very simple example of this is the use of pointers to data elements in databases when each data element can be stored anywhere, can be of any size and can be changed without in any way affecting the pointer.

All the data associations and descriptions are abstracted to the BLOBS. It is shown here that an appropriate logical optimal data structure of the BLOBS is a Binary Matrix. Its equivalent optimal physical data structure depends on the hardware and compiler implementations, but for current off-the-shelf hardware and compilers, an array of vectors (of varying dimensions) with integer (id) components is usually optimal.

Users of databases need to be able to see the data to help them form a question or search query. In forming the search query, they need to be guided to the available data only, to protect them from fruitless searches. To be useful to the average user, a database should not require the knowledge of complex query languages nor the knowledge and understanding of Boolean query expressions.

None of these requirements are met by current state-of-the-art databases. The TIE system however fulfils all these requirements and in addition makes the merging of disparate legacy databases relatively very easy.

We begin with a simple example, describing a possible conventional approach and the TIE approach, and then follow with a generalization, describing a common implementation. One of the properties of the TIE system is that a sufficiently general implementation will cover almost all the features needed in almost all implementations, with differences being confined to the GUI. Any small additional features that may become desirable can be easily added without affecting the main application.

The Conventional Approach: Consider a relational database containing customer and product information. In current databases, this would normally be handled with three types of records: one for the customer information another for the product information, and the third for the purchase orders, tied together through defined hierarchical relations. For example, the data of each product purchased by a customer will be linked to that customer's record, and a purchase order record.

Under current inflexible, structured databases, we have to decide what fields to assign to each record in the Customer database. As an example, we would naturally define a set of address fields for the Shipping Address, and another set of address fields for the Billing Address. Suppose now that the customer for some reason has two shipping addresses. (Perhaps one is for one type of product the other for other products.) We are now faced with the prospect of adding another set of address fields, but with no space originally allocated for them. Current databases would normally require us to add another address field to all customer records, even though only a very small fraction of the customers may need it. In addition if indexing is used, any tables we have created will all require updating when we do add such an extra field set.

Of course, with foresight at the outset, a possible need a different number of Address Fields for each customer would have been recognized, and this would have allowed creation of a table of addresses that would solve this particular problem of inflexibility. However, it is hard to determine at the outset which Fields will need a plurality of alternatives. The overhead of having each and every field be a table of fields is too great to make that approach practical.

Consider now how such a database could be organized and in particular how it could grow, using the TIE technology.

Descriptive Overview of TIE: The TIE deals with two classes of objects: Information Items (referred to simply as Items) and ItemSelectors (which are the individual descriptors within the TIE system vocabulary).

Figure 4:
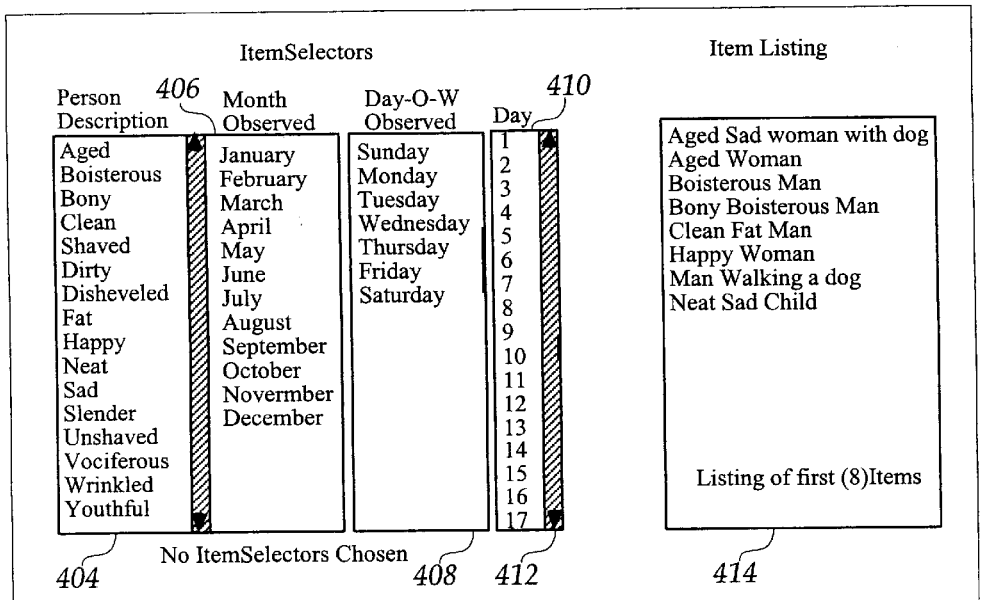
FIG. 4 represents an initial condition for an interactive GUI during a user search.
Figure 5:
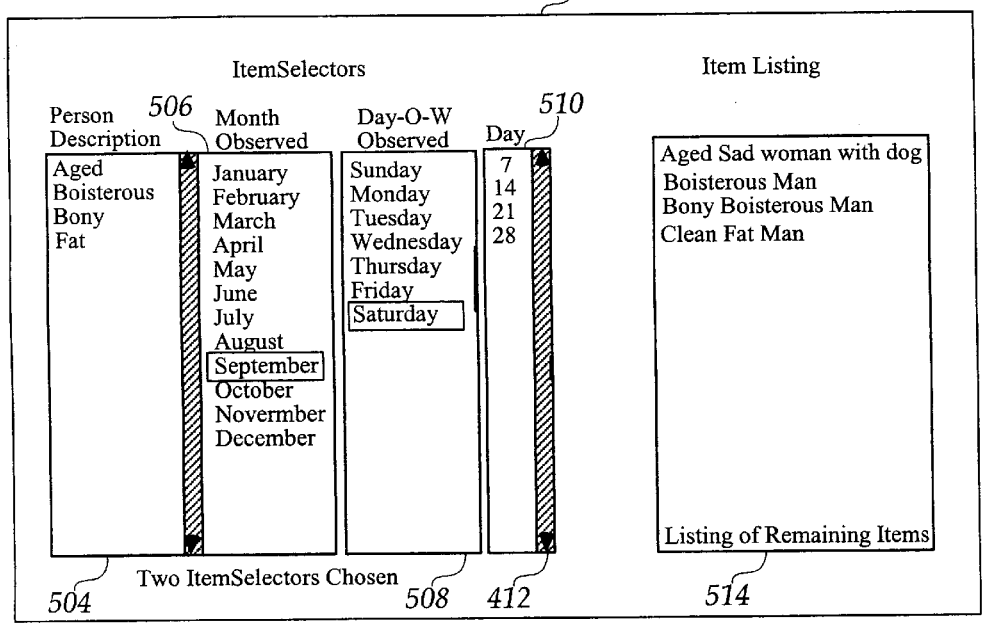
FIG. 5 represents a modified condition of the GUI during the user search of FIG. 4.
Figure 6:
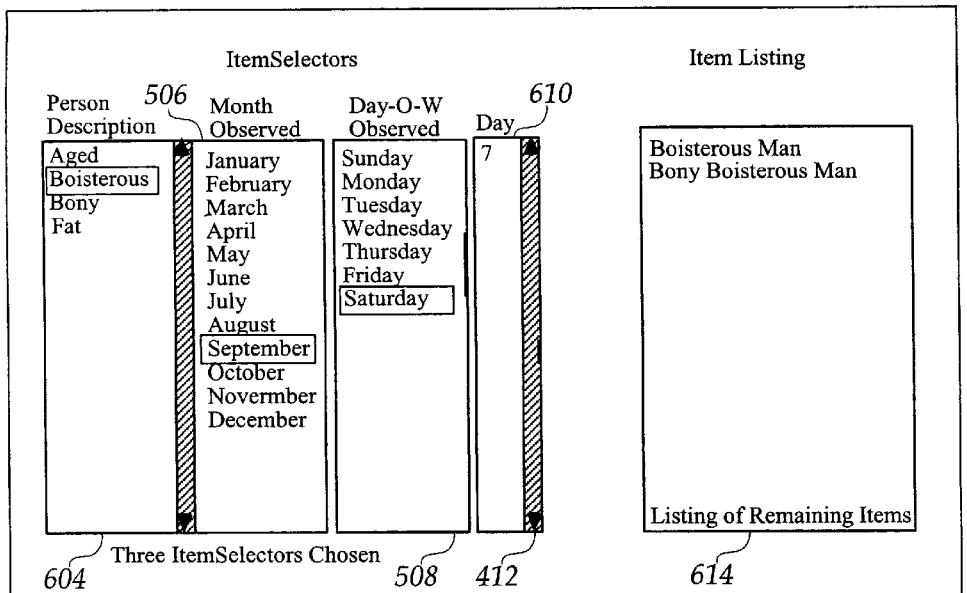
FIG. 6 represents a GUI as further modified during the user search of FIG. 4.

In implementations of the TIE technology the user may be presented with the entire vocabulary of ItemSelectors. The organization by which the vocabulary is presented will vary, but typically follows the following general approach, as illustrated in FIGS. 4, 5 and 6. As shown in FIG. 4, a user may be presented on a graphical screen 402 with lists of ItemSelectors and Items. ItemSelector list 404, for example, is a group of Person Description ItemSelectors (although not always true, we may assume for the moment that the ItemSelector is the same as the name by which it is represented). FIG. 4 shows an initiation of a search, before the user has chosen any ItemSelectors at all. A list 406 of (twelve) possible ItemSelectors for a "month observed" is presented, as well as a list 408 of (seven) possible ItemSelectors for Day Of Week Observed. Finally, an ItemSelector list 410 makes all possible ItemSelectors for Day (of the month). Thirty one such ItemSelectors are possible, but the situation is represented in which there is not sufficient room for all possible ItemSelectors to be directly presented the the user. Any graphical technique may be used; shown here is a "scroll bar" 412 by which the user, with aid of a mouse, can quickly scroll through the ItemSelectors that are not immediately visible.

Because no ItemSelectors have yet been selected to narrow the field of described Items, all Items belong to the Selected Item listing 414. Here, another technique for displaying less than all possibilities is illustrated: listing some of the Items, and indicating how many there are. More typically, the number of selected Items that are NOT displayed would be indicated. Here, a representative sample of eight selected Items is shown for illustration.

Turning to FIG. 5, it can be seen that the overall graphic presentation 502 has changed, as has the list 504 of possible Person Descriptions. That is because the user has chosen (and added to the present ItemSelector set) two ItemSelectors. One, "September," is clearly indicated as selected in list 506. The other, "Saturday," is indicated in the Day Of The Week list 508. Due to these selections, the number of possible ItemSelectors in the Day list 510 is reduced to just the days of the four Saturdays in September, i.e., to 7, 14, 21 and 28 (a single year is assumed for descriptive convenience). During Saturdays in September, a smaller set of Person Descriptions were recorded (and thus exist as ItemSelectors, or descriptors, in the database). In this example, four such Item selectors are applicable to persons observed on the limited days defined by the present set of ItemSelectors. Moreover, the Item listing of actual Items (persons, in this case, represented by some of their salient characteristics) is much reduced, as well, to just four that are described by the present set of Item Selectors.

FIG. 6 reflects the next user choice from Items and ItemSelectors presented in GUI 602. In the list 604, the user has chosen "Boisterous." This does not affect the Month Observed list 506 or Day Of Week Observed list 508. In some embodiments the user is permitted to choose an additional ItemSelector from these lists, which would INCREASE (typically) the number of selected Items shown in the list 614. Given the three ItemSelectors that have been chosen and thus constitute the present set of ItemSelectors, the Day list 610 reflects that a Boisterous person was observed only on the 7th of September. The Selected Items list 614 is also reduced by this further choice, now reflecting only two persons. unchosen possibilities that selects something further in the GUI 602, as is reflected in FIG. 6.

A user searches for Items of interest by selecting combinations of particular ItemSelectors from the vocabulary. This is typically done one at a time, either using a mouse click or by using the keyboard. Although multiple simultaneous selections are possible, they are either avoided or constrained in order to prevent "null hits" in which no Items are consistent with the selected combination of ItemSelectors. The simplest way to avoid such null hits is to renew that portion of the vocabulary that is presented as a selectable option to the user after each single ItemSelector choice entered by the user.

Thus, as each ItemSelector is chosen by a user, the remaining ItemSelector vocabulary that is made available to the user adjusts itself in such a way that at each stage any choice of an available ItemSelector will always result in at least one Item that matches all of the ItemSelectors selected thus, or in other words that fits the description that has been entered to such point.

Each ItemSelector chosen further describes a target that the user is seeking.

ItemSelectors in some Groups of ItemSelectors (descriptors) are mutually exclusive when describing the target Item(s); that is, if an Item is described by one of such mutually exclusive ItemSelectors, then it cannot be described by another. Such groups are called "disjunctive." An example of this is a group of ItemSelectors that will be called "gender." The ItemSelectors (descriptors) within this group include only "male," "female," "unknown," or "none." These ItemSelectors, as can be seen, are mutually exclusive as applied to any particular Item, and may be referred to as "disjunctive." Groups of ItemSelectors my be used in the manner of disjunctive Groups even if not all ItemSelectors within such Group are truly mutually exclusive; this will be a matter of choice and convenience for the purposes of a particular database.

In other Groups, the ItemSelectors are mostly NOT mutually exclusive, but instead have a large degree of overlap. Such Groups would be called conjunctive. A "Products" group of ItemSelectors is likely to contain the following ItemSelectors (descriptors), in addition to others: appliance, furniture, electrical, kitchen, outdoor, major, small, large, etc. Many of these descriptors can apply to a single product, and thus such a group would be treated as a conjunctive group.

A TIE system typically makes decisions about the Items selected by applying rules that take into consideration whether a particular ItemSelector selected by a User belongs to a conjunctive group of ItemSelectors, or a disjunctive Group. In some cases special rules apply to ItemSelectors belonging to groups that are bijunctive, meaning that ItemSelectors in such groups are often useful both conjunctively and disjunctively.

The precise Boolean Algebraic combination of the chosen ItemSelectors depends on the groups from which the ItemSelectors were chosen.

For example, the most common group type is termed Disjunctive, because selections of more than one ItemSelector from such a group implies the disjunctive "or" between them. Such ItemSelector selection increases (or in rare cases leaves unchanged) the number of selected Items and the available ItemSelectors.

The second most common group type is termed Conjunctive, because selection of more than one ItemSelector from such a group implies the conjunctive "and" between them. Such ItemSelector selection narrows down, i.e. decreases (or in rare cases leaves unchanged) the number of selected Items and the available ItemSelectors.

Other ItemSelector group types comprise the Exclusive Disjunctive (implying an exclusive "or") and the Negated Disjunctive (implying "or not") and the Negated Conjunctive (implying "and not"). Other, more complicated types are also useful and will be described.

In situations where said ItemSelector vocabulary is large it can be divided into a number of groups and group sets, logically organized to make navigation to the appropriate vocabulary terms easy for the user. In cases where the size of the vocabulary is such that even this arrangement makes navigation cumbersome, a higher level vocabulary can be created for the sole purpose of controlling the display of the various vocabulary groups and subgroups.

For example the Items either in one frame, window, or a set of frames or windows, each accessible using tabs, and listings (usually in several and sometimes in many list groups) of various descriptive ItemSelectors. Some of these ItemSelectors may be presented as buttons of various kinds, while others are presented as lists in columns, divided into tabs when necessary to accommodate larger numbers. Some ItemSelector groups may be initially hidden and only displayed under certain conditions, such as when the user makes appropriate choices of ItemSelectors and/or of control elements.

The Items are listed using some suitable identifiers or names as determined by the particular data. When no selection of ItemSelectors is made, all items are available to be listed, their number is displayed and a small subset of them, is usually listed at any time.

As the user chooses ItemSelectors that describe the Items of interest, the number of listed Items is updated, (usually reduced). These listed Items are the ones that match the description and will be here referred to as the Selected Items. The remaining available ItemSelector lists are also updated, (also usually reduced) to show only those ItemSelectors that are related to the already selected set through any Item. These ItemSelectors will be referred to here as the Available ItemSelectors. When the number of Selected Items is small enough, the user selects from the Item listing by name those Items to be viewed in detail. Each such Item chosen may be presented in its entirety in a new window.

In addition, in preferred implementations of TIE, a user option is provided enabling the display of Item counts associated with each ItemSelector. These Item counts reflect the number of Items, from amongst the current selected Item set, associated with each of the available ItemSelectors. Each time the user changes the selected ItemSelectors, these counts are updated. This gives the user an immediate "View" of the data in the database. In addition of course, the listing of ItemSelectors and their updating provides a continuously updating view of the data. No such views of the data in a traditional structured database are possible. Thus when using the TIE system, new, useful queries often suggest themselves to the user—something impossible under current systems, both structured and unstructured.

The ItemSelectors form a Vocabulary in terms of which the user can create descriptions of Items to be listed. The dynamic updating of the ItemSelector lists to show only available ItemSelectors, means that zero returns to any query (or search) never occur.

In many interesting applications, the ItemSelector Vocabulary consists of ItemSelectors that have different Boolean Properties. It is then necessary to divide these ItemSelectors into groups, each group defining the property. So for example, in a database using ItemSelectors with a large variety of properties, there would be groups with all the possible Boolean properties and all the possible value properties.

Applying TIE: Using the TIE technology we can begin implementing a database by deciding on the fields needed for each record we enter—just as in the current, old technology. Each record or Item in TIE, however, is free to have any number of fields, without burdening other records in any way. Additional fields can be added at any time—it is not necessary to know at the outset the number or kind of fields needed.

Each customer would be uniquely identified (as is currently usual also) with an ID number and each product and purchase order would likewise be so identified. Using the TIE technology, however, we could also decide precisely which groups of sub-fields we wish to list as separate Items and identify with a Record Type ItemSelector. In this example, we will assume, similarly to a standard database, that we have decided to describe the data groupings as three types of Items: the Customers, the Products, and the Purchase Orders. We could then use the linking number ItemSelector Identification of Items: Each Customer would be assigned a number of descriptive attributes or ItemSelectors, their combined meaning identifying the type, name, and other attributes of the customer, this being the customer data, and the type, description, price range and other attributes of the product, being the product data, and the product identifiers, descriptions and other data, being the purchase order data.

Automatic ItemSelector Association: When a customer purchases a product, the data entry automatically also assigns, to that customer, and to the purchase order, the descriptive ItemSelectors or attributes of the product, which would also include the product name, and the product ID, as ItemSelectors. This is done automatically when the data entry of the purchase order is created. Such an assignment automatically associates the product with all its ItemSelectors, the customer and all customer ItemSelectors, and the purchase order with its ItemSelectors, plus those of the product and those of the customer.

Therefore when the user subsequently chooses an ItemSelector describing a product, all customers who purchased that product are also listed. To see a listing of only the products, and not the customers, you would choose the Record Type ItemSelector Products. Similarly to see only the Customers you would choose the Record Type ItemSelector Customers, similarly for purchase orders, using the Record Type ItemSelector Purchase Orders.

Other Record Associations: In this example, the details of each purchase order would normally constitute another record in a traditional database. Each purchase order would also have an identifying number. In the TIE database each such order would be just another, though differently classified, data Item, linked to the customer through all the customer ItemSelectors including the customer ID number, to the product through the product ItemSelectors, and to the Purchase order through both sets of ItemSelectors and possibly new, PO specific ItemSelectors.

Here is how the TIE database would be used to search data.

The major Record Type ItemSelectors: Customer, Product, Purchase Order, would be displayed either as buttons or on some separate list. Such broad Data Type ItemSelectors will typically be used in two ways: to restrict the display to only one Data Type, and to include more then one Data Type in the display. They may also be used to describe any new field or subfield needed for a particular record and so automatically associate it with the appropriate Items.

It is important to realize that in the TIE system, a new ItemSelector can be added at any time, as needed, without necessarily affecting ItemSelector assignments for any current Item.

It is also possible that an added ItemSelector may need to be assigned to some subset of already entered Items. When this happens, a possible interface would have the user first choose existing ItemSelectors to narrow down the listed Items to those, or mostly those needing the new ItemSelector. Then, through suitable controls, the user would indicate which of the listed Items are to have assigned which of the new ItemSelectors. One simple implementation of this interface allows the user to mouse-drag the ItemSelector to the selected Items.

Conjunctive, Disjunctive and Bijunctive ItemSelectors: Examples. Many ItemSelectors are Conjunctive, but some are Disjunctive. For example, in the customer-product-purchase order database we are discussing, price ranges of products and totals of each purchase order would be appropriate useful ItemSelectors, but they would be disjunctive, that is, they would automatically be included with an "OR" between them when more than one of their kind is selected. This is because it is not useful to search for products or purchase orders that are in two price ranges: in fact there should be none! Similarly, if days-of-week (on which the purchase order was initiated) are used as ItemSelectors, they too would be Disjunctive, because an order can only be initiated on one day. Descriptive ItemSelectors are usually Conjunctive. So for example ItemSelectors describing a product, such as "Electrical, Appliances, Kitchen" are three words that are usually used together to form a description, so they are Conjunctive ItemSelectors.

Distinctive Display of ItemSelector Types: One way to implement the distinction between the Conjunctive, Disjunctive, and Bijunctive ItemSelectors is to list them distinctively. For example, in one implementation the ItemSelector types are in separate lists. In another, the Disjunctive ones are buttons whereas the Conjunctive ones are on lists. Bijunctive ItemSelectors can be displayed either in two displays, in separate lists, or in one display and a control can be provided to switch between the types.

As a third alternative, or addition the display could use a modified word or phrase to represent each ItemSelector. For example, after the first ItemSelector in a group is chosen, the disjunctive "or" could be pre-fixed to each subsequent ItemSelector in the disjunctive display (or as a prefix to a listing) and the conjunctive "and" to those in the conjunctive display. Other ways to distinguish the two displays are possible and are a matter of interfaces, to be decided by any special needs of the particular application.

It is also possible to provide a way to enter explicitly the "AND" the "OR" and the "NOT" between the ItemSelectors. The user could explicitly enter the conjunction, disjunction, or negation with the aid of a control or using the keyboard, or the entry could be affected by using a modifier key while clicking on an ItemSelector.

Item Names: Usually the user decides, at the outset, which Subfields are to be used to identify a record in a listing display—that is how to name each Item. This decision can be left as a preference for the user of the TIE Database, with a default of the most likely choice.

For example, for the Customer database, the last and first names plus the zip code of the customer's shipping address would be possible choices. The display of Items could then be ordered alphabetically by last name or numerically by zip code, at user's option. In general, it is possible to choose any combination of Subfields as the Item name.

Similarly, the user can choose the identifiers to use in a display of the Products and Purchase Orders data.

For example, product Name and product ID number could be useful identifiers for the Products data, while the Purchase Order Number and Customer last Name and Product Name could be useful displays for the Purchase Order data.

Interface for Choosing Item Names: Users would be given the choice of which Subfield combinations to use as Item names for the display. A list of the ItemSelector names of all Subfields would be provided and the user would choose from that list the combination to use as the Item name.

Data Entry Interface: When entering data, the user would describe each data Field (alternatively in a more detailed mode, Data Subfield) by selecting those ItemSelectors from lists that describe the Field (or Subfield). Each selection would immediately list the fields that have in common the currently selected description. The user would continue adding ItemSelectors to the description until just one field was available. That would ensure that each field is uniquely identified through its ItemSelectors.

If a Subfield, described by the selected ItemSelectors, has not yet been defined, the user is allowed to create a new Subfield using those ItemSelectors to identify it, and add it to the list of Subfields. In this way new fields can be added, because they are made up of particular subgroups of individual Subfields.

Example Adding a Field: In the customer database, suppose we have defined two address fields with the following two ItemSelector sets (Commas separate ItemSelectors):

1 Customer, Shipping, Address.

2 Customer, Billing, Address.

Suppose that we now need to add another address for some customer and that there is no descriptive ItemSelector to distinguish it from the two addresses already used.

In that case we introduce a new ItemSelector, using any appropriate descriptive terms. A possible ItemSelector might be: Large Products. (A ItemSelector may use any number of words.) Having created such an ItemSelector by typing it in, it would appear in our list of ItemSelectors and we would be able to choose it to create a new, unique Field described by the following ItemSelectors: Customer, Shipping, Large Products, Address.

In this example, the Field defined by the ItemSelectors in (1) is referred to as the Parent Field of the Field defined by (3).

The Large Products ItemSelector then becomes available for use in combination with any other ItemSelectors and for assignment by the user to any Item, as may be appropriate.

Automatic ItemSelector Assignment: After adding a new ItemSelector, it may be useful to assign it to the appropriate existing Items. This can, of course, always be done manually, picking each relevant Item and through suitable controls, assigning the ItemSelector. But such manual assignment may not be practical when the number of relevant Item groups is large.

In that case a feature can be provided to automatically assign the new ItemSelector. The conditions selecting the appropriate ItemSelectors for such an assignment, will then be specified by the user and the automatic assignment process put into place.

The conditions for such an assignment can be dependent on data content and/or existing assigned ItemSelector combinations. When data content is the criterion, the automatic assignment process involves a search of content and so can use the current conventional optimized search techniques.

When a combination of ItemSelectors is included in the criteria, the Matrix can be used to quickly access the relevant Items.

When both criteria are used, the Matrix may be used first to reduce the number of relevant Items and then a conventional search performed through the reduced set of items.

For example, in the already cited example when adding the Large Products ItemSelector, it may be useful to classify all the large products by assigning that ItemSelector to them. A simple specification would be a list of product IDs or names that are considered Large. If product names are unique and are used as ItemSelectors, the user could assign the new ItemSelector manually by selecting the Disjunctive set of product ItemSelectors and indicating by some means that the new ItemSelector is to be assigned to all the listed products. One possible such indication would be a drag and drop of the new ItemSelector to the listing.

Union Set Subfields Defines New Field.: On a more detailed level, each Subfield is defined using descriptive ItemSelectors. When a new Field is added, it automatically contains the union set of all the currently selected Subfields, each with its corresponding relevant ItemSelector Description, defined by the selected ItemSelectors before the new ItemSelector was added—that is the Parent Field. However, any Subfield can be removed, and any new Subfield can be added to a newly defined Field. This frees completely every defined field from all restrictions of its Parent Field.

For example, if the Parent Field comprises Subfields that include the last Name, the First Name, Street, City, State, Zip, but has no Subfield for the Country (not needed for mail in the US) such a component may be added simply by choosing (or if not present adding and then choosing) the additional ItemSelector Country. Adding Country as a subfield implies that the address is not for US customers, so the subfield "State" is not exactly appropriate and so may be removed from the Field and from the Field ItemSelector Descriptions.

ItemSelector Uses: ItemSelectors can be used for defining, describing, accessing and associating Records, Fields and even Subfields, as well as for defining and creating new Records, Fields and Subfields.

In general ItemSelectors are to be regarded as a vocabulary to be used in descriptions of Items, Fields and Subfields and other, more specific ItemSelectors.

Relations Automatic: In a traditional, Relational Database the various relations have to be defined by the user, usually through a hierarchical structure. In a TIE Database, all relations are automatic through the ItemSelectors. In essence they are also defined by the user, but naturally, implicitly, by use of language—through the use of descriptive ItemSelectors and not restricted by the hierarchy.

For example, when a Customer Order is entered in the TIE Database, the new Record so defined is automatically (clearly with optional user override) classified with the ItemSelectors of the particular Customer and those of the particular Product, or Products ordered.

Example Scenario: Here is how the TIE Database system might be used.

Suppose the user selects ItemSelectors describing a set of products. These ItemSelectors could be one or more of the following types:
1. product description ItemSelectors (for example: Electrical, Small, Appliances, Kitchen)
2. product price range ItemSelectors
3. product name ItemSelectors The listing will contain all products matching the ItemSelector descriptions plus all Customers who have bought any of these plus all Purchase Orders associated with them.

When choosing these ItemSelectors, the remaining available ItemSelector vocabulary is displayed and as individual ItemSelectors are chosen, the vocabulary is updated, showing only the related or available ItemSelectors. This process guides the user to the available information and simultaneously shows the user, through the ItemSelector display, the information within the database. At each step of the process the user can actually see into the database and so be better informed. All this is in great contrast to all present database possibilities.

The user can choose to narrow down the listing by choosing more ItemSelectors of any kind, and/or by choosing ItemSelectors describing the type of Records to view, that is, choosing from the Disjunctive set of ItemSelectors: Customers, Products, Purchase Orders. (Usually, all are shown when no choice is made.)

Once the Item list has been sufficiently narrowed to show only the desired Items, the user can obtain information about them, open them individually to see the details, note the counts of the various Items, or extract specified data from all Items or the selected items in the listing.

There are many different interfaces for selecting data to extract. They can be described generally as follows.

Extracting Data & Creating Reports: Assuming the user has narrowed down the listing of Items to those of interest, the user then selects the Items of interest from the listing, either individually or in groups. Then by choosing a menu or using a button control in a window, the user indicates the desire to extract data. The resulting window frames may show, in one, a listing of ItemSelectors describing each Field and Subfield within the selected Items, and in another a listing of the selected Subfields.

The user chooses the set of ItemSelectors describing the Subfields desired, narrowing or enlarging the list of selected Subfields. The user then picks, from the resulting list, those Subfields needed for the extracted data report. One GUI for doing this is to drag each Subfield to a Report window, locating each where desired and even adding descriptive text to each as appropriate.

Individual subfields selected can further offer the user the choice to insert in the report various statistics evaluated from the values of these subfields within the chosen set of Items. Another option can allow the user to create a formula involving the subfields, said formula to be evaluated for each Item selected and its specified statistics inserted in the chosen location in the report.

A final menu command or other control executes the data extraction, creating the report to be viewed on the screen for final editing and allowing he user to save it to a file. HTML or more generally XML may be a convenient file format to use, but any file format can be used.

Handling Field Values: Field values can be of four types: Text, Numbers, Dates (including time), and Mixed The first three are obvious, the last needs some explanation. Mixed type means that the Field contains a mixture of more then one of the other three types. Such a Mixed type can be parsed and split into its components and each component can then be treated as a separate type. The splitting can be defined by the user.

Often it is convenient to use Number Ranges as ItemSelectors rather then the actual numerical values, however there may be applications in which the actual values would be convenient ItemSelectors also. In those cases each of the possible values could be an ItemSelector, or position dependent Alpha-ItemSelectors could be used. The user can be allowed to choose how to convert the Field Values to ItemSelectors. A suitable interface would display the list of individual values, together with the frequency of occurrence of each, which can be grouped into ranges, allowing for the adjustment of these ranges. When groupings of the values are created, the interface should also display the cumulative frequencies associated with each group, to allow for balancing the groups by adjusting the ranges.

TIE Implementation in General: The application described here is very general and the particular details are determined by the specific application and specifics of the data.

As already mentioned, the application implementing TIE can be a single piece of software, referred to as the stand-alone implementation, or two separate pieces of software: the Server and the Client. The Client, in turn can also be of two types: a separate application, or a browser-based Client, implemented in any of the practical ways using either an automatically downloadable Java Applet, or some addition, plug-in or modification of the browser. All these possibilities are envisioned in what follows, although the two-piece, Client-Server implementation will be described. If the Stand-Alone implementation is used, it can still be built in similar fashion to the Client-Server, though more optimizations of response times to queries may then be possible and a communication protocol is unnecessary—making all data on the server side immediately accessible to the client side.

In the preferred implementation of the Client-Server version, the communication between the two can use either of the common protocols: HTTP or TCP or a custom protocol. TCP generally allows for a better communication time, but has the disadvantage of being blocked by certain fire-walls.

In certain applications it is convenient to develop a combined type application. This is a stand-alone application that also communicates with the same server as a Client. The mode of communication however, is adjustable. For example it can act as an ordinary TIE Client, keeping locally only the minimum ItemSelector information, or it can be a stand-alone application keeping all information contained in the Matrix and even possibly additionally all Item contents. In the event of the second possibility, periodic connections to the server would keep the local data up to date, as each connection would verify the time of the last change of each piece of data and send any needed new data.

Stateless Communication: The Client-Server implementation to be described assumes stateless communications, that is, each request from the Client is dealt with by the Server, independently of any previous or future requests from the same or different clients. Although a stateless implementation is not necessary, it has the advantage of not requiring the Server to keep track of concurrent Clients. Its principal disadvantage is that because each request is independent of prior requests, calculations of Booleans may sometimes not be as efficient as they could be—in some small additions to a Boolean query it may be advisable to require its complete re-evaluation. However, in most cases, Boolean evaluations can be made incrementally by having the client pass back the results of previous evaluations.

When using any application of TIE, we speak of user actions sending a "Query" to the server and the server responding, said response being processed and presented to the user by the Client.

TIE Applications Overview: The command flow of control in a Client-Server or stand-alone application implementing the TIE system will be outlined next. Following that, details of the various parts will be presented.

As usual, assuming the application is structured as a Client Server system (alternatively as a Client part and a Server part of a stand-alone application) the user interacts with the Client, which is the vehicle of the GUI. Many GUI implementations of the TIE technology are possible.

The objective of the TIE technology is to present the user choices to use to describe, in small steps, the information Item they want to find. After every such step in said description process, said user choices are updated to show only the available remaining choices.

One way to present the user with said choices is to display sets of words, phrases and/or graphics, described as the Vocabulary, using which the user composes a description of the Item of interest. For example, an implementation that uses only text as the Vocabulary may display descriptive key-words or phrases in lists, on buttons, as checkboxes, radio buttons or in other ways which allow user choices. This may be effected by a simple system that displays the Vocabulary in one or more alphabetized lists of key-word or phrase descriptions.

There are also many ways enabling the use of such lists in making up the particular Item description. One way to begin is to have the user mouse-click on any one appropriate word or phrase. Then to immediately update the Vocabulary display to indicate the remaining available Vocabulary, allowing further additional choices. In addition it is often convenient to also display the total number of matching Items and to display the first 10 or 20 of these matching Items by name. Another useful feature is to display, next to each member of the Vocabulary (that is, next to each ItemSelector), the current number of Items to which that ItemSelector is assigned. None of these displays are essential for the functioning of TIE, but they all add to its usefulness. As the user adds to the description, the list of matching Items usually shrinks, eventually becoming a sufficiently small number for the user to be able to choose from the Item listing.

The final step in the user search process is a request to get the Item or Items. This can also be done in many ways. One simple customary way is to let the user double-click on a listed Item or selected Items. Another is to click on a "Get Items" button, having selected the Items of interest in the listing. Other possibilities parallel other methods of selecting the ItemSelectors.

Once the Item or Items are requested, the detailed data can be presented in separate windows. That detailed data can be stored in any conventional database system or it can be stored in conventional computer files. The data held by the TIE system, includes either the detailed data for each item, or preferably the URL, the path or other reference data identifying the location of the Item, enabling the Item details to be displayed without a delaying search.

Examples of other possible implementations of ItemSelector and/or Item selection include the use of Speech recognition, the use of simple remote controls where each ItemSelector and or Item has displayed a number identifier, where the user selects an ItemSelector or Item by said number, and use of the eyes to control selections. The latter possibility is particularly useful for the severely handicapped. If a means is provided for the detection of which ItemSelector or Item the eyes are focused or directed at, then a pause of a minimum predetermined duration on an ItemSelector or Item could be used to indicate a selection.

It is often convenient to use whatever method of selection of ItemSelectors or Items is implemented as a "Toggle" that is, as a method of both selecting and deselecting the ItemSelector or Item. This makes it unnecessary to provide an additional control for deselecting individual ItemSelectors or Items, although it is still useful to provide a control that clears all selections.

Program Steps: Having outlined the general user driven functionalites enabled by an implementation of the TIE technology, we now proceed with a list of the steps that the software program implementing TIE might make. (This assumes a Client-server implementation, but the steps for a stand-alone implementation are similar, replacing the communications over a connection steps with communications internal to the program.)

1 The user starts the program or Client.

2 The Client sends first request to the Server.

3 The server responds with the Time Stamp (unless the Client's Time Stamp is current) with a listing of the ItemSelector names, Group numbers (if groups used), ID numbers, with the first Item Names, and with the number count of Items, number count of ItemSelectors, and if requested, the number of Items associated with each ItemSelector.

4 The Client receives response from Server and draws the display that includes the ItemSelector Vocabulary and the list of the alphabetically first 10 or 20 Items by name.

5 The user selects an ItemSelector (or deselects on already selected).

6 The Client sends a Boolean request, based on user selections of ItemSelectors, to the Server.

7 The server sends a response listing the available ItemSelectors, the number of Items Selected, and the alphabetically first Item names and ID numbers, and the Number Counts if requested. Such counts include the number of Items, from the Selected Set, which have each of the Available ItemSelectors assigned. That is, a count is associated with each Available ItemSelector.

8 The Client updates the display of the ItemSelector Vocabulary, Item counts of each ItemSelector and the list of the first Items from the Selected Items.

The above steps, from step 5, are repeated until the user selects an Item or Items and requests them, at which point the following happens:

9 User selects an Item and requests its contents.

10 Client sends request to Server for the contents of an Item. These contents can be the full Item data but more often are simply a URL or a path to the Item.

11 The server responds with the Item contents, no matter what these contents are. The type designation of the contents is also returned to the Client so the Client will know how to deal with the data. If the data contains the Item contents, the Client presents that to the user to read. If the data is a URL to the Item, the Client sends the URL to the Browser to be opened. If the Item contains some other reference to the Item data, it is dealt with by the Client who gets the data and presents it to the user.

The user can now go on to other searches, choose to start over form the beginning, or deselect an already selected ItemSelector, in both cases the steps start over from step 5.

At any time, the user can select from the listed Items, or select all the chosen Items and perform a standard Content search using a conventional text or other data matching engine.

Other features can be implemented and these may need other controls. For example, controls may be provided for the following features:

Display Item counts for each ItemSelector

Display ItemSelectors in alternative orders, such as in order of Item counts or in order of frequency of use by user or in some other ordering.

Select an Item and request a listing of the ItemSelectors assigned to that Item. This requires the Client to send that request to the Server and then to act accordingly. The result of this is also a display of all Items with the same ItemSelectors.

Remember a filter—that is a combination of ItemSelectors. All remembered filters can be listed for the user to choose from in future quick searches. This does not require the intervention of the Server, although it could be remembered on the server. The Client can save these filters as combinations of ItemSelectors, in a file on the Client computer.

The organization of the ItemSelectors on the screen is used to make their relative location logical and selection easier. Screen organization is useful in displaying to the user the ItemSelector Groups that determine the translation of the ItemSelector selections to the Boolean query sent to the Server.

Building the ItemSelector Boolean: Overview: As already described, the more advanced and feature rich implementations of TIE divide the ItemSelectors into a number of Groups. Each group contains only one ItemSelector Type, that is, Groups are used to keep the Disjunctive and Conjunctive, Bijunctive and Negated ItemSelectors quite separate and to group different types of ItemSelectors together. The Boolean created from the user selections is determined by the ItemSelector Type and Group membership of each selected ItemSelector. The following example illustrates the relationship between the ItemSelector Type and the contribution the selection of that ItemSelector makes to the query Boolean.

Suppose A, B, C, D, stand for Conjunctive ItemSelectors. Suppose further that a, b, c, d, represent Disjunctive ItemSelectors in one Group and e, f, g represent Disjunctive ItemSelectors in a different Group. The following table shows the Booleans which result from the selection of the corresponding ItemSelectors:

| Selected ItemSelectors | Boolean Sent to Server |
| --- | --- |
| A,B | A*B |
| A,B,a | A*B*a |
| A,B,a,b | A*B*(a+b) |
| A,B,a,b,e | A*B*(a+b)*e |
| A,B,a,b,e,f | A*B*(a+b)*(e+f) |
| A,!B | A*!B |
| A,!B,!a,!b | A*!B*!a*!b |
| A,!B,!a,!b,c,d | A*!B*!a*!b*(c+d) |

It is important to understand that the calculation of the available ItemSelectors (the IRV) involves more than one Boolean query when disjunctive ItemSelectors are involved. Thus the IRV resulting from the Boolean query A*B*(a+b) determines the available ItemSelectors in all groups other than the Disjunctive group (a,b) in which all ItemSelectors remain available.

Likewise the IRV resulting from the query A*B*(a+b)*e determines the available ItemSelectors in all groups except those containing the Disjunctive ItemSelectors (a,b,e). To determine the available ItemSelectors in the (a,b) group the modified query A*B*e must be sent to the server, whereas all ItemSelectors remain available in the group containing the Disjunctive ItemSelector e.

If any of the Disjunctive Groups are Exclusive, the "OR" operator is replaced with the "XOR" operator, but otherwise the procedure follows similar steps.

Finally, when negated Disjunctive ItemSelectors are selected, they become Conjunctive (DeMorgan's Law) but negated Conjunctive ItemSelectors remain Conjunctive.

This clearly illustrates that Disjunctive ItemSelectors sharing the same Group are parenthesized together when creating the Boolean to be sent to the Server. Furthermore, when determining the IRV (available ItemSelectors) resulting form a Boolean containing Disjunctive ItemSelectors, modified Booleans need to be used. Therefore it is necessary to track the ItemSelector Group to which each selected Disjunctive ItemSelector belongs, though this is not necessary for Conjunctive groups.

The interpretation of user choices and their conversion is normally done by the Client, though of course it could be done by the server. We have found it better to make the server as general as possible and as simple as possible, so that it should not be burdened with such details as which ItemSelectors are Disjunctive which Conjunctive, however when performance is an issue, the server should track the different groups, because the calculation of the available ItemSelectors (the IRV) involves multiple Boolean requests to the server and these can be optimized when the server knows the types of all groups.

Converting Selections to a Boolean: To interpret the user ItemSelector selections and convert them to a Boolean string, a function is needed in the Client, which accepts each selection and returns a Boolean string which is then passed to the server. Let us call this the boolean_selection function. This in turn can be divided into two steps (and so probably two functions). First is the conversion of the user selections to data in an array. Second, the conversion of this array to a Boolean string. The click location determines the ID number of the selected ItemSelector and the number of its Group. The Boolean_selection function holds the current selection in an array. When the user makes a selection of an ItemSelector "j" from Group "i" its ID "j" is added to any other ItemSelectors, if present in Group "i" Then the array is passed to the Boolean_selection function which returns the Boolean string. We first detail functions that store the ItemSelector selections in the Boolean array. Then we follow with the details of the conversion of this array into the Boolean query string.

Structure of the Boolean Array: An easy data structure to use to track and store the current ItemSelector selections is an array of struct, where the struct is an integer plus two strings. The integer stores the Group number of the ItemSelector, except for the Conjunctive ItemSelectors and negated Disjunctives that are all treated the same way, independently of groups. The first string holds the Boolean operator defining the group type, and the second holds the current Boolean accumulated expression for that ItemSelector Group, in the form of a string consisting of ItemSelector IDs and Boolean operators. Each Group type is either Conjunctive, Disjunctive, negated Conjunctive and negated Disjunctive. The Group's type determines how ItemSelector IDs are added to the current Boolean expression. When the BooleanArray is completed, the boolean_selection function converts it to the Boolean query string.

All Conjunctive ItemSelectors are stored in the first element of the struct. All the Conjunctive Negated and Disjunctive negated are stored in the second element, and the Group number part of the struct is not necessary for those two elements.

The three Boolean operators corresponding to each type of group are: "*" for Conjunctive groups, "+" for Disjunctive groups, and "*!" for Negated Conjunctive and negated Disjunctive Groups. Designated ItemSelectors can be negated by virtue of belonging to a group. Any other ItemSelectors can be negated by the choice of the user.

For example, an ItemSelector selection when a modifier key is pressed can mean the negative of the (normally non-negated) ItemSelector. Negated ItemSelectors, even when they belong to a Disjunctive group are added Conjunctively—because that is the most likely intuitive meaning the user intends and can easily understand.

As another example, in a TV Guide application, the days of the week are normally Disjunctive ItemSelectors—the user wants to know which programs are on Tuesday OR Wednesday (not Tuesday AND Wednesday). If the user chooses the ItemSelector Tuesday but negated and then chooses Wednesday also negated, clearly the meaning must be to find programs that are not on Tuesday AND not on Wednesday. A further choice of Thursday and the additional ItemSelector Friday must mean that the program is not on Tuesday AND not on Wednesday AND on (Thursday OR Friday).

To account for this, the Disjunctive ItemSelector that is negated is automatically placed into the array element for the negated Conjunctive Group. (Applications where this is not appropriate are free to interpret user choices in other ways and can even provide interfaces for the user to decide to override any automatic such choice.)

It is useful to standardize on a convention. For example, that the first element always holds all the ItemSelectors from all Conjunctive groups, the second one all ItemSelectors which are negated Conjunctive or Disjunctive, and the subsequent series of elements holds all the Disjunctive ItemSelectors, one element for each distinct Group.

As is obvious by the examples, and previously stated, Conjunctive ItemSelectors from different groups together with any negated ItemSelectors of any type are all combined together in one element—because it makes no difference to the resulting Boolean which group they come from. However, Disjunctive (non-negated) ItemSelectors have to retain their Group origin to the extent that the ltemSelectors from each group are grouped together and parenthesized to be Conjunctively added, as a group, to the output Boolean string, and in addition modified Booleans, omitting ItemSelectors from each Disjunctive group in turn are needed to determine the IRV appropriate for the disjunctive Groups.

Adding Selected ItemSelectors to the Boolean Array: Normally when an ItemSelector is selected or deselected by the user the following program actions are triggered:

1 The selected ItemSelector is added to the Boolean Array or the deselected ItemSelector is removed from the array.
2 The Boolean query string is created from the Boolean Array
3 The Boolean Query string is sent to the server.
4 The server responds, the Client parses the response.
5 The Client updates all displays in accordance with the response from the Server.

When a "Clear All" or a "Start Over" command is issued by the user, the Boolean Array is cleared of all its data. We now detail the first of these steps.

Adding a selected ItemSelector. The location of the selected ItemSelector determines its Group number and its ID number. A ItemSelector is identified by its ID alone. Its Group number can be looked up in the Group Table.

If the selected ItemSelector is from a Conjunctive, or a Conjunctive or Disjunctive negated Group the Boolean Array first element (or second element for the negated case) is checked for the presence of a string in its second string component. If the string is present, the Boolean operator for the group is added to that string followed by the ID number of the selected ItemSelector. If there is no string in the second component, the ID number without the Boolean operator is assigned to that string.

If the selected ItemSelector is from a Disjunctive group, its Group number is first looked-up and the above procedure is followed with the array element in question being the one corresponding to the specific ItemSelector Group as identified by the Group number.

When an ItemSelector is deselected, a similar procedure is followed, but this time a search needs to be made within the appropriate Boolean string and then a deletion performed of the found ID number. This deletion must also delete any Boolean operator that precedes it in the string.

Creating Boolean Query String from Boolean Array: The following describes the details of the second step triggered by the user selection of an ItemSelector.

After the user completes the selection of an ItemSelector, the ItemSelector Boolean expression to be sent to the server is put together from the Boolean Array. The Conjunctive Boolean operator "*" is used between non-null strings from the Array, enclosing in parentheses only those elements associated with Disjunctive groups when more than one ItemSelector in a group has been selected.

The Boolean selection function uses the following steps to create the accumulating Boolean string by combining each non-null string element in the Boolean Array with other non-null elements in that Array.

Let the current string element be current Boolean, then the accumulating Boolean is accumulating Boolean.=current Boolean at initialization and output Boolean=accumulating Boolean at completion.

If the current Boolean does not contain a Boolean operator or the current Boolean is a Conjunctive grouping (first or second element of the array), accumulating Boolean= accumulating Boolean*current Boolean else parenthesize the current Boolean first, giving:

accumulating Boolean=accumulating Boolean*(current Boolean)

When all non-null elements have been processed in the array the resulting Boolean string is the accumulating Boolean. It is sent to the server as the next query. The queries sent to the Server require the Server to respond in the minimum of time to a general Boolean expression linear in ItemSelectors. The information that associates each Item with its ItemSelectors is usually held in memory (RAM) for quicker access, and is referred to as the ItemSelector Matrix, or simply as the Matrix.

Server Parses Query: The TIE Server receives the query as a Boolean string. The following steps describe in overview the Server actions that follow.

The query string is parsed as is customary using a simplified arithmetic parser (because the rules for Booleans are the same as those for arithmetic expressions involving only multiply and add) that results in a parse tree structure of ID numbers and operators. The evaluation of these is a simple, well-known process, once we have detailed the evaluation of the elementary operator actions. These involve the use of the ItemSelector Matrix.

The ItemSelector Matrix: In what follows, the several implementations of the Matrix are described and the details of the evaluation of the elementary ItemSelector and Item Booleans are presented. It is convenient to regard the ItemSelector Matrix as a binary matrix of n by N bit elements (where n=number of ItemSelectors and N=number of Items), even when the implementation uses the ItemSelector Vector approach.

ItemSelector & Item Choice Features: The following describes first the details of the ItemSelector Vector implementation, and then follows with the details of the Bitmap implementation. There are two classes of features in implementations of TIE: Those based on user choices of ItemSelectors, and those based on user choices of Items.

Any means can pectors or Items. For example, choices from displayed lists can be by mouse pointer and click, or by keyboard using any suitable keys. How such choices are made is a matter of user interface design, and will depend on both the particular application, specific type of data, and the number of possible ItemSelectors to choose from. When the number of ItemSelectors listed is too large for easy practical presentation on screen, a special TIE method of access, using the keyboard, uses the herein described TIE technology in an independent, new technique, using a completely separate Matrix. This is described in Appendix II.

The TIE method comprises consecutive incremental ItemSelector choices, in which it is important for the user to see displayed, an updated list of available further choices immediately after making each ItemSelector choice in the sequence. Each user choice sends a query to the server, which, in turn, responds and the Client uses the response to update the display.

ItemSelector Filter: Some selected ItemSelectors can be Conjunctive others Disjunctive, while others can be Negated, that is, preceded by the Boolean operator NOT. The set of selected ItemSelectors comprises, what is referred to as an ItemSelector Filter, because it filters out all information other than that described by the ItemSelector Boolean in the filter. The ItemSelector Filter is built up incrementally by the user until the time the user decides to choose to access an Item. At that point we can say the user has defined the first Used Filter.

It is convenient to allow the user to save certain such filters so they can be accessed though a single mouse click of key. Sometimes it is also convenient for the client or the server to automatically save all such defined filters ever used and to keep frequency of use data. The most frequently used filters of user's could then be displayed for the user to easy access. This is the Frequently Used Filters (FUF) feature.

It is clear therefore that any Used Filter is arrived at through a number of user choices, following each one of said choices, an Intermediate Filter having been defined, and the Client having sent queries to the Server, based on each of said Intermediate Filters, and received responses from the Server.

Vector Boolean Algebra: Each said query Filter is in the form of a general Boolean expression, linear in ItemSelectors, but because of the incremental build of said expression, it can be evaluated incrementally in steps, where each step involves the evaluation of a very simple Boolean expression, consisting of two ItemSelector vectors and a Boolean operator between them. Either ItemSelector, or both ItemSelectors can be negated, and the only possible Boolean operators are the conjunctive AND and the two possible disjunctives OR and XOR. (For most applications only the first disjunctive is used.)

For example, using the star "*" to designate the Boolean AND operator, the plus "+" for the Boolen OR, and the exclamation point"!" for the Boolean prefix NOT, we can develop a simple symbolic algebra with very useful shorthand meanings within the TIE framework. (The development could also be presented using the theory of ordered sets.)

For example, the Boolean equation:

$$D1=C1*C2=(I1,I2,I3,\dots) \qquad \text{Eq. 1}$$

defines the Derived ItemSelector vector D1, whose components are the ID numbers (I1, I2, I3 . . . ,) of Items filtered by the C1*C2 filter. Using a more descriptive language, when ItemSelectors C1 and C2 are selected by the user Conjunctively, the TIE interface displays a list of selected Items which are the components of the Derived ItemSelector vector D1.

Additionally, using this Boolean algebra, we can express the list of available ItemSelectors for the same Filter C1*C2, derived as a Boolean of the Item vectors, corresponding to the components of D1, producing the Result Item Vector RI, given by:

$$RI=I1+I2+I3+I4+\dots=(c1,c2,c3,c4,\dots) \qquad \text{Eq. 2}$$

If the user adds another Conjunctive ItemSelector, say c5, (which clearly must be one of the available ones, from the list of components of RI,) then the Result ItemSelector Vector, say RC will be given by:

$$RC=C3*c5=C1*C2*c5=(i1,i2,i3,i4,i5,\dots) \qquad \text{Eq. 3}$$

and the resulting available ItemSelector list as the components (d1, d2, d3, . . . ) of the Derived Item vector DI, given by:

$$DI=i1+i2+i3+i4+\dots=(d1,d2,d3,d4,\dots) \qquad \text{Eq. 4}$$

Suppose that now, having selected the three conjunctive ItemSelectors, the user selects the next two disjunctive ItemSelectors F, G. The first disjunctive ItemSelector selected is always combined with the already selected ItemSelectors Conjunctively. Only subsequently selected Disjunctive ItemSelectors are combined disjunctively with any already Disjunctive ones in the same group. The resulting ItemSelector Vector RC1 will therefore be given by the equation:

$$RC1=C1*C2*c5*(F+G)=C3*c5*(F+G)=RC*(F+G)=(DI1,DI2,DI3,\dots) \qquad \text{Eq. 5}$$

and the resulting available ItemSelector list as the components (e1,e2,e3, :) of the Derived Item vector D2, given by:

$$D2=DI1+DI2+DI3,+\dots=(e1,e2,e3,\dots) \qquad \text{Eq. 6}$$

ItemSelector Groups: In general, disjunctive ItemSelectors belong to groups. In particular implementations, there may be any number (including zero) of different Disjunctive (and Conjunctive) groups, as needed by context and type of data. In general, adding a Disjunctive ItemSelector to a Boolean already containing some Disjunctive ItemSelectors, involves adding its symbol to the parenthesis enclosing the Disjunctive ItemSelectors belonging to the same group. Similarly, adding a Conjunctive ItemSelector belonging to a group, involves adding its symbol to the Conjunctive group, where parentheses are not necessary, because the precedence of Conjunctive evaluations is higher then the disjunctive ones. Finally, any one of the symbols could represent a negated ItemSelector or Item vector.

The above equations define the processes dictating the needed function design when implementing any application of the TIE technology. The details of the software implementations of these functions for the single Matrix implementation, using ItemSelector Vectors, are given in the next section. The above examples are based on supposed user selections of ItemSelectors and so describe the first step in the implementation of the class of features based on ItemSelector selection.

Item Selection Features: Implementation of the second class of features, based on Item selection, the process is completely analogous. All equations follow the same rules, with Items and ItemSelectors interchanged.

A simple example of this second class of features: the user has found an Item or a group of Items of interest and wants to know which other Items in the Database have the same ItemSelectors as the chosen one or group. The user could select the Item or group and initiate the query. Such selections would be incremental, just as for ItemSelector selections, where after each selection of an Item, only the remaining available Items are displayed. The process would send to the server Booleans of Item vectors.

As a last step, in most uses of TIE, the user chooses to Open an Item. This last step is not discussed in this paper, because nothing new is involved in the process—the Item can be on any computer, either local or anywhere in the world. It can be a computer file and so accessed and referenced as a path (when local) or as a URL (when not local), or it can be a data record in any database, and also referenced as a URL or through any logical referencing and access system.

Overview of ID-Array Implementation—The Matrix: In the ID-array implementation, the Matrix is a double array of ID numbers, represented as M[i][i], where i is the index identifying the ItemSelector and j an index for access to the Item's ID number assigned that ItemSelector. Although for fastest access the index identifier i, is also the ID number of the ItemSelector (j, however, cannot be the ID of the Item) this is not a necessary condition. In implementations which do not use this relationship, tables relating the ID numbers of the ItemSelectors to the array indexes will need to be maintained and accessed each time an access to an element is made.

ItemSelector & Item Vectors: Using this double array notation, the element M[i][j] is the jth componet of the ItemSelector vector associated with the ItemSelector whose ID number is i. Each of this vector's elements represents the ID number of the Item assigned the ItemSelector whose ID number is i.

In the double matrix implementation, there are two matrices and two corresponding double arrays. The first is the one just described, but the second, designated as M2, has the property that M2[i][j] is the jth component of the Item vector associated with the Item whose ID number is i. Each of this vector's elements represents the ID number of the ItemSelector that is assigned to the Item whose ID number is i. As is obvious from their properties, each matrix is the other's ItemSelector to Item transpose.

User Actions: The following actions and responses define the main functions needed on the server and put into context the basic Boolean operations as summarized in the Boolean algebra of vectors.

Action: Selecting ItemSelectors: One ItemSelector selected, or a negated (NOT) ItemSelector selected. Return the list of selected Items (CRV) and the list of available ItemSelectors (IRV). (As an alternative, return the negative of any set.)

i More than one ItemSelector selected. This means in general a Boolean expression linear in ItemSelectors. Parse the Boolean and reduce it to individual sequential steps each being just two ItemSelector vectors joined by a Boolean operator. Return list of selected Items as the CRV and a list of available ItemSelectors as the IRV.

Action. Selecting Items: i One Item selected, or a negated Item selected. Return the list of assigned ItemSelectors as the IRV and the resulting list of related Items as the CRV. When a negated Item is selected, return ItemSelectors that are not assigned to the item as an IRV and a list of Items as the CRV that have no ItemSelectors in common with the negated Item. Alternatively return the negative of each of these lists.

More than one Item selected. This means in general a Boolean expression linear in Items. Parse the Boolean and reduce it to individual steps, each being two Item vectors joined by a Boolean operator. Return a list of selected ItemSelectors as the IRV and a list of Selected Items as the corresponding CRV.

To achieve, the above functionality, at a minimum we need to be able to evaluate Boolean expressions of ItemSelectors and Boolean expressions of Items.

ItemSelector Booleans

Action: Conjunctive ItemSelectors: When you choose the first ItemSelector, say C1, the ItemSelector Vector components form the Items that are selected and displayed. To narrow the list of selected Items, when you then select a second ItemSelector, say C2, the client (in a stateless session) sends a Boolean query to the server of the form:

$$C1*C2$$

which is interpreted as "send me the list of Items which all have assigned to them both ItemSelector C1 AND ItemSelector C2."

Server Response: The server responds with an ItemSelector Vector whose components are the selected Items, and in addition will send back the Item Vector whose components are the available ItemSelectors.

Action: Disjunctive ItemSelectors: Suppose you choose instead two disjunctive ItemSelectors, D1 and D2, making the client send the Boolean:

$$D1+D2$$

to the server, which is interpreted as the request: "send me the list of Items which have assigned to them either ItemSelector D1 or ItemSelector D2."

Server Response: Just as for the Conjunctive request, the server will respond with an ItemSelector Vector whose components are the selected Items, and in addition will send back the Item Vector whose components are the available ItemSelectors.

In general, you could select a combination of Conjunctive and Disjunctive ItemSelectors, making the client send a general Boolean in ItemSelectors. Similarly, you can choose two listed Items (I1, I2) (in one implementation, a selection while pressing the Option or Alt key, to distinguish the request from a plain selection) making the Client send the Boolean: I1*I2 to the server, which is interpreted as the request: "send me the list of ItemSelectors which are assigned to both Items."

Boolean Evaluations: The evaluation of this Boolean proceeds as follows:

The Boolean evaluation function parses a Boolean string passed to it and evaluates it returning, as usual an ItemSelector vector and an Item vector. The first level parser breaks up the Boolean string into nodes and operations. The evaluation of this proceeds by pairs. All we need therefore is prescriptions for evaluating the fundamental Booleans A*B and A+B, where A and B are any two given vectors. Additionally, a very simple routine will be detailed to negate (NOT Boolean operator on a vector) any vector. This routine simply takes the total set of vector components and replaces the given vector with one containing the complement of the set of components of the given vector.

Methods of Implementing the Matrix—General: The fundamental theoretical data structure needed to implement the TIE system for optimized fast access is a table in the form of a binary matrix, which we sometimes refer to as the Bitmap. The columns of that matrix are labeled with the ID numbers of the Items and the rows are labeled with the ID numbers of the ItemSelectors. In addition, the fastest access is achieved if the ID numbers are easily related to the array indexes in the software data structure implemenation. The easiest relation is of course identity, so in implementing we try to make the ID number be the index. Two Translation look-up tables are used to convert between ID numbers and Names, one for ItemSelectors and the other for Items.

Several different implementations are possible of this Matrix using optimum data structures. We will describe two types of implementations with two variations of each.

First is the binary matrix implementation. In this, the Matrix is truly a binary matrix of bits, or a bitmap. Each ItemSelector is represented by an index of the bit row and each Item by the column bit index. These indexes are respectively the ID numbers of ItemSelectors and Items. Assignment of an ItemSelector to an Item is indicated by turning "on" the bit corresponding to the ItemSelector-Item matrix element. Conversely when there is no association between an ItemSelector Item pair, the corresponding matrix elements are not set. In most practical applications to data access, the great majority of these matrix bit elements are not set. Put another way, each 0 bit element of the matrix means that the corresponding ItemSelector is not assigned to the respective Item whereas 1 means that it is.

Another alternative implementation of the Matrix uses an array of ItemSelector vectors, where each component of the vector is the ID number of the Item assigned the corresponding ItemSelector. The number of components of such a vector is of course not fixed, the average being the average number of Items per ItemSelector. Each component is an integer and the vector is usually implemented as a dynamic array of Integers. The components are ordered to make comparisons fast and efficient.

Instead of an array of ItemSelector Vectors, we can use an array of Item vectors. In this case each Item is represented by a vector whose components are the ID numbers of the ItemSelectors assigned to that Item. These components are also kept ordered.

As will be shown, for optimum performance, at the expense of memory, it is useful to use both arrays of ItemSelector and Item vectors. This implementation is referred to as the Double Matrix implementation. In practice, whether a binary Matrix (the Bitmap) is used or an array of ItemSelector Vectors (and optionally an array of Item vectors) depends on which is optimum for the given application, operating system, and/or compiler.

For those applications in which the ratio of the average number of ItemSelectors per Item to the total number of ItemSelectors is less then $1/32$, the ItemSelector vector implementation uses less memory than the Bitmap. Additionally, the Bitmap implementation needs a compiler and system optimized for fast bit manipulations and access—otherwise response times are faster using the ItemSelector vector approach.

Within the vector approach, still faster response times, at the expense of double the memory required, can be assured by using the Double Matrix implementation with two arrays of vectors: an ItemSelector Vector array and an Item Vector array.

Alphabetical Sorting: All lists and sublists of Items and ItemSelectors need to be presented in some order, usually alphabetical by name. To avoid sorting, which for long lists can delay responses, the data structures can use added pointers, each pointing to the next alphabetical entry, as is usual in linked list type structures. Such structures effectively maintain the alphabetical order, even when new Items or ItemSelectors are added out of order, through the well known method of insertion into a linked list. When the user needs to see listings in several different orderings, several different pointer sets can be maintained to make re-sorting unnecessary.

Another important issue related to sorting is the time it takes to import a large database. In such an import operation it must be assumed that the Items are imported in no particular order. As they are imported, they are assigned successive ID numbers. When the operation is completed alphabetical ordering will need to be assured in both Items and ItemSelectors. Sorting of very large lists is quite time consuming. Therefore the design tries to avoid sorting, and maintaining sort order through links pointing to the next item.

Client-Server Architecture: In describing the software engineering design details, we shall assume that the software will be architected as a Client-Server, where the majority of the searching, table look-ups, and other processor and memory intensive work is done by the server, the client being almost entirely the vehicle of the GUI and the data presentation.

When a stand-alone system is required or preferred, the design can still usefully be split into those two parts, keeping the two functionalities quite separate, allowing for maximum reusability of the code of the server portion, with the addition of different interfaces for different applications. This assumption of Client-Server architecture therefore does not limit in any way the applicability of TIE to stand-alone implementations.

Such a separated arrangement has many advantages in both the Client-Server and stand-alone modes, because the Server portion can easily be made quite general, with all specifics confined to the Client part. Therefore when a new application is needed, only the Client part need be changed. For the Stand-alone application a model can be designed in which the Server part can take "plug-ins" of different client parts, for different diverse applications. When the Server is made available over the Internet or Intanet, one server can serve many differently interfaced Clients, each presenting the data in a different way.

Dual Architecture: It is also possible to combine the Stand-Alone and the Client-Server architectures in the following ways. The Stand-Alone version could contain the complete Matrix data on a local disk but need not rely on a local copy of the actual detailed Item data, particularly if that data is too large. This makes the response to each click on ItemSelectors very fast and only needs connectivity to the server when you want to read the Item details. This combined arrangement, whether including local Item Data or not, is very useful for situations where connectivity to the server is difficult or slow. With such a dual arrangement connection to the server could be used to transfer any changes in the Server data. In most applications such connections need only be made infrequently, when the user is not going to be inconvenienced by a slow connection.

With the arrangement where the Item data details are non-local, the updating requires a minimum of connection time because the amount of data changed is usually quite small. Even when all the data has changed, the amount of data to be transferred, in all but the most demanding applications, can be practically handled with a relatively slow modem in a matter of an hour or two of connection time.

For example, when the data involves, say 100,000 Items and the average number of ItemSelectors per Item is say, 20, the total Matrix data uses about 8 MB. But this does not include the Item names. These can use an additional 4 MB. So a complete data transfer (very rarely needed) from the server to the client would use 12 MB and on a slow 14,400 BD modem would take about 2 hours to transfer. Designing the Server for optimum data transfer rate can also considerably reduce this transfer time.

Such a Stand-Alone & Client-Server application would be ideal when quick access to data is needed in the field. It could be used on a Laptop Computer with instant response, allowing even daily updates back at the office or immediately by wireless modem in the field.

Communication Protocol: Communication between the Server and Client can use any standard or custom protocol. When the implementation is not stand-alone, the choice of this protocol can influence the responsiveness of the system to user actions. It should therefore be designed to minimize both the number of communication sessions and the data exchanged during each. In current implementations, communication on top of HTTP has been found to be satisfactory and most compatible with various fire-walls when used over the Internet. A special kind of additional protocol may be useful when a large amount of data needs to be transferred, as in the combined Client-Server & Stand-Alone implementations.

Implementing the Matrix: There are many possible ways to implement the matrix. In most applications the user filters the wanted data from all available data by successive choices of ItemSelectors. It is therefore natural to think of the matrix as an array of ItemSelector (row) vectors. Frequently the logical operations to be evaluated are Booleans linear in ItemSelectors. In these Boolean expressions, the Boolean AND is the most common operator between ItemSelectors because practice has shown Conjunctive ItemSelectors are more frequently used then Disjunctive ones in the common data queries. For these reasons the structuring of the Matrix as an array of ItemSelector Vectors is most appropriate.

Sometimes it is necessary to also evaluate Booleans linear in Items. To optimize these, and to optimize the calculation of the available ItemSelectors, the Matrix can be stored also as an array of Item vectors. Storing both an array of ItemSelector vectors and one of Item vectors (redundantly) may be a useful arrangement when speed is critical and the extra RAM is available. When an array of ItemSelector vectors is used only, we refer to it as the single Matrix implementation. When both ItemSelector and Item vectors are used, we refer to it as the Double Matrix implementation, as each of these arrays represents the same Matrix.

There is of course also a Bitmap implementation. When conditions warrant, this is the most direct implementation. The Matrix information is held in a double array of bits, effectively a Bitmap. This allows relatively easy access to both the binary ItemSelector Vectors, as rows of the Matrix, and binary Item Vectors as Columns. These can then be easily used in Booleans and the Booleans evaluated by using the bit Boolean operators. These Binary Vectors are different structures then the previously mentioned non-binary vectors, though they hold the same information.

Despite the seeming simplicity of the bitmap implementation, accessing the bits of each element of the double-array is quite awkward because the smallest elements of an array when implemented in any high-level language are bytes. Additionally, every bit must be checked, whereas in the equivalent Vector implementation, only the equivalent of the "Set" bits needs to be checked.

When implementing the bit-array, it is therefore also necessary to choose an orientation or alignment of the array to take advantage of the 8 bit wide byte structure of the memory. Because the calculation of the available ItemSelectors is the most time consuming task, and it is most efficiently done looking along the Item direction of the matrix, we normally byte-orient the double array, so to speak, along the Item (column) direction. That is, an Item bit vector is an array of bytes, each byte holding 8 bit elements of the ItemSelector bit Vectors are not as simple. ItemSelector bit Vectors are also arrays of bytes, but only one bit in each byte contributes to any Vector component. To access a particular ItemSelector vector, therefore, we need first to know which byte array element it is in and then which bit of that byte corresponds to the ItemSelector.

Figure 7:
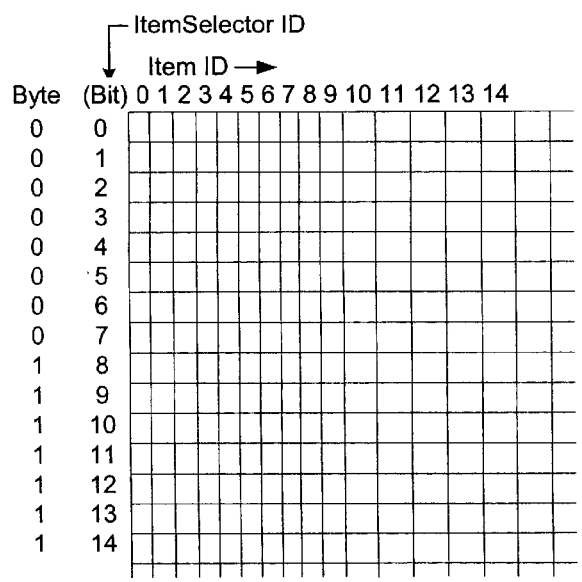
FIG. 7 shows a matrix providing associations between Items and ItemSelectors in a bitmap.

This is illustrated in the matrix shown in FIG. 7. Each individual box of the matrix is a memory bit. The row numbers may be conveniently used as equal to the ID numbers of the ItemSelectors that are referenced by the vectors of the matrix, while the Item IDs may be equal to the column number. The matrix thus has a bit at each possible combination of Item ID and ItemSelector ID. A particular state (e.g., 0) of the bit that matches both Item ID and ItemSelector ID indicates a relationship between them, while the opposite state (e.g., 1) indicates there is not relationship.

In the orientation shown, each byte of information contains information about 8 ItemSelector IDs and one Item ID, which is convenient for processing in many cases. The Byte array indexes are the same as the Item IDs, so that there are as many columns as there are Items.

On the other hand, there are (within round-off) 8 times as many ItemSelector IDs as there are ItemSelector array indexes. For example, referencing both the bits in the bit array and the bytes in the byte array, by giving the column or Item number first: bit (5,1) is within byte (0,1) and within that byte it is the $6^{th}$ bit (or bit #5 if the first one is bit #0). Similarly, bit (9,3) is within byte (1,3) and within that byte it is bit #1 or the $2^{nd}$ bit (bit #0 being the $1^{st}$ bit).

Such a byte orientation along the Item or row direction makes for a more efficient Boolean evaluation of Item vectors, because each component of the vector is 8 bits that can be operated on with Boolean operator in one go. In addition, when searching for non-zero bits, each can be checked and if it is zero, individual bits do not need to be checked. In most applications the great majority of the bits are zero, so that many bytes will also be zero saving on search time.

It is also possible to use arrays of integer (rather than byte) allowing the processing of 32 bits in one operation. Whether this further speeds the processing is dependent on the nature of the data and experiments would need to determine this. However, in most applications the average density of set bits in an ItemSelector vector is considerably less than 1 in 8 but often not much less than 1 in 32. This suggests that the time saving due to empty bytes is likely to be greater when bytes are used than if integers are used.

Evaluating Boolean Expressions of Vectors: Boolean expressions in ItemSelector Vectors when evaluated result in an ItemSelector Result Vector (CRV) whose components are Items, their set being the Item Selected Set (ISS). Corresponding to this ISS is the ItemSelector Selected Set (CSS) which, at least is the case where the Boolean consists of Conjunctive ItemSelectors only, is the union set of ItemSelector components of each of the Item Vectors in the ISS. Members of the CSS are the components of the related Item Result Vector (IRV) and represent the Available ItemSelectors.

Similarly, Boolean expressions in Item vectors, when evaluated, result in an Item Result Vector (IRV) whose components are ItemSelectors, their set being the ItemSelectors Selected Set (CSS). Corresponding to this CSS is the Item Selected Set (ISS), which is the union, set of Item components of each of the ItemSelector Vectors in the CSS. Members of the ISS are the components of the related ItemSelector Result Vector (CRV).

In the ID number ItemSelector Vector implementation, in which the non-binary vector structure is used, the user can choose to use either the single matrix, or the redundant double Matrix system which gives a faster response at the cost of doubling the memory required. The ratio of response times for the two approaches is approximately one-half the narrowing factor, which is usually at least an order of magnitude.

In the simplest implementation using the Bitmap to store the Matrix, ItemSelector Vectors are binary row vectors and Item vectors are binary column vectors. When the ItemSelector Boolean contains Disjunctive ItemSelectors from different Disjunctive sets, the calculation of the Available ItemSelectors is a little more complicated. The following normal rules apply.

When any ItemSelectors are selected from a Disjunctive group, the Available ItemSelectors in that group are the same as if no ItemSelectors were selected in that group, but all other selected ItemSelectors were the only ones selected. Therefore, to obtain the Available ItemSelectors when selections from several Disjunctive groups are made, the server will need to evaluate a different Boolean query for each Disjunctive group from which selections were made.

For example, suppose A, B, C are Conjunctive ItemSelectors (from one or more groups—it does not matter). Suppose further that a, b, are Disjunctive ItemSelectors from Group 1, and that c,d are Disjunctive ItemSelectors from Group 2. Suppose now that the user chooses ItemSelectors A,B,C,a,c. The query Boolean is: A*B*C*a*c. The IRV resulting from this query, is used only in determining the Available ItemSelectors from all the Conjunctive Groups, and any Disjunctive groups whose ItemSelectors are not one of those selected ones. The Boolean query that will give the IRV with the correct Available ItemSelectors in Group 1 is A*B*C*c. The Boolean query that will give the IRV with the correct Available ItemSelectors in Group 2 is A*B*C*a.

Similarly, if in addition the user selects ItemSelectors b and d, the Boolean A*B*C*(a+b)*(c+d) will give the CRV list of selected Items, and the IRV which contain the correct Available ItemSelectors for all groups except Groups 1 and 2. Again the Available ItemSelectors in Group 1 require a Boolean which omits Group 1 ItemSelectors, namely A*B*C*(c+d) and the Available ItemSelectors in Group 2 require a Boolean that omits all ItemSelectors from Group 2, namely A*B*C*(a+b).

The server can deduce the type of ItemSelector Group of each ItemSelector within those Disjunctive Groups that have more than one ItemSelector selected and therefore present in the Boolean query. For those Disjunctive groups from which only one ItemSelector is selected, it is easiest for the Client to send the server the information that individual ItemSelectors are Disjunctive.

ItemSelector Vectors: In what follows we describe the single Matrix implementation details using ItemSelector vectors only, because when two Matrices are used, the procedures for corresponding evaluations are simpler and use the ItemSelector-Item transpositions. In the single Matrix implementation, all Boolean operations, whether involving ItemSelector vectors or Item vectors, have to be performed in terms of ItemSelector Vectors, and that is why we detail the functions that perform these operations in terms of ItemSelector vectors only. The bit-map or bit-array alternative implementation is detailed in section 10.

Evaluation of Boolean Expressions of Vectors: Here we define and explain the meaning of the evaluation of Boolean expressions of vectors. Definitions are in terms of the Bit Map implementation because they are easiest to see and can be easily translated into the ID Number Vector implementation. First assume the vectors are binary vectors, all of the same size. Any Boolean combination of two binary vectors results in a binary vector that is the bit Boolean evaluation of corresponding bit components. This implies following method of evaluation.

Two binary vectors are stored as binary representations of integers and their bit "OR", bit "XOR" bit "AND", bit "AND NOT" can be evaluated to give the resulting binary vector. More generally, any Boolean expression, involving any number of vectors, can be evaluated by similarly converting each vector to a binary representation of an array of bytes, and then evaluating the Boolean expression as a resulting array of bytes using the Boolean bit-wise operators between corresponding byte components, then converting the resulting array of bytes back to an ID number vector as necessary.

In more detail, a bit array, or bit vector, is stored as an array of unsigned bytes. If the number of components in the bit vector is p, the number of elements needed in the byte array is the smallest whole number larger than or equal to p/8. Suppose the byte arrays representing bit vectors are A[ ] and B[ ] (that is, each byte represents 8 bit vector components) and that the Boolean "A and B" designated as A*B needs to be evaluated. The evaluation process would result in a new binary vector represented by the byte array C [ ], all three arrays (A,B,C) being the exact same size. The array C is given simply by C[i]=A[i] & B[i] for all values of the index i, where the "&" means the bitwise "AND." So the simple C code that will do this is:

```
for (i = 0; i <= i_last; i++) {
    C[i] = A[i] & B[i];
}
``` where i_last is the last index of each array. Similarly, if the Boolean operator between the vectors is an "OR" the result vector would be given by the same expression but with the bit-wise "&" replaced by the bit-wise "|" Negation also translates into the simple negation bit operator "!"

This description can be used both for purposes of definition and evaluation. It describes a simple algorithm for evaluations of Booleans when the Bitmap representation is used. When the ItemSelector ID# Vector representation is used, evaluations of these Booleans are described in section 9, however they could also be evaluated using this bit method by first converting each Integer array vector to a bit vector, though that is not the optimal method for the fastest performance.

Using Ordered Arrays: If, instead of binary vectors we use ordered arrays of ID numbers, which we refer to simply as ItemSelector or Item Vectors, for certain implementations there are two potential advantages. First, in most applications this implementation saves required RAM, because the number of the non-zero elements of the binary vectors is a very small fraction, almost always smaller then $\frac{1}{32}$ of the total number of elements in the binary vector.

Second, in tests on a Windows platform using Visual C++ as the programming language, bit manipulations were found to be relatively slow, making the evaluation of bit Booleans and the extraction of the ID numbers corresponding to the non-zero elements, result in a slower performance. Faster access and bit processing may be achieved if assembly language is used for those critical parts. However, when processing Boolean using the bitmap implementation every bit needs to be checked and this itself contributes to a slower performance as compared to the ordered array implementation.

The Ordered Array Vector: We will refer to the ordered array also as a "Vector" in the sense that it is an array of components, though it must be understood that the number of components is not fixed, as it would be in a true vector and as it is in the case of the binary vector. In this representation, we have two ways of implementing the total Matrix data: we can implement it as an array of ItemSelector Vectors, or alternatively as an array of Item Vectors. Each ItemSelector Vector has components that are ordered ID numbers (values increasing with index) of the Items assigned the ItemSelector. Each Item Vector has components that are the ordered ID numbers (values increasing with index) of the ItemSelectors assigned to the Item.

Component Set: It is convenient sometimes to also regard the components of each such vector as a set, in which case we will refer to it as the Component Set. Boolean operations can then be expressed as equivalent set operations. Because the ID components are ordered, any Boolean expression involving the comparison of two such vectors is very fast. Simple algorithms for performing Booleans using the ordered array vector are given in what follows.

ItemSelector & Item Vectors: The components of an ItemSelector vector are Items (those to which the ItemSelector is assigned) and the components of an Item vector are ItemSelectors (those assigned to that Item). We define Boolean operations between ItemSelector Vectors and Item Vectors. The components of an ItemSelector Vector are Items that are Selected (or filtered) by that ItemSelector.

The result of a Boolean expression of ItemSelector Vectors is another ItemSelector Vector. The meaning of this new Result ItemSelector Vector is that it Selects (or filters) the same Items as the Boolean expression. This is best illustrated with an example. As usual, we will use the star "*" to indicate the Boolean "AND" and the plus "+" to indicate "OR."

Let $C_1$, $C_2$, be ItemSelector Vectors, then the ItemSelector Result Vector CRV, given by:

$$CRV=C_1*C_2$$

is an ItemSelector equivalent in its Item Selection properties to the Boolean $C_1*C_2$. Put another way, the CRV selects those Items that have assigned to them both ItemSelector $C_1$ and ItemSelector $C_2$. Therefore in Set Theory language, the Component Set of CRV is the Set $C_1 X C_2$, that is the intersection of the two sets, also called the Selected Item Set. (This example also shows the equivalence of the conjunctive Boolean "AND" evaluation and the intersection of the corresponding component sets.)

Associated with the CRV is the corresponding Item Result Vector (IRV) whose components are the Available ItemSelectors, that is, those ItemSelectors any one of which can be further added to the Boolean fruitfully—meaning that after the addition, the resulting CRV is non-null.

IRV can be expressed concisely in terms of a Boolean of the Item Vectors from the Component Set of the CRV as follows. Let the Component Set of the CRV be $(I_1,I_2,I_3,I_4, \ldots )$ which is also the Selected Set, then:

$$IRV=I_1+I_2+I_3+I_4+ \ldots$$

or in set theory language, the IRV Component Set is the union of the sets of the Selected Items Components. Corresponding relationships can be expressed beginning with a Boolean of Item Vectors.

First ItemSelector Selection: The Client displays an interface allowing the user to select ItemSelectors. When the first ItemSelector is selected, the Client sends that ItemSelector's ID to the Server and the server sends back the ItemSelector Result Vector (CRV) (which for the first ItemSelector selected is just the ItemSelector Vector), and the Item Result Vector (IRV). The Component Set of the CRV is the set of Items which have the selected ItemSelector assigned to them. These Items will also be referred to as the Selected Items.

The Component Set of the IRV is the union set of ItemSelectors assigned to all of the Items in the CRV (i.e. to the Selected Items). Although this is a good, general definition of the IRV in terms of the CRV, we need another, equivalent definition, entirely in terms of ItemSelector vectors, because that is needed when using the one Matrix implementation, that is, using only the array of ItemSelector vectors.

Subsequent ItemSelector Selections: Two different approaches are possible when the user selects ItemSelectors incrementally. In the first, after each additional ItemSelector is selected, the Client sends the whole set of selected ItemSelectors as a Boolean expression in ItemSelectors. In the second, the Client sends only the previous CRV (as a list of Item IDs) and the IRV (as a list of ItemSelector IDs) and the additionally selected Conjunctive ItemSelector. This approach is only possible when the added ItemSelector is Conjunctive. This second approach leaves less work for the server to do, providing a faster response, but its advantage must be weighed against the slight extra communication delay of a longer request. The Server responds with the CRV, which is the evaluated Boolean expression, and the IRV defined above.

Server Boolean Queries: In general any Boolean expression can be sent by the Client to the Server. The Boolean expression can be linear in ItemSelectors, or for more advanced applications, also Linear in Items, A Boolean in ItemSelectors is equivalent to a search for Items whose ItemSelectors satisfy the Boolean. The Boolean in Items, reverses the roles of ItemSelectors and Items and is equivalent to a search for ItemSelectors assigned to the Items in the way implied by the Boolean.

For example, using Capital letters to designate Items and lowercase letters for ItemSelectors $$a*b*(c+d)$$

sent to the Server will return the CRV whose Component Set is the set of Items that have assigned to ItemSelectors a and b and either c or d, and the IRV whose Component Set is the union set of ItemSelectors assigned to all the Items in the CRV. The IRV will include the ItemSelectors a, b, c and d, but in general may also include others.

Similarly the Item Boolean:

A*B*(C+D)

sent to the Server will return the IRV whose Component Set is the set of ItemSelectors that are assigned to Items A and B and either C or D, and the CRV whose Component Set is the set of Items selected by those ItemSelectors in the Component Set of the IRV. This set will include the Items A, B, C and D, but may also include other Items. The other Items will in general be on related topics. So having found a group of Items, this feature might be used to find related items directly. Let the set of ItemSelectors or Items which form the Boolean expression be called the ItemSelector Boolean Set and the Item Boolean Set respectively.

Calculating the IRV: The IRV is calculated from the current CRV in the following way. The ordered list of Item IDs from the CRV (the Selected Items Set) is used to test each ItemSelector Vector for the presence of any of its component Item IDs. The IDs of those ItemSelectors which pass that test form the IRV. This requires one pass through all ItemSelectors, excluding all ItemSelectors in the Boolean Set, although this exclusion can be omitted with only negligible performance consequences.

When several related Booleans are being evaluated (such as is needed for evaluation of Booleans involving one or more Disjunctive ItemSelector groups), the evaluation of the different IRVs can be optimized by proceeding from the least restrictive Boolean to the most restrictive one and using the IRV result of the previous Boolean to limit the searches through ItemSelector Vectors of the previous IRV.

When the IRV is being evaluated, counting can be carried out of those Items, associated with each available ItemSelector, which are members of the CRV set. Therefore, each ItemSelector selection results in two operations: one short (calculating the CRV), the other longer (calculating the IRV). The longer one involves one complete pass through all the ItemSelector vectors. When the two Matrix implementation is used, this longer process is speeded up considerably. The first selected ItemSelector defines the starting ItemSelector vector that becomes the initial CRV. Before any selection of ItemSelectors is made, the initial IRV Component Set is the set of all ItemSelectors. This means that the first ItemSelector selection response is the longest.

Program Overview & Communication Protocol

The Client functions comprise the following:

i The parsing of the server responses.

ii The communication of user actions as requests to the server.

iii The user interface of controls and displays.

iv The display of information to the user.

The last two of these are specific to the particular application and so are custom designed, the details being different in every case. The only way to give some details of these is to describe how they might be implemented in an example. The first two are quite general and can be detailed independently of the particular application.

Client server communications over HTTP are best carried out by sending and receiving simple ASCII text strings. Therefore the parser consists of a string token identifier implemented as a finite state automaton. The simplest implementation will serve our purpose, so we choose one that has the minimum of contextual dependence and is modeled on the unix shell commands.

Server & Communications Protocol: The Client-Server protocol for TIE will be called GIATP. It can be divided into three main functionalities: Getting Data, Adding new data, and Deleting existing data. The details of the GIATP presented here are by way of illustration of a practical implementation. Other implementations using different protocols could achieve similar results. All that is required is that the server be able to respond to a Boolean query in ItemSelectors, the response comprising the following information:

i The Selected Items ii The Available ItemSelectors

Exemplary Implementation: Communication is initiated by the Client. Each request begins with a keyword token. The following are the three tokens and their meanings:

get general command for getting Current Match or CRV, Current Choice, or IRV, and retrieving Items, ItemSelectors etc.

add adding Items and ItemSelectors, assigning ItemSelectors to Items etc.

del deleting Items, ItemSelectors, removing ItemSelectors from Items

All communication about Items and ItemSelectors uses the Item or ItemSelector ID number. Initially, however, the Client has to create its tables relating the ID numbers to the names of ItemSelectors. This is done by sending the request to the server but without the Time Stamp.

Item names are usually requested of the server as needed and in small numbers, but usually initially all ItemSelector names are needed for the user to choose from.

In cases where the number of ItemSelectors is large, it is an advantage to limit the number of ItemSelectors sent to the Client. This can be done by limiting the ItemSelector list to those in a subset that can be specified through Group ItemSelectors.

ItemSelectors can only be assigned to Items. However, it is sometimes useful, as in the case just mentioned, to use Group ItemSelectors to limit the rest of the ItemSelectors. When a database is fully populated with Items classified according to ItemSelectors, the Group ItemSelectors will be connected to all of their members through the Items—that is because for each member of a Group ItemSelector there will always be at least one Item which will have assigned to it both the Group ItemSelector and the member ItemSelector. Such a connection then is equivalent to the classification of all members with the Group ItemSelector.

However, this does not hold when the database is not populated fully (in that sense). Therefore a method needs to be devised to make sure that all ItemSelector Group members are connected to the Group ItemSelector through at least one Item. The simplest method of achieving this is to create one virtual Group Item for each group to which the Group ItemSelector and all the ItemSelectors in the group will be assigned. The server then must know not to count these virtual Items in any Item counts and the Client must know to ignore them in any displays.

The virtual Items need to be easily identified as such by both the Client and the Server. An easy way to achieve this (though by no means the only way) is to reserve Item ID numbers from 0 through say 999 for these virtual Items. Then the Server and Client can be programmed to ignore any Item ID in that range. Another way is to note in the look-up table of Item Names, that an Item is a virtual one and to communicate this to the Client when necessary. One simple way to achieve this is to reserve the first 100 or so ID numbers for such virtual Items IDs.

An alternative, cleaner way to achieve the classification of ItemSelectors is to extend the Matrix connecting Items to ItemSelectors by adding all the ItemSelectors as additional, though special Items. However, when the number of ItemSelectors is large, which is precisely the situation that may need Group ItemSelectors, this method unnecessarily increases the number of Items. This may not be important because, except for a new database just being filled with data, the number of Items is always at least an order of magnitude larger than the number of ItemSelectors.

The server response to the first request includes a detailed time stamp, which the Client needs to keep and send with most requests, for the duration of the session. When a request is sent to the server, the Client can include this time stamp that tells the server that there is no need to send ItemSelector names, provided that the time stamp indicates that all data is still current. When ItemSelector or Item data is changed in any way, the time stamp is changed to the time and date of the change and any client sending a request with the old time stamp will receive the updated list of ItemSelector and requested Item names.

Details of Requests: A request always consists of single line of text. If more is sent the server ignores the rest, however requests can be grouped together. This is described in the section on Group requests. The request must begin with the keyword for the type of the request, for example probably the most common request type is one requesting information:

get—(Type of request, followed by space then a dash which proceeds each option as explained below.)

Request types are case insensitive. The type is followed by a number of options. Each option is a single letter, and is case sensitive. Some options have modifiers and parameters, others do not. The general form of request is given below (the new line character must terminate the request):

type<SP>—option_1[option_1_modifiers<SP>option_1_parameter]<SP> . . . option_n<SP>[option$_{13}$ n_modifiers<SP>option_n_parameter]

where <SP> stands for a space and there is no end of line or return until the end of the complete request.

Request Options: The list of options, their modifiers and their meaning in context of the get request is given below. These are used in requests by the client and they are also used in responses by the Server to designate what is being sent.

i Request for item (or items). This is followed by any of the following modifiers, then a space and then, space delimited, the ID numbers of the items.

n forces server to append name of item to response t server responds appending type of item s forces server to send stuff or contents of the item k server response includes kind of item. Types (kind) of items, such as a URL or actual data and its type, text or HTML.

c Request for ItemSelectors. Modified by the following modifiers:

g appends group number of ItemSelector to response.

n forces server to append name of ItemSelector to response d Request for database name.

f Specifies filter. Must be followed by a list of ItemSelector IDs, delimited by spaces, defining a filter.

h information about browser, operating system, FQDN and IP address l (Lowercase L, for length) Specifies number of items to be sent. Must be followed by a number that is the count of items to be sent.

o Specifies offset to first item that will be sent. Must be followed by a number that is the zero based integer offset in base 10.

s Request for list of ItemSelectors. Similar to option c, with the same modifiers. In addition you can use the Group number request modifier "g" so that for example the request: −sng asks for the list of ItemSelectors, including their names, IDs and Group numbers.

t Specifies the client time stamps. Must have parameter set of client time stamps.

u Request for unclassified items.

v Forces server to add verbose string to header of response.

Server Response: The Server response is ASCII text, divided into two parts: the header and body, separated by an empty line of text. The header consists of a number of lines of text, or header fields. Each field is terminated with a new line. The first field is always a response status line (the response format is similar to HTTP response) of the form:

GIATP/Major_Versionr.Minor_Version Status_Code [Explanation]

The currently used status codes and meanings are as follows:

200 OK—request has been accepted, and correctly processed

250 Update—request has been accepted, but given times tamp was not actual—the new list of ItemSelectors, and TIE time stamp are sent 350 Expired—like 250, but for requests of item contents—no list of ItemSelectors or of time stamps is sent 400 Bad Request—request was incorrect—header contains line of text beginning with "error=" followed by an explanation of the error 401 Unauthorized—client does not have sufficient privileges for access to the data 404 Not Found—requested item cannot be found The second response field is Content-Length, which gives the length, in bytes of the body of the response. Its form is simply:

Content-Length: length_of_body: All requested information from server is placed in the body of the response which follows the header, when that is terminated with a blank line (that is, two new lines). The length_of_body gives a count of the number of characters in the body of the response. The count begins with the first significant (non-white-space) character of the response body, so it does not include the <NL> characters ahead of the body nor those <NL>s terminating the body, nor any spaces that the server may spit-out at you on the blank line preceding the first line of the body. Therefore when picking up the response, you should begin with the first character following the second <NL> following the header and end when the accumulated character count equals the length_of_body count. Any characters may be sent in the response.

Response Body: If your request does not include a valid time-stamp, the response will include it and further, will include the name of any Item or ItemSelector in the response. This means that if your request does not contain a valid time stamp, the server will treat your request just like the first request of a session. The format of the body of the response depends on the request. However, the following describes how the response can be interpreted.

The most common request sent to server is of the type:

get -c -itn -f filter -o offset -l item_count

Server responds sending the current times tamp, this validates ItemSelectors and Item IDs. The general form of such a response is:

-t|time_stamp|-c|count_of_ItemSelectors|ItemSelector_ID_list|-itn|count_of_matching_items|count_of_items_beng_sent|item_ID|item_type|item_name A vertical line is used as a separator between parts of the response. Each response is preceded with a repeat of the request, indicating the nature of the response. When the ID of an ItemSelector begins with a leading 0, the ItemSelector is insignificant, which means that ANDing it with the already selected set will not change the listed Items.

The second common type of request is for a specified item:

:get -i[n]s item_ID.

Server responds with:

-t|time_stamp|- i[n]s|1|1|item_ID|item_name|item_type|stuff_length|actual_Item_content

To avoid repetition, the first example below is the only one in which the header is shown.

EXAMPLE 1

The request "Give me unclassified items" and no time stamp is sent.

Request get -u response

GIATP/1.0 200 OK

Server: Nisus GIAServer/1.0

Content-Length: 3728 g-u

GIATP/1.0 250 Update

Server: Nisus GIAServer/1.0

Content-Length: 3728

-t|33a81f05_b4e88_33a87f17_ec540_33a87f17_ec540|- sng|275|9|0|38|53|Adult Situations|54|Adults Only|275|Adventure|55|Affairs|60|

Animals|61|Animated|63|Anthology|66|Arts|68|Auto|69|Awards|72|Ballet|73|Baseball|74|Basketball|75|Beauty|77|Billiards|78|Biography|80|Bodybuilding|81|Bowling|82|Boxing|85|Business|95|Classic|96|Collectible|97|Comedy|98|Compute|99|Cooking|100|Crime|103|Dance|107|Documentary|100|Drama|114|Eating|117|Electronic|118|Exercise|122|Fantasy|124|Fashion|125|Fiction|126|Finance|230|Show|276|UFO|1|37|127|Fishing|128|Football|129|Foreign|131|Fund|132|Game|133|Garden|137|Golf|138|Gymnastic|142|Health|143|Help|144|Historical . . . |-i|0|0

The above abbreviated actual response from a working server of a TV Guide database, shows the following:

Header: The lines are self-explanatory. The last line gives the length of the subsequent part of the response in bytes, as a decimal number. The count of characters begins with the two new lines (each counts as one character, even though each is two bytes under Windows).

Body: The body begins with the time stamp. The first two characters, that is "-t" followed by the vertical line delimiter, indicate that the time stamp follows. The Time stamp ends with the next vertical line delimiter. Time stamp characters are all lowercase and only characters used in hexadecimal digits, plus the underscore will be present. After the time stamp, the implied request "-sng" is echoed indicating what is to follow, namely a list of ItemSelectors, their names and group numbers. Here is how the details work out:

275 means that there are a total of 275 ItemSelectors to follow 9 means that there are 9 ItemSelector groups (groups 0–8)

0 means that the group number to be listed next is group 0

38 means that there are 38 ItemSelectors in this group 53 is the ID number of the next ItemSelector followed by its name.

Following that is the name "Adult Situations" as the ItemSelector with ID number 53. Then follows the next ID number followed by the ItemSelector name and so on until all 38 of Group 0 ItemSelectors have been listed.

Then begins the Group 1 listing, third line from the end, with . . . |1|37|127|fishing|. . . As before, the first number is the group number (1), the next number is the count of ItemSelectors in this group (37), then next is the ItemSelector ID (127) followed by the ItemSelector name (fishing). And so on, through all the ItemSelectors and all ItemSelector Groups. (To shorten the listing here we have omitted most of the remaining ItemSelector listing and replaced it with ". . .".) Ending the list is the real response to the query posed "List the Unclassified Items." It begins naturally with the Item designator "-i" followed by 0 for the number of Items matching the request and another 0 for the number of Items being sent. Although the ItemSelector List was not requested, it was sent anyway, because the request did not include a time stamp.

EXAMPLE 2

The request "Give me the name and contents of item ID 123 and the name of ItemSelector ID 10." Here we also assume the time stamp sent is current and we omit the header:

request:

get -ins 123 -cn 10 -t :33a81f05_b4e88_33a87f17_ec548_33a87f17_ec540 response:

-ins|1|1|123|<Name of item_123>|<Contents_of_Item_123>

(The request and response are each a single line of text, but because of space limitations they are here displayed on two lines each)

EXAMPLE 3

The request "Give me names of all ItemSelectors"

-request:

get -cn -t :33a81f05_b4e88_33a87f17_ec548_33a87f17_ec540

-response:

-cn|3|1|cat1|2|cat2|3|cat3 . . .

Describing this response in words, assuming no ItemSelector groups are used:

1 First you have the command repeated (-cn) telling you what was requested and so what will follow (if ItemSelector Groups were used, the response would show "-cng")

2 Then you get the count of ItemSelectors to be sent.

3 You have 1, indicating the first ItemSelector ID.

5 Next you have the ItemSelector name, because you requested it

6 Then the ID_number-Name of ItemSelector sequence repeats for the next ItemSelector 7 . . . and so on.

The whole list ends in a new line. The foregoing example shows ItemSelector IDs in order, which may not be the case. ItemSelectors are sent back usually in alphabetical order of name, which does not need to be the ID number order:

EXAMPLE 4

Request: get -i

Response (omitting header): -t|33a81f05__b4e88__33a87f17__ec548__33a87f17__ec540|-sng|316|6|0|1|10|Product|1|16|100|Cameras|171|Clothing|114|Coins||. . .

Explanation:: The request was for Items, with no parameters and no time stamp. The response begins with the time stamp and then has the "-sng" which means list of ItemSelectors, their IDs, their Names and their group number. The response begins with the number 316 that represents the total ItemSelector count. Next is the number 6, which represents the number of ItemSelector Groups. The number 0 represents the first Group ID. Groups have IDs beginning with zero. Next is the number 1, which represents the number of ItemSelectors in the first group. Next is the number 10 which is the ID number of the ItemSelector whose name follows—in this example the ItemSelector is "Product."

As there was only one ItemSelector in the first (0) group, the next set of numbers refers to ItemSelectors in the next group, that is Group ID 1. The first number is the Group ID, namely 1. Following that is the number 16, which is the total number of ItemSelectors in this group. Next the number 100 is the ID number of the first ItemSelector in this group, followed by its name. And so on.

Request: get -in -cn

Response: -t|<time__stamp>|-sng|<ItemSelector group listings>|-in|<first 20 items listing>

The various listings, in detail as follows:
<time__stamp>structure is described below.
<ItemSelector group listings>=|<Total Number Of ItemSelectors>|<Number of Groups>|<Group ID Number>|<Number of ItemSelectors in this Group>|<ItemSelector ID Number>1<ItemSelector Name>|<Group ID Number>|<Number of ItemSelectors in this Group>. . . etc. until listing of this group completed. Then the next group listing, in the same format continues, until all groups have been listed. Then:|-in|and:
<first 20 items listing>=<Total Number of Items>|<Number of Items to be listed next>|<Item ID Number><Name of Item>|<Item ID Number>|<Name of Item>|. . . etc until the stated Number of Items to be listed is completed.

Currently, the number of Items sent in this situation is always 20.

Filters: Request: get -in -cn -f 123*124 -t 33a81f05__b4e88__33a87f17__ec548__33a87f17__ec540

This asks for the Item Names and ItemSelector Names following a filter of two ItemSelectors: ID numbers 123 and 124. The star "*" between the ItemSelector ID numbers means a Boolean AND, that is the request is for the match of all items that have both ItemSelectors assigned to them. The request supplies the Time Stamp, as it must. The response is:

-cn|<Number of ItemSelectors to follow>|<ItemSelector ID Number>|<ItemSelector Name>|<ItemSelector ID ZNumber>|ItemSelector Name|. . . etc till all promised ItemSelectors are listed. Then |-in|<Number of Items Selected by the Filter>|<Number of Items to follow in list (currently max of 20)>|<Item ID Number>|<Item Name>|<Item ID Number>|<Item Name>|. . . until all promised Items are listed.

Because a filter is supplied, the only ItemSelectors that are listed are the "Available" ItemSelectors, that is those that should be available for the user to select from and further narrow the listing. The same applies to the Items: The only ones listed will be the first 20 (in an alphabetical list) of those that were selected by the filter.

Note: Other Boolean filters can be used. The plus "+" is used to designate the Boolean disjunctive OR, the exclamation point "!" for the negation operator NOT and parentheses can be used for more complex expressions.

Request: get -i -c -f 123*124 -t 33a81f05__b4e88__33a87f17__ec548__33a87f17__ec540

This is a similar request to the previous one, except that no names are requested. Because almost no text has to be sent back, the response to this is much faster then to the previous request. The client would need to know at least the names of the ItemSelectors corresponding to each ItemSelector ID number—something usually sent after the first request. Such a request would be appropriate in applications that do not display the Item names—just their count—until the user chooses to have them shown, presumably when their number has been reduced to a reasonable count.

The response is very simple: -c|<Available ItemSelector Count>|<ItemSelector ID>|<ItemSelector ID>|. . . etc. till all of the Available ItemSelectors have been listed. Then |-i|Item Count of Selected Items>|<Item Count of Items To Follow (Currently max of 20)>|<Item ID>|<Item ID>|. . . till all promised Item IDs are listed.

Suppose now that you wanted to get the names of the Items also in the Previous request. Then all you have to do is add the modifier "n" to the "-i" request. For example, Request: get -in -c -f 123* 124 -t 33a81f05__b4e88__33a87f17__ec548__33a87f17__ec540

Try it, and see the response. The only difference in the response is that each Item ID is followed by the Item name. Suppose now you want to control the number of Items sent back to you. The following illustrates how to do that:

Request: get -in -l 24 -c -f 123*124 -t 33a81f05__b4e88__33a87f17__ec548__33a87f17__ec540

Here we are sending a filter again, asking for the ItemSelectors and the first 24 Items, together with their names. The response format is the same as for the previous example, but the number of Items sent back is now 24.

Boolean requests: As explained in the examples, when a filter is specified, the star between ItemSelector IDs implies a Boolean "AND." The plus sign "+" between ItemSelector IDs when specifying a filter, means an "OR" and the "!" before an ItemSelector ID negates that ItemSelector. Parentheses can be used in more complex Boolean expressions.

TIE Time Stamp: According to the current definition the TIE state is a triplet {E, C, r} where E is the set of items (objects), C is the set of ItemSelectors and r is the classification relation. The TIE state is described by those three components so a change of any of them is a change of TIE state. Each element may be changed independently and it is necessary to note the exact time of the change. So the TIE Engine maintains three time stamps, one for each TIE component and updates them when changes occur. Each single time stamp is the GMT time of the last change with the accuracy of microseconds. All three time stamps constitute the TIE Time Stamp.

The TIE Time Stamp format (preceded by "-t|" in responses, and by "-t" in requests) is as follows: e1__e2__c1__c2__r1__r2 where each pair of numbers represents time. The first number of the the pair is the number of seconds, the second number is the number of microseconds and both refer to UNIX time (elapsed since Jan. 1, 1970. 00 h 00 m 00 s GMT). {e1, e2} is the time stamp for items (objects), {c1, c2} is the time stamp for ItemSelectors, {r1, r2} is the time stamp for the classification relation.

All numbers in the request and response are expressed in ASCII using hexadecimal notation. Using hex saves the number of characters to be sent. Using ASCII frees us of deciphering time stamps using their binary form that may be different on different processors. The following is an example of a time stamp: -t c27543a8__12cd__c2754145__abc101__c27543715__ff135c The following explains how the TIE Time Stamp works during client-server dialogs. The client makes the first connection to the server and asks for ItemSelector lists and the first item list. It receives the TIE Time Stamp, the complete list of ItemSelector names and local IDs, a short list of item names and local IDs for items. Whenever the client sends a request it should include the last Time Stamp it received. The server receiving the time stamp may detect that the client lists of items and/or of ItemSelectors are out of date and may decide to take the proper action. Such action would depend on circumstances and should be sensible, in most cases re-sending the lists is sufficient and the client should expect it. So as a response to a filtering request the client may get new fuill ItemSelector lists with local IDs and the narrowed lists. The IDs may be new IDs, different from the previously sent ones. The client does not interpret the. TIE Time Stamp. It simply stores it and sends it with every TIE request to the server.

Content Types: The TIE data may include data of any type such as URLs to files on the server host or elsewhere, text, HTML text, graphics, binaries, etc. The server admits all types of items without interpreting the item type. It is the responsibility of the client to deal properly with the given type once the item is being retrieved. For example, when the user requests to view an Item and the Client determines that the Item data is a URL, the Client sends the URL to the browser.

The following are examples of item types dealt with by the Client application and some possible ways the Client application could deal with each:

| item type | client action |
|---|---|
| unknown | client application issues a TIE CGI query that retrieves the item and passes it via httpd to the web browser, perhaps it will know what to do |
| text/plain | client application issues a TIE CGI query that retrieves the item and passes it via httpd to the web browser with the proper HTTP type |
| text/html | as for text/plain |
| text/url | the client retrieves the stuff being a URL and launches the browser window with this URL |
| binary | as for text/html but with the proper HTTP type This shall include binary/raw and all forms of encoded and/or compressed data |

The client may introduce its own types, because it is the client that will have to interpret the data.

Other Features: Many other convenient features can be introduced. For example, it is convenient to be able to display to the user, through the Client, the number of Items found after each ItemSelector Selection and the number of remaining Available ItemSelectors. Both these can be determined by the Client even if the Server does not return them explicitly, because of course the client need only count the returned Available ItemSelectors and Selected Items returned by the Server. However in some cases it may be more convenient to have the Server return these numbers directly.

The ability for the user to choose one or more Items and ask for the ItemSelectors assigned to these is another example of additional features. In general, the user could combine Items either Conjunctively (AND between them) or Disjunctively (OR between them). To support such general Item requests the server should quite generally be able to respond to Booleans of Items.

Even more advanced features are possible. For example, the user might want to find all Items that have fewer than a certain number of ItemSelectors assigned to them. This could very easily be obtained as a query from the Server. Another more advanced feature would allow the user to request a calculation of classification quality measures (see attached paper entitled "Guided Information Access (TIE™) A New Way of Storing, Retrieving and Analyzing Information"). These can be best done by the Server and can be programmed to be responses to specific queries.

Other Server Applications & Extensions: So far the Server has been described as working with a Client that carries the GUI for user applications to searches and other data queries, but many more applications are envisioned. It is also possible and very useful to regard the Server as a search engine to which general Boolean queries can be sent by other programs. This gives rise to numerous other types of applications. Applications can be created where users designate, using descriptive ItemSelectors, a number of descriptions of topics they would like to be notified about. The application would them roam, sending appropriate queries (involving the specified combinations of ItemSelectors) to any number of TIE servers across the Internet and then reporting the matches to the user, who would pick and choose, narrowing down further if necessary the topics of interest.

A more general Client could be built which can combine in a single presentation, the data in a plurality of Servers. The Client would present the user with the union of the ItemSelectors from the several Server data, would keep track which ItemSelectors are associated with which Server, and would respond to the user exactly as if all the responses were coming from a single Server, with a single database. Such an arrangement allows a very easy way of merging disparate databases.

Evaluation of Vector Booleans—Code Details

We detail here routines for calculating the two Result Vectors (CRV and IRV) for each of the two cases: A*B and A+B, using the ordered ItemSelector Vector implementation. Because of the symmetry of relations to the interchange of Items and ItemSelectors, the routines do not care whether the vectors are ItemSelector Vectors or Item Vectors.

Evaluating CR V ===

1 and__result__vector(A,B) ===

A and B are two ordered arrays (each of possibly different size) of ID numbers, representing two vectors. The ID number components are ordered in increasing values, no repeats possible. Two resulting vectors will be calculated. The first will be of the same type as A and B (ItemSelector vector if A and B are ItemSelector vectors and an Item vector if A and B are Item vectors) which we will refer to as the Same Type (ST) Vector and the Opposite Type (OT) Vector (Item Vector if A and B are ItemSelector vectors) respectively. (The symmetry between Items and ItemSelectors can be usefully employed in minimizing the code.) Let the components of A and B be respectively a[i], b[j], and where i and j ranges are defined by:

$$0<=i<=i\_\text{last};\ 0<=j<=j\_\text{last};$$

Let S represent the union set of all the components of a and b. Then the components of the ST Vector for the conjunctive Boolean (A*B) are that ordered subset of S which is the intersection of the set [a] and [b]. Let the ST Vector elements be c[k]. The details steps are:
Set starting values of i, j, k to 0.

Step1: Repeat until finished, i.e. either j==j_last or i==i_last;

Compare a[i] with b[j], with three possible results:

| | | |
|---|---|---|
| a[i]>b[j] | Case 1 | If i == i_last, you've finished so exit returning current value of c. If not then j++ and go to step 1. |
| a[i]<b[j] | Case 2 | If i == i_last, you've finished so exit returning current value of c. If not then i++ and go to step 1. |
| a[i]=b[j] | Case 3 | Save the matched Item Id in the next element of c: c[k] = a[i]. If either i == i_last or j == j_last you've finished so exit returning current value of c, else if not then i++, j++, k++ and go to Step 1. |

The following is the more detailed pseudo-C code of a function that returns the ST Vector array of ID numbers in the c[ ] array.

```
=======================================
and_result_vector(a,b)
int j = 0;
int k = 0;
array of int c[ ];
int i_last = sizeof(a[ ]);
int j_last = sizeof(b[ ]);
For (int i = 0; i<= i_last;) {
    if (a[i] >b[j]) { #Case 1
        if (j >= j_last) {
            return c;
        }
        j++;
        next;
    } else if (a[i] < b[j]) { #Case 2
        if (i>= i_last) {
            return c;
        }
        i++
        next;
    }else if (a[i] == b[j]) { #Case 3
        c[k] = a[i]; #We have a match!
        if ((i >= i_last)|| (j>= j_last)) {
            return c;
        } else {
            i++;j++;k++;
        }
    }
}
=======================================
```

Evaluation of IRV: Now for calculation of the OT result vector, as a separate function. To help visualize the processes involved, we will assume that the ST result vector is an ItemSelector vector, so the OT result vector will be an Item vector whose components are ItemSelector ID numbers that represent the list of available ItemSelectors. Item Vectors are only directly available when using the two Matrix implementation but the disjunctive algorithms are needed also for evaluating disjunctive Booleans of ItemSelectors.

Identifying Available ItemSelectors. (Item Result Vector) The processing compares the first Item Vector with each remaining Item vector in the list of Items. The following is written assuming the calculation of the Available ItemSelectors using the two Matrix implementation Pick the first Item Vector in the list and compare it to the next Item vector in the list, and form the OR list of the ItemSelector components consisting of the union of the sets of components of each Item Vector. More particularly, let a represent the given Item Vector whose $i^{th}$ component ItemSelector is a[i]. Let b represent the next Item Vector whose $j^{th}$ component ItemSelector is b[j]. Let h represent the current result vector. Then symbolically h=a+b (a OR b). The function that is needed is one that returns the OR of two vectors. Here are the details:

```
=========================
1 or_result_vector(a,b)
=========================
Initialization:
i = 0; j = 1;k = 0;
i_last = sizeof(a[ ]);
j_last = sozeof(b[ ]);
Step 1 Repeat while j <= j_last and i <= i_last;
a[i] > b[j]    Case 1   h[k++] = b[j]; If(j == j_last) {h[k++] = a[i++]; add the rest of the
                        elements of a to h and exit. Thta is: repeat until (i > i_last) {h[k++]
                        = a[i++];}; return h} else {j++; go to Step 1.}
a[i] < b[j]    Case 2   h[k++] = a[i]; if (i == i_last) {h[k++] = b[j++]; add the remaining
                        elements of b to h and exit. That is: repeat until (j > j_Last)
                        {h[k++] = b[j++];} return h} else {i++; go to Step 1}
a[i] == b[j]   Case 3   h[k++] = a[i]; if ((i == i_last) && (j < j_last)){ add the remaining
                        elements of b to h and exit. That is: repeat until (j > j_last)
                        {h[k++] = b[j++];} return h} else if ((j == j_last) && (i <= i_last))
                        { add the rest of a and h and exit.} else {i++; j++;} go to Step 1}
```

The components of the Item vector h are the available ItemSelector IDs.

Now for the more detailed pseudo-code of this function:

```
or_result_vector(array of int a, b) {
#Input: two ordered arrays of int a, b
#Output: one ordered array of int h containing the union set of the elements of a and b.
#Initialization:
int i= 0;j = 1;k = 0;
int i_last = sizeof(a[ ]);
int j_last = sizeof(b[ ]);
    array of int h[ ];
    while ((j <= j_last) && (i <= i_last)) {
        if(a[i] > b[j]) { #Case 1
            h[k ++] = b[j];
            if (j == j_last) {
                until (i > i_last) {
                    h[k++]= a[i++];
                }
                return h;
            }else {
                j++;
                next;
            }
        } else if(a[i] < b[j]) { #Case 2
        h[k++ ]= a[i];
        if(i == i_last) {
                until (j > j_last) {
                    h[k++] = b[j++];
                }
                return h;
        } else {
                i++;
                next;
            }
        } else if(a[i] == b[j]) { #Case 3
            h[k++]= a[i];
                if((i == i_last) && (j < j_last)) {
                    until (j > j_last) {h[k++] = b[j++];}
```

```
                    return h;
                } else if ((j == j_last) && (i <= i_last)) {
                    until (i > i_last) {h[k++] = a[i++]; }
                    return h;
                } else {
                    i++;j++;
                    next;
                }
            }
        }
    }
}
========================
```

Two function available_ItemSelectors(a, b): (IRV using single matrix) Given an ItemSelector vector a, whose components represent the Selected Items, and the Item Vector b, whose components represent the Selected ItemSelectors, this function develops an Item Vector h with components as the Available ItemSelectors, using only ItemSelector vectors in the evaluation. This is only needed when using the single matrix implementation.

The ItemSelector based Matrix double-array is M[i][j]. It is assumed accessible to the function. It is also assumed that the index i is also the ItemSelector ID number. Furthermore it is assumed that the component of the ItemSelector name table is used to store the current Associated Item count. This element of the array (initialized to zero) is also indexed by the ItemSelector ID number, and is referenced in the function below as item_count[ ]:

```
function available_ItemSelectors(a,b) {
int k = 0;
int i_last, j_last;#i is the ItemSelector and ItemSelector Index and j the Item index.
#assume that ItemSelector IDs are all numbers from 0 through i_last.
array of int h[ ];
    for (int i = 0; i <= i_last;i++) {
        if (check_membershp(i_last,i, b)) { #Check if the ItemSelector is in the selected set already. Omit
                    # when Associated Item Counts being evaluated
                    #For code details see Chapter 9
            h[k++] = i; #If it is then add it to the list and check the next one.
            next;
        } else { #If it is not, then check each Item in the ItemSelector Vector components
            for (j = 0; j<= j_last; j++) {
                if (check_membershp(j_last, M[i][j], a)) { #To
                    see if the Item M[i][j] is in the
check set.
                    h[k++] = i; #If it is, then add the ItemSelector (i) to the ItemSelector
available list.
                    item_count[i]++;#Increment Associated Item Count
                    break; #Only one match is needed, break out of the j loop if it is found
                        #but do not break out when doing Item count.
                }
            }
        }
    }
    return h; #Must be finished here.
} #End of function available_ItemSelectors(a,b)
```

Let the ItemSelector set of the components of b be called the excluded set. Let the Item set of components of a be called the check set. Assume that the complete set of all ItemSelector IDs range from 0 through i_last. We have to find all ItemSelector IDs, whose corresponding ItemSelector Vector components (Item IDs) contain at least one of the Items in the check set. When counts of the associated Items are needed, the checking has to continue beyond the first match, to determine how many of the Selected Items are associated with each ItemSelector. On average, this is expected to double the time of evaluation. So we first see if the ItemSelector is in the excluded set (this check is omitted when Associated Item Counts are needed) as that is faster to check. If it is not then we check if the ItemSelector should be added to the Result Item vector.

Evaluating the "NOT" of a Vector: The following is the prescription of the function which returns the NOT of a vector, or the complement set of the vector components. Let the vector have components a[i] in the range 0<=i <=i_last. Let the vector with components u[j] represent the complete set of possible components of any such vector. Let the vector with components r[k] for 0<=k <=k_last represent the resulting negated vector symbolically !a (NOT a). The following describes the needed function.

First, if we could assume that ID numbers are always assigned consecutively, without gaps, then the vector u[j]=j. All we would need is j_last, and we would know that the set of numbers u[ ] is all the integers between 0 and j_last. However we do not assume this in what follows.

j=0; i=0;k=0;

Step 1: Test a[i] against u[j]: three possibilities:
Case 1: a[i]>u[j]; r[k++]=u[j++]; repeat this until it is no longer true.
Case 2: a[i]==u[j]: i++; j++; go to step 1.
Case 3: a[i]<u[j]: Impossible. Don't bother with this test except when debugging
Check if j>j_last exit with error message. Don't bother with this test except when debugging
Repeat the above while i<=i_last.
Now the pseudo-code:

```
==============================
negate(i_last, u, a) Function
==============================
#Initialization:
function negate(i_last, u[], a[]) {
    j = 0; k = 0;
    for(i = 0; i <= i_last;) {
        for( ; a[i] > u[j]; j++) {
            r[k++] = u[j];
        }
        if (a[i] == u[j]) {
            i++; j++;
            next;
        }
        if (a[i] < u[j]) {Display error when
            debugging} #Don't bother with this part except
when debugging
    }
}
}return r[];
```

Figure 8:
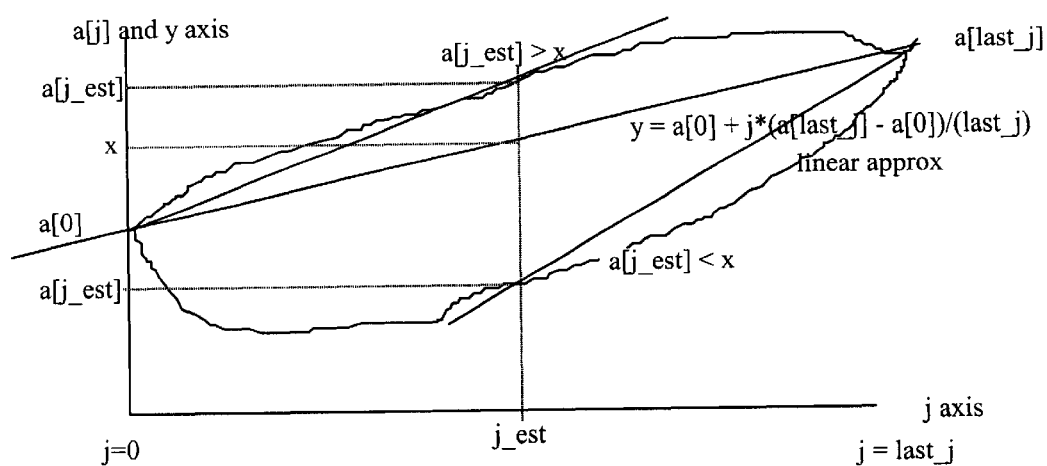
FIG. 8 is a graph illustrating element estimation using straight line interpolation.

Linear Interpolation to Estimate Set Element: FIG. 8 is a graph illustrating a method of element estimation through linear interpolation. Although binary searches are the traditional methods of determining membership in a set, we believe that in large ordered sets, linear interpolation to estimate the approximate ordinal number of the possibly matching set element may be faster. Testing in real situations will determine if this is the case. Here we detail the interpolation method, as the binary search is well-known and most modern C++ libraries contain set data structures and operations. FIG. 8 is referenced throughout this discussion by the equations identified therein that define the three straight lines of the graph.

Assuming that the set consists of the components of an array of integers a[j], where 0<j<j_last, our object is to find the fastest procedure for determining whether a number x is one of the components of a (i.e. a member of the set). We assume the set is ordered, that is a[0] is the smallest component and a[j_last] the largest and there are no repeated elements. Therefore a[j] is a monotonically increasing function of j.

Generally we first check if a[0]<=x<=a[j_last]. If it is not, then it cannot be a member of the set, so we have finished. If it equals either bound, then we have also finished. If it is in the range, but not on the boundary, then we determine an estimate of the index j, based on a straight line approximation to the function a[j]. The straight line is the one that passes through the end points and can be quite generally written as: (a[j1]−a[j2])/(j1−j2)=(x−a[j1])/(je−j1)=(x−a[j2])/(je−j2), where je is the estimated value of j closest to a possible match, that is a[je]~x. j1 and j2 are any two values of j such that a[j1] and a[j2] are known, such as the end points.

The process can be used recursively or in a loop, producing a new estimate of j after an evaluation of a[je] and comparison with x. The process converges except for the possible overshoot of j_last. If any estimate of j equals or exceeds j_last, or is closer then some number below j_last, the interpolation stops and a brute-force search proceeds starting with j_last. In addition, to avoid oscillations and so possible infinite loops, when the process reverses direction (that is the sequence of je values changes direction) it is stopped and the brute force method takes over.

Check Membership Using Interpolation: The following is the pseudo-code, assuming that x is the value being checked and that it is inside the range:

```
function check_membership(j_last, x, a[]) {
    #Initialization:
    a_min = a[0]; a_max = a[j_last];move_up = false; move_down = false; j_prev = 0;
    #Check boundaries:
    if ((x > a_max) || (x < a_min)) return false;
    if ((x == a_max) || (x == a_min)) return true;
    max_dist = 100; #Can be any number. Optimum needs estimates of time
            #comparisons with binary searches.
    #Step 1:
    j1 = 0; j2 = j_last; je = j2 + (x − a[j2])*(j2 − j1)/(a[j2] − a[j1]); #First estimate of j using
            #straight line interpolation
    if (abs(je − j_last) < max_dist) || (je <max_dist) {
        return is_in_set(j_last, je, a[]); #use brute-force method starting at je;
    } else {j_prev = je;} #Save previous estimate
    #step 2:
    #Try for lucky strike:
    if (a[je] == x) return true;
    #je cannot be out of bounds on first estimate
    #==============================
    #First inequality:
    if (a[je] < x) && (!move_down) { #Calculate new estimate of je, by replacing j1
            #with last je in the formula, that is:
        je = j2 + (x − a[j2])*(j2 − je)/(a[j2]− a[je]); #The new estimate
        move_up = true; move_down = false; #To make sure that if direction changes we go to
brute force.
        if (abs(je − j_prev) < max_dist) {
            return is_in_set(j_last, je, a[]); #use brute force using je as starting index
        } else {j_prev = je; repeat step 2}
    } else if (a[je] < x) {
        #Must have changed direction so use brute force method
```

-continued

```
    #starting at the average index (je+j_prev)/2;
}
#==============================
#Second inequality:
if (a[je] > x) && (!move_up) { #use new estimate but replace j2 with je in formula:
    je = je + (x - a[je])*(je - j1)/(a[je]- a[j1]);
    move_down = true; move_up = false; #To make sure that if direction changes
            #we go to brute force.
    if (abs(a[je] - x) < max_dist) {
        return is_in_set(j_last, je, a); #use brute force using je
    } else { j_prev = je;
    next; #repeat step 2;
    }
} else if (a[je] > x) {
    return is_in_set(j_last, (je+j_prev)/2, a[]);#Must have changed direction so use
            #brute force method starting at (je +
j_prev)/2;
    }
}#End of membership check function
```

The following diagram illustrates the straight line interpolation to the ordered ID number distribution.

Brute Force "Is In Set" Function: The brute-force search function. This is used when the interpolation method has done its job. This function could be replaced by a binary search function, but then it would have to know the "for sure" range of j values, or it would have to determine them. So it would not necessarily be any better then the brute force method. In most cases the range of values to check with this method will be quite small.

We pass the array a[j], and the indexes (IDs) j_est, j_last, and x:

```
function is_in_set (j_est,j_last,x,a[]) {
    move_up = false; move_down = false;
    for (j = j_est; j < j_last && j > 0;) {
        if(a[j] == x) return true;
        if ((a[j] > x) && ! move_up) {
            move_down = true;
            j--;
            next;
        } else if(a[j] >x) {return false;} #Because
        move_up here must be true,
            #so we have not found a match.
        if ((a[j] < x) && ! move_down) {
            j++;
            move_up = true;
            next;
        }else if(a[j] < x) {return false;}#Because move—down
            here must be true,
            #so we have not found a match.
    }
    return false; #Because we have here finished checking
    all and not found a match.
}
```

Bitmap Implementation: When the Bitmap implementation is used, the only differences from the ItemSelector Vector implementation occur in the details of the coded functions for determining the elementary Booleans. Everything else remains the same. The Bitmap is a binary matrix, the rows being the binary ItemSelector Vectors and the Columns the Binary Item Vectors. This makes the design of all the Boolean evaluation functions very easy as each such Boolean in Items or ItemSelectors translates to the corresponding bit-Boolean in the binary vectors. The only new functions whose code needs to be designed, are those adding Items and ItemSelectors to the binary matrix, removing them from the binary matrix, and accessing the bits in a byte-oriented array.

When first creating the matrix, we are given its size. The number of rows is the number of ItemSelectors and the number of columns is the number of Items.

When Items and ItemSelectors are added, the ID numbers are assigned in sequence, starting with one. To minimize storage space, the binary array is declared as an array of array of bytes. We need the function to calculate which element of the array corresponds to a given element of the equivalent bit array and the reverse. We also need functions that will set and get the exact bits of this bit array, referencing the byte array. We also need functions that given two ItemSelector Vectors evaluate the ItemSelector Result Vector (CRV) and the Item Result Vector (IRV), both as a bit array (stored as a byte array) and as an array of integers, each being the respective ID number.

Bit Assignment Convention: In all that follows we will count bits within a byte by starting with the least significant bit as the first bit. The functions to be described we will use parts that, given an ID number, set the corresponding bit in the appropriate element of an array of bytes. Let M[ ][ ] be the double array of bytes holding the matrix information. The first index references the ItemSelectors and the second the Items. Bit arrays are not directly accessible. Let n=total number of ItemSelectors and N=that of Items, then if M[i][j] represents the i, j elemement of the double array, we label i_last and j_last as the highest values of the two indexes. Assume the double array is initialized to all zero elements. The bit matrix is indexed starting at zero in both directions. The zeroeth bit in both directions has a special meaning. When the index refers to the ItemSelector, if the zeroth bit is set, that ItemSelector exists but is not assigned to any Item. Similarly when the index refers to an Item, the zeroth bit set means the Item exists but is not classified.

Adding an ItemSelector: To add a single ItemSelector, unassigned to any Items, we are given the ID number of the ItemSelector as k, the element of the array in which the bit has to be set is M[k][0]. We use the first bit (least significant bit) of the Item array to represent the Item ID number zero, and we reserve that to represent no Item assignment. Therefore we have to set that first bit to indicate an unused ItemSelector with ID k. The easiest way to set the first (least significant) bit without affecting any other bits is to bit OR it with 1. Therefore the assignment: M[k][0]=M[k][0]|1 will do the job.

On the other hand, if an unclassified Item is added with an ID number m, we need to set the first bit of M[0][m/8] and this can be done by M[0][m/8]=M[0][m/8]|1

Adding an Item: Suppose now we need to add an Item and assign some ItemSelectors to it. The Item ID is m and the ItemSelector IDs are $k_1$, $k_2$, etc. in general $k_i$. Let m/8=p and q=m Mod 8, the remainder after division by 8, so that m=8 p+q. Then the assignment M[$k_i$][p]=M[$k_i$][p]|Mask[q]

where the 8 element array Mask[q], the bit mask, is given by:

Mask[ ]=(1, 2, 4, 8, 16, 32, 64, 128), will set the correct bit for each $k_i$.

Evaluating the CRV: Given an ItemSelector (ID i) to determine the Items it is assigned to in the form of a CRV. That is to determine the non-zero bits set in the ItemSelector or row bit vector of the matrix M. The ItemSelector bit vector is: M[i][j], for j from 0 to j__last=Trunc(N/8+0.9).

First we test for the first bit to see if it is set, indicating a deleted ItemSelector, because if it is, we do not need to look further. If it is not deleted, we loop through all byte elements, looking for each bit that is set, collecting the Item IDs. These Item IDs as the components of the CRV, are returned in an array of Integer I[p] and in the Binary version of the CRV is the Byte array C[q]. The IRV contains the ID numbers of the Available ItemSelectors in the array of integer IR[ ] and its binary version IRB[ ] as an array of bytes:

Function to calculate the CRV in both bit form (C[ ]) and integer array (I[ ]):

```
#Define the bit mask for the 8 bits of a byte as an array of bytes:
Mask[] = (1,2,4,8,16,32,64,128);# This probably better be a global as it is needed in several
functions.
p = 0;c_count = 0;
for (j = 0; j <= j_last; j++) {#Check all elements of the byte array.
    C[j] = 0; #Initialize each byte of the binary CRV to zero.
    if(M[i][j]) { #If the byte element is non-zero then some bits must be set.
        #So test which, otherwise go on to the next byte
        for (k = 0; k <=7; k++) { #Scan all 8 bits of each byte
            if(M[i][j] & Mask[k]) {#Test each bit by bit-anding with the mask elements.
                I[p++] = j*8 + k + 1; #Assign the ID number to the array element of I.
                C[j] =+ Mask[k]; #Builds the binary version of CRV
            }
        }
    }
    p_last = p; #Save the last value so when I is finished we know its size.
}
```

The array I[p] is therefore the CRV or ItemSelector Result Vector, containing, in an ordered set, the ID numbers of all the Selected Items. The binary equivalent of that vector is in the byte array C[q].

Similarly, the following function determines the CRV of two ItemSelector Vectors (ItemSelector c1 and ItemSelector c2) in both bit form (C[ ]) and integer array (I[ ]).

```
p= 0;c_count = 0;
for (j = 0; j <= j_last; j++) { #Check all elements of the byte array.
char R;
    C[j] = 0; #Initialize each byte of the binary CRV to zero.
    if(R = M[c1][j] & M[c2][j]) { #If the byte result element is non-zero then some bits must be
set.
        #So test which, otherwise go on to the next byte
        for (k = 0; k <=7; k++) { #Scan all 8 bits of each byte
            if (R & Mask[k]) {#Test each bit by bit-anding with the mask elements.
                I[p++] = j*8 + k + 1; #Assign the ID number to the array element of I.
                C[j] =+ Mask[k]; #Builds the binary version of CRV
            }
        }
    }
    p_last = p; #Save the last value so when I is finished we know its size.
}
```

The array I[p] is therefore the CRV or ItemSelector Result Vector, containing, in an ordered set, the ID numbers of all the Selected Items. The binary equivalent of that vector is in the byte array C[q].

Evaluating the IRV:

A function to calculate the IRV (available ItemSelectors) as an array of integer (IRV[ ]), given the CRV calculated above [C[ ]).

```
k = 0;
for(i = 0; i < i_last; i++) {
    for(j = 0;j < = j_last; j++) {
        if(C[j/8] & Mask[j Mod 8]) {#Picks up the jth bit in the given C[] array, the CRV.
            for (c = 1; c <= i_last; c++) { #c is the ItemSelector index. Starts at 1 as
                #0 used for deleted items, which should not be here
                if((M]c][j/8] & Mask[j Mod 8])& (C[j/8] & Mask [j Mod 8])) {
                    IRV[k++ ] = c; #store the ItemSelector ID that has any one of the Items assigned to it.
                    next; #First find is enough, so go on to check the next ItemSelector vector.
                }
            }
        }
    }
}
```

The Item Result Vector or IRV[ ] contains the ItemSelector IDs (of the available ItemSelectors) as an ordered set of integers.

Matrix Data Structure: The ID# ItemSelector Vector implementation of the Matrix uses the equivalent of a dynamic double array. If we reference the i, j element in the C-style as M[i][j], then for visualization purposes let i represent the row and j the column index. For fast access i is both the ItemSelector ID number and the ItemSelector array index. Unlike the i index, the j index is then the index giving access t the element, which represents the Item ID number. Therefore M[i][j] is the $j^{th}$ component of the ItemSelector vector for the ItemSelector with ID number i.

Tables Data Structure: The names of both ItemSelectors and Items are held in tables (arrays). For quick access, the array index is the ID number of the ItemSelector and Item. Both ItemSelectors and Items are often presented in alphabetized lists. Item lists and ItemSelector lists can be very large and so if sorting long lists is needed, the time delay can be considerable. Therefore the data structures are designed in such a way as to avoid sorting during queries or when adding a large amount of new data.

One way to achieve this is to use a structure which combines an array with a linked list and to maintain the alphabetical order through the links. Such arrays may be a standard part of certain development system libraries, but if not the following is a description of an example. The following diagram illustrates the structure of an element of the ItemSelector table array. The first element of the structure is the array index which is also the ItemSelector ID. The last part of the structure is (a pointer to) the ItemSelector name.

The Mark/Unmark element is a Boolean which is used by the server for temporary marking of selected ItemSelectors for purposes of then performing a "Collection Pass" through the list picking up the marked ItemSelector Names. For example, when a search through the components of the ItemSelector vector is performed to determine the IRV, each time an ItemSelector match is found, the corresponding Mark/Unmark element is set. When the search through ItemSelectors is complete, a single pass through this table picks up all the marked elements in alphabetical order, simultaneously unmarking them. Quite often the search is through a limited list of ItemSelector IDs. In that case of course the collection pass is also only through those IDs.

Structure of each element of the ItemSelector Name Table:

| Item Selector ID | Index or ID of Alphabetically Next ItemSelector | Group Number of ItemSelector | Mark/ Unmark | Item Selector Name | Associated Item Count |
| --- | --- | --- | --- | --- | --- |

The ItemSelector ID is also the index of the array. The Item Name Table has exactly the same structure, except that the Group Number and Associated Item Counts are not always used.

There are also two Name Hash arrays: one for the ItemSelector names the other for the Item names. Their sole purpose is to speed-up the collecting of marked Item and ItemSelector names. Their structure is very simple:

| Hash Key | Index | Mark/Unmark |
| --- | --- | --- | where the Hash Key, also the index of the array, is the result of a hash function (detailed below) of the name. The "Index" is the index of the corresponding Name Table entry (structure detailed above) which holds the name whose hash is the Hash Key.

The Mark/Unmark Boolean is used to mark the selected Items'starting index, so the process of collecting these Items is more optimal. For this to work, the hash function, relating the name to the Index into this array, must be such that the order of hash keys is the same as the alphabetical order of the corresponding names, except for the inevitable collisions.

The simple hash function with the required property, for the English ASCII characters is defined by the following:

Convert the name to uppercase. Pick the first two characters from the converted name which are in the ASCII range from 48 (zero) through 90 (Z). Call these the first_char and second_char. Then the hash key is given by: H=(code_of(first_char)−48)*42+code_of(second_char)−48.

Tables associated with ItemSelectors and those associated with Items are structurally the same, so the descriptions will assume that Items are the subject. The following outline is an overview of the various operations with these tables.

Inserting a New Item: Assign a new ID which is the next available Item array index. Each new Item is assigned the next index in the Item Name array as its ID number. The zeroth index is used for holding the index of the first Alphabetical entry. Each element of the Item Name array is a structure comprising the index (in the same array) of the alphabetically next Item name entry, the Mark/Unmark Boolean, and the pointer to the name of the Item. Check Alphabetic Hash table for closest location & update.

A separate Alphabetic Name hash table is maintained to reduce the time it takes to find the link for alphabetic name location when a new Item is added. The hash function has the property that alphabetic order is the key order. (For example, the first two letters of the name can be used as the key.) The hash value is the index into the Item array for the name which gives rise to the key. Therefore when a new name is added its hash key is used to find the index at which to begin the search through the Item array's linked list. The hash key is checked for its presence in the hash table. If it exists, the index is used to compare the actual full name of the Item with the name of the Item to be added. If the new name is alphabetically greater than that, the search starts at that index. If the new name is less than that, the entry of the previous lower value of the key is used to get the starting index for the search. If the hash key does not exist, a new key entry is created with the new Items index as the index. The fastest hash table (ignoring balance) is an array where the index is the numeric hash key. Suppose we use the first two letters of the name as the key. (For very large numbers of Items we can increase that if necessary.) Then we use a simple function (which will need to be different for different languages) which accepts the name and returns the number. If there are 42 different values of each character (using the ASCII range from 48 through 90 for English) then using the first 2 alphanumeric characters, there are 1764 possible values of the key. So we would have a fixed size array with 1764 elements. The memory cost of this is 7,056 bytes—quite acceptable.

The hash function for English ASCII characters uses the following formula/algorithm. Convert the name to uppercase. Pick the first two characters from the converted name which are in the ASCII range from 48 (zero) through 90 (Z). Call these the first_char and second_char. Then the hash is H=(code_of(first_char)−48)*41+code_of(second_char)−48

Insert and adjust pointers: The index that points to the alphabetically next Item in the Item array is the link in a linked list. When a new Item is added, a search is performed to find the Item whose name is just above the one being added. Then the index pointing to the next Item is changed to point to the new Item and the new Item's pointer is changed to the index of the previously next Item.

Finding & Marking an Item: The Items that were selected by the user through the ItemSelectors sent as a query to the server, are "marked" by setting the Mark/Unmark element of the Item Names array. Simultaneously, the corresponding elements of the Name Hash table are also marked. The ID number followed by the Name in alphabetical order, for each selected Item are sent to the Client in response, by passing through the linked list in the Item Name table, picking up only those that are marked. Generally, the whole Item list may need to be traversed using the links, though this is usually very fast, it can be optimized using the "Mark/Unmark" element of the Name Hash table. A single traversal of the Hash Table, element by element, picking up in alphabetic order, those that are marked and unmarking each in the process.

Deleting an Item: Deleted Items are noted as such but are not removed until all tables are saved to disk, so that the deletions can be easily undone. In the bit Matrix implementation, the zeroth element of the ItemSelector vector is set if the ItemSelector is deleted, and the same bit of the Item vector is set to denote an item that is deleted. These bits are checked either when the CRV and IRV are being evaluated or when the ItemSelector or Item is sent to the Client. In the ID number vector implementation, the ItemSelector Vector that is deleted has its first component ID number zero. Because zero IDs are not used, this uniquely identifies the ItemSelector as deleted. Similarly, in the two matrix implementation, the first component of the Item vector is set to zero to indicate the Item is deleted. If only the single matrix (ItemSelector vector) implementation is used, the Item IDs that are deleted are stored in a separate hash table where the ID is the key and the hash value is something useful, like the date and time of deletion.

Collecting Marked Items: Using the Marked Items in the Item Name Table and the Name Hash Table, pick up, in alphabetical order, the first n (20) Item names, associating each with the corresponding ID number, sending each pair to the client. Then, using the Name Hash table, loop through each index checking the Mark/Unmark Boolean. A marked element gives the Index at which to start a search in the Item Name Table. The search in the Item Name table proceeds in order of the links (alphabetical) picking up only those that are marked in that table. These Item Name Table searches are done in batches, each batch begins with the index given by the Marked element in the Name Hash table and ends when the name Hash of the Item name increments from its current value. At that point the search through the Name Hash table continues until the next marked element is found and so on, through the last element in the Name Hash table.

Optimizing Tables—Writing to Disk: All tables are written to disk on user command. Each table is written out to disk, saved in an optimum format for reading back. The Item (and similarly the ItemSelector) table is written out in alphabetical order, thence changing all Item IDs to be also in alphabetical order. The Matrix is converted to a XML-type text file but uses the new, alphabetized ID numbers for Items and ID numbers for the ItemSelectors, as the tables already hold the ID to name relationships. Reading back from disk creates optimized tables. This is also on user command.

Methods of Handling Unstructured Data

Databases of text articles, such as newspaper articles, are sometimes also stored in conventional, structured databases but many times are individual files, even when their number is very large. When they are structured, some field values can be used as candidates for ItemSelectors, otherwise the ItemSelectors have to be extracted from each file's contents. The precise method of extracting these ItemSelectors includes details which depend on the subject matter and any common features of the files. Here we describe that part of the ItemSelector extraction procedure which is common to all such data and give some examples of procedures which are data dependent.

The next section describes the steps comprising the extraction of ItemSelectors and the creation of Item references, data sufficient to create the necessary TIE Matrix. In the remaining sections of this chapter we detail how to overcome some technical challenges involved in such unstructured text projects and follows that with programming details of the important steps in implementations of these ideas.

Extracting ItemSelectors: The first step in the process of organizing the TIE database of text documents is to create a list of ItemSelectors and their synonyms. One part of this process uses a text analysis engine which extracts significant words from all the articles and presents them to the system administrator knowledgeable in the subject matter contained in the documents, for editing and final choice of the Significant word ItemSelectors.

The important phrase in the above is "significant words." Although it is difficult to define what these words are, there are many methods of extracting possibly significant words. One such method, easily applicable is to pick all words (except those on a short stop list) which contain within them at least one capital letter, and are not at the beginning of a sentence.

One example where this worked very well, is that of a large number of newspaper articles, covering many years and all newspaper sections. In that case the list of such words contained about 32,000 words, many of them proper names, and preliminary tests could not find a significant word which was missing from the list. Such a filtering of significant words works well when the number of documents is large because though many significant words are not capitalized in most articles, when the number of articles is large, the chances are very good that there will be at least one article where each such word will be capitalized.

In most applications, 32,000 words may be too many to display all at once as ItemSelectors. In addition, the average number of ItemSelectors per Document can be as high as several thousand. This means that when using the ID Number Vector implementation of TIE, the memory required for the single Matrix version is several times 4 GB of RAM. Although this is achievable, it is rather a heavy load. (When using the bit matrix implementation however, the memory required is fixed at 4 GB.)

It is of course quite possible to store parts of the matrix on disk and read into ram only those vectors needed for immediate processing. Such a system would still provide quite acceptable response times. However, both the RAM requirements and the display of large numbers of ItemSelectors can be avoided by re-engineering the Matrix to a new type of Matrix, one in which the most popular ItemSelectors are presented to the user first to be used to narrow down the rest of the ItemSelectors.

The Matrix which connects ItemSelectors to ItemSelectors (by eliminating all mention of Items) is actually the binary square of the regular Matrix. However, this complete square Matrix is not needed. All that is needed is a small submatrix of this Matrix, the one containing the most popular ItemSelectors as the row labels, while having all the ItemSelectors as the Column labels. We will refer to this as the Reduced Matrix.

In the example of 32,000 ItemSelectors, it is almost certain that the "appropriate" two or three thousand will be enough to control the rest. In that case the RAM required for the reduced matrix would be 250 MB when using the bit map implementation. Using the Vector ID Number implementation the memory required is not certain because it depends on the average number of "appropriate" ItemSelectors per ItemSelector. This number needs to be determined. Its upper limit, in our example, is about 2,000 and so the upper limit of the memory required would be 256 MB.

There are several possible ways of picking the appropriate ItemSelectors from the total list of ItemSelectors. We will describe here one method that worked well when analyzing about 800,000 newspaper articles.

In everything that follows, we will, for short, refer to each ItemSelector as a "Word" whereas in fact it can be either a word or a phrase. In most cases it is preferable to split phrases into individual words, but there may be occasions where a phrase is more appropriate. Nothing herein is invalidated by using a phrase in place of a word. The words picked by picking from all documents the interior of sentence capitalized words, evaluating a relevance index for each, after editing, collecting into synonym groups as described above, become the Master list of ItemSelectors. Said relevance index depends on the occurrences of each of the words, whether capitalized or not.

Simple occurrence counts can be used to determine relevance, with the highest counts implying the highest relevance. Another alternative is to count the number of documents each word occurs in. However, it was found that a better relevance index of a given word is the cumulative total of the word count of the significant words which occur with said given word in all documents. This is a measure of "connectedness" of the ItemSelectors with each other through the documents and so is thought to be more representative of the most appropriate words to choose as the initial ItemSelectors with which to control the whole ItemSelector list. We will refer to this as the "Connectedness Relevance Index" or CRI.

There are two versions of the CRI index: one counts the connectedness of the given word with only the Capitalized, interior in sentence, words in the article. This is referred to as the CRI-1 index. The other counts the connectedness of all words from the Master ItemSelector list through their occurrence in any form within an article. This will be referred to as the CRI-2 index.

The CRI-2 index requires two passes—one to extract the Master list, the other to use it to evaluate the counts. Let the Master List of ItemSelectors be referred to as MLC. A temporary list of collected ItemSelectors from the current document will be referred to as the Document List or DL. Let the total number of words in the DL when it is complete be N. Let the condition required of a word to be significant be designated as the Significance Condition or SC. In one example the SC requires the word to be an interior word of a sentence, except that words in all capitals (usually the headline words) do not need to be interior words. The following defines the algorithm needed to evaluate CRI-1 index in the same pass as the extraction of the ItemSelectors for the MLC.

1 The DL is initialized to no words.
2 The next article or document is opened.
3 Each word from the document is checked and if it meets the SC, it is checked to see if it already exists in the current DL, if not then it is added to the DL.
4 When all words in the current document have been checked and the current DL is complete, each word in the DL is checked for its presence in the MLC. If it is present, then its CRI-1 count is incremented N−1, because that is the total number of word-to-word connections between the given word and the other significant words in the document. If it is not present, then it is first added to the MLC list and then its CRI-1 count is incremented by N−1.
5 This process is repeated from step 1, for each article or document.

The following defines the algorithm needed to evaluate the CRI-2 index, which requires two passes.

First Create the MLC, by picking up all the words that meet the SC from every document. This requires one complete pass through all the documents. Then, in a second pass through all the documents, proceed as follows.

1 The DL is initialized to no words.
2 The next article or document is opened.

3 Each word in the article, independent of the case of its characters, is checked for its presence in the MLC. If present, it is added to the current DL.

4 When all words in the current document have been checked and the current DL is complete, the CRI-2 count of each DL word, in the MLC is incremented by N−1.

The result of this process, after all documents have been analyzed, will be a list of words with a CRI for each. Sort these words by the CRI, from the largest value of the CRI to the lowest one. The most relevant ItemSelectors to use for user access, are then those with the highest CRI. These can then be edited and used as the most relevant key words to provide access to the data.

Optimizing ItemSelector Sets: This section explains how to use the TIE system for a meaningful analysis of chosen ItemSelector set or vocabulary and how to analyze the ItemSelector-Item associations and how to determine and apply optimization criteria for the determination of the best minimum ItemSelector set.

Let us assume that a large number of unstructured Items, such as text documents, form our database. Assume also that we have used some means of extracting the word vocabulary, whether sophisticated, using some powerful measures of relevance, or very simple, just omitting the words on a stop-list and using the frequency counts as measures of relevance. Such a vocabulary is likely to be very large. In an example of about 850,000 newspaper articles, the vocabulary using relevance indexes, was about 340,000 words.

Suppose then we create a TIE matrix for the database using the total vocabulary of these words as ItemSelectors and that the average number of unique words per Item is as high as 3,000. We are then in a position to use the TIE system to analyze the classification and determine the best and so most practical subset of this vocabulary to use. We propose an optimizing criterion, which we refer to as the Non-Interpretive Criterion (NIC): choose that minimum subset of the ItemSelector vocabulary which is sufficient to distinguish between all the Items, where selecting the Item-Selectors assigned to any Item lists no more than some chosen number (say 20) Items.

For example, suppose we were to find such a subset of the ItemSelectors and use it in a TIE database, then a user choosing the ItemSelectors assigned to any Item, would see the resulting Item in a listing group of Items no larger than our chosen limit of 20. Such a criterion, based entirely on a precise procedural prescription, can be easily programmed. However a simple programming implementation will not be practical for any reasonably large Item numbers because the performance time is of order n factorial, where n is the number of ItemSelectors assigned each item from the complete vocabulary.

For example, if there are n ItemSelectors controlling N items the obvious procedural steps needed are as follows:

1 Query the server with a single Item (refer to it as the Target Item) obtaining the ItemSelectors (say the set $C_1$) assigned to that Item.

2 Query the server with a Conjunctive boolean consisting of the ItemSelectors in the subset $C_1$. The server returns the corresponding selected Items subset. Let that Item subset be $I_1$.

3 If the number in the $I_1$ subset is greater than the required maximum number, assign a special diagnostic ItemSelector "Improperly Classified" to the Target Item.

4 Now send a set of queries, each one with one less ItemSelector from the subset $C_1$ choosing the removed ItemSelector starting with the lowest relevance ItemSelectors and proceeding in order of increasing relevance. After each removal of an ItemSelector check the size of the new subset of selected Items and stop removing the ItemSelectors when that size is the largest possible not exceeding the maximum number criterion.

5 Repeat from step 1 choosing the next Item.

6 Accumulate the list of all the ItemSelectors needed for each Target Item. The union of all the subsets of these ItemSelectors is then the required minimum subset.

Of course there is no guarantee that the above procedure will produce a subset substantially smaller than the complete ItemSelector vocabulary. However, the statistical likelihood of this, judging from our limited experience, is so remote as to be almost impossible. If the subset is too large, it can be reduced by repeating the process but increasing the maximum Item subset size.

Suppose the average number of ItemSelectors per item is $C_{AV}$ at the start of the analysis and that this average becomes $C'_{AV}$ after the analysis and the removal of all the excess ItemSelectors. The number of queries needed to complete the analysis is then $N(C_{AV}-C'_{AV})$. For the case of 1 million newspaper articles with $C_{AV}=2000$ and $C'_{AV}=150$, the number of queries is 1.8 billion. If each takes 1 ms, the total analysis takes about 20 days.

This shows that even when we use the relevance index to test the removal of one ItemSelector at a time, the processing time is very long. If we were to try all possible combinations of ItemSelectors the processing time would be totally impractical. It is possible that a stochastic algorithm or an optimization of the present algorithm could be much faster.

Extracting TIE Data From Current Databases

This chapter details the procedures needed in using the TIE technology with data from current and legacy databases. Although both structured and unstructured databases will be covered, structured databases will be emphasized as the previous chapter covered most of the needed functionality for the unstructured ones. Several approaches are possible. We can leave the existing database without change extracting only the needed information for a TIE user interface. This is the approach we will focus on because it needs the largest number of tools and procedures.

It is important to realize that the following procedures, though presented for the case of a single database, can be used most easily for combining the data, no matter how disparate, from any number of databases. Combining of databases in TIE involves the combining of the ItemSelector vocabulary of each into one composite vocabulary and then deciding on the details of the GUI for the combined system. The process of combining ItemSelector vocabularies, is a list editing task which involves deciding which possibly different words or phrases are synonymous and so can be combined into one. The ItemSelector synonym lists, detailed in this chapter, are then prepared appropriately and used to create the tagged classified file for reading into the TIE server.

The following are steps that may be needed:

1 Field Names Extractor. Extract a listing of all the field names. The output is a list of field names and their associated IDs recognized by the database.

2 Field Values Extractor. Extract and produce a listing of all the field values of operator selected field names.

3 ItemSelector Vocabulary Editor. Using an editing environment for editing and finalizing the various grouped ItemSelector lists, develop the total ItemSelector Vocabulary (CV) for the database.

4 Database TIE Data Extractor. Run the classification extractor which uses the prepared ItemSelector vocabulary to extract the necessary data from the database and outputs the TIE data file to the TIE server.

5 Server Reads TIE Data File. Setup the TIE server to read-in the TIE data file.

6 Configuration of Client. Set up the details of the GUI for the client software by editing the client administrator files.

To facilitate each of these steps, software tools can be built as further detailed hereinbelow. The first step allows the person installing the TIE system to plan the group names of the ItemSelectors and to determine which fields are going to be likely sources of the ItemSelector Vocabulary. The field names will become the ItemSelector Group names which need to be chosen carefully so that they are unique, short, and descriptive of the data they represent.

Most databases accept queries that can extract such information. However, some databases will require an operator to extract it. Once the information is extracted, the resulting list of field names and associated IDs is presented to the installer who edits it choosing those field names and IDs that are likely sources of the ItemSelector vocabulary.

The goal of the first three steps is the creation of the ItemSelectors Vocabulary most appropriate to the database. The fourth step then uses this ItemSelectors Vocabulary to extract the necessary Data Abstract (DA) of the database and produce a Tagged Abstract File (TAF) which the TIE server can read in the fifth step. Finally, the last step uses knowledge of the ItemSelectors Vocabulary to configure the GUI in the client application for the best presentation of the data to the user.

Field Values Extracting: The field names describe the nature of the data they contain. The value of a field associated with a field name is the principal source of the CV. Fields are uniquely identified through field numbers, referred to as field ID numbers. The ones chosen to be used as a source of the VC are used to query the database for all the values of each. One standard and relatively easy way to obtain this dump of field values is to write all the data to a comma delimited text file. A more elegant way, for those databases that support SQL, is to send the appropriate SQL queries.

The value dump is organized in lists. Each field name defines a list of field values. At this point, because our objective is the extraction of the ItemSelectors Vocabulary, we do not need the relationships between the various field values.

The resulting lists are sorted, alphabetically or numerically as appropriate. Duplicates are removed and synonyms are grouped together. Each field, used as a source of CV, gives rise to an ItemSelector Group of values, candidates for the CV. The field name is adjusted to be an informative Group name, both for identification purposes and for display on the GUI. Each ItemSelector Group needs to have defined all its types. The Group types are of two kinds: Boolean kind and Value kind. Choosing a group's Boolean type means choosing it to be one of Disjunctive, Conjunctive or Bijunctive.

The value types of a group are determined by the field values. The following are the most common value types:

| 1 | Text |
| 2 | Decimal numbers |

-continued

| 3 | Year |
| 4 | Month |
| 5 | Time |
| 6 | Elapsed Time or Age |
| 7 | Day-of-week |

Knowing which type of value the group belongs to means the list can be appropriately sorted when displayed in the GUI of the client, and that any derived ItemSelectors can be appropriately chosen and created.

The Field Values Extractor software, presents the user with the list of standard value types and with options of creating derived ItemSelectors from each list of field values extracted.

An example will illustrate this. Suppose one of the field names is Height and that this field's values, sorted, with duplicates removed, consist of all the values from 3.00 through 8.00, in increments of 0.01. Such a list would contain 500 values. Whether we need all those 500 values as individual ItemSelectors or not depends on the context and meaning of these numbers.

If they represent the heights of individuals in decimal feet, then such accuracy is probably not only not useful, but is also awkward and inefficient when searching. For if the searcher knows the height only approximately, a relatively large number of ItemSelector selections would have to be used to represent a range of values.

Therefore it is most efficient and most useful to choose, as our ItemSelectors, ranges of values. A very simple way to do that is to define a range ItemSelector (for example "3 to 4" or "3–4") and list under it all the individual values that the range represents as synonyms.

A more efficient way would simply designate the range meaning and convey that to the Database TIE Data Extractor, which would use the range in determining which range ItemSelector to assign each Item of information it extracts from the database.

In some applications, in particular those that envision both some very detailed searches and some range searches, it may be appropriate to provide both types of ItemSelectors: the detailed ItemSelectors and in addition the range ItemSelectors.

ItemSelector Vocabulary Editing: The Field Values Extractor produces a listing of ItemSelectors by group name, with synonyms for each ItemSelector where appropriate. The list can be output to a text file organized in some simple way, allowing both easy human interpretation and easy computer software parsing.

One way to do that is to use XML type tagging to designate the name, the beginning of each group and its end. Within each group we list each ItemSelector on a separate line and each synonym follows the ItemSelector, but indented with a tab. When the indented synonyms stop, the next ItemSelector begins. Such a file, containing all the ItemSelectors in all the groups represents one of the three files needed to complete the classification task. This file then can be edited in any text editor or work processor. One having more powerful search and replace capabilities (with text pattern matching) will speed up the process considerably. When using a word processor, spellings of the ItemSelectors and group names can also be easily checked.

Two more lists are needed before the classification can be run:

1 The Fields For ItemSelectors list.
2 The Field Names list.

The first is used to specify which fields are used as the source for which ItemSelector Groups. In addition the same list is used to specify fields that are to be combined to create the Item name. For example, in a police database, one field is the date of the incident. In one conversion to a TIE database, the date field was replaced by three disjunctive ItemSelector Groups: the year, the month and the day. In addition, the day-of-week was another ItemSelector Group. All these groups would use this one field to derive their ItemSelectors.

The second is just used to name the fields, which become part of each Item under TIE. These names can be the same as the original database used, or they can be made clearer, more descriptive. In addition that list should designate the field names for any Derived fields.

Database TIE Data Extractor.: This software uses the lists described together with the raw data in the database (often read from a comma-delimited text file) to produce the XML tagged file which defines the following for each Item in the TIE database:

1 The Item name. This identifies each Item and is displayed in a listing. Usually the name is made up of one or more field values.
2 The ItemSelectors and their respective Groups, assigned to each Item.
3 The type of Item (whether textual data or a reference to that data) and the Item contents or a reference (such as a URL) to these contents.

Each of these is created in the form of an XML tag, in a text file. This tagged file is then read into the TIE server, which creates a more optimized, binary file of the data and simultaneously the TIE matrix in RAM, ready for boolean queries from any Client.

13.6 Configuration of Client

The client configuration involves decisions on the precise location of each ItemSelector Group, the title of each group, the pop-out explanation of each title, the Boolean properties of each ItemSelector Group, and their display characteristics.

This configuration can be done using a text configuration file, or using a friendly GUI interface which presents the user with each necessary option. In either case once the configuration file is setup, it is put on the server, ready for you to use.

Typically, when you use the system, you use a browser to access a special URL of an html page which downloads to your computer's RAM a Java applet that becomes the Client, running within the Browser, which communicates with the server.

The Java applet, using the configuration file to build the GUI within the Browser, begins communications with the server.

In some implementations, in which browser has access to writing of files to the local disk, the Jave Client downloads the configuration files and its own code to the Client's local computer, so that in future connections this is no longer necessary except when the versions on the server are more recent than the local ones.

In those implementations where writing to the local disk is enabled, the Java client also saves locally certain user settings and preferences.

Appendix I

Relative Speed Estimates: Double Matrix vs. Single Matrix implementations

Let N and n be the total number of Items and ItemSelectors respectively. Let $C_{Av}$ be the average number of ItemSelectors per Item. The average number of Items per ItemSelector is then given by $I_{AV}=C_{AV}N/n$.

When a Boolean of two ItemSelector vectors is evaluated, the number of components that must be compared is of the order of $I_{AV}$, for conjunctive Booleans, and some integer multiples (such as 2×) thereof, for disjunctive Booleans. On average we can expect two compares for each Item component. Therefore the number of compares is $2I_{AV}$ for conjunctive Booleans and $4I_{AV}$ for disjunctive Booleans.

Single Matrix Method: When IRV is being calculated using the single Matrix, the components of the CRV are used to search the components of each ItemSelector Vector to determine which ItemSelectors contain at least one of them. Once a match is found, the corresponding ItemSelector is added to the IRV Component list. This procedure is quite different from the what has been defined as the evaluation of ItemSelector Booleans.

Considering the initial ItemSelector selection (single ItemSelector Boolean) the average number of component Items returned in the CRV is $I_{AV}$. Each one of these needs to be checked against each component of each ItemSelector Vector until either the first match is found or all components are checked. Because each set of Item Ids is ordered, the number of compares is of order $I_{AV}$, rather than $I_{AV}^2$. On average we can expect that some fraction, like ½ of the components will need to be compared before an Item is disposed of. Therefore on this, first ItemSelector selection, the IRV will need (½) $I_{AV}$n compare steps to complete.

Two Matrix Method: If instead, two Matrices are used, the calculation of IRV is analogous to the calculation of CRV except that it is a disjunctive Boolean of the Item vectors, and so requires some factor, assume 2, of $2C_{AV}$ compare steps when the first Item Vector is compared to the second one. But there are on average $I_{AV}$ Item Vectors, after the first ItemSelector is selected, to compare one with the next. So the average number of compares is $4C_{AV}I_{AV}$.

Ratio of Times: Therefore the ratio of times for calculating IRV in the one Matrix versus the two Matrix methods is of the order of $N/I_{AV}=n/(8C_{AV})$ ⅛ the inverse of the universal narrowing factor. So the ratio is usually a rather large number and therefore using the two Matrix Arrays method is advisable if the response time would otherwise be too long.

Other Enhancements

Using Alpha ItemSelectors: We describe here another application of the TIE technology to the access of text items in any list. The most likely applications involve keyboard access to long lists, but other possibilities abound. It can also be used to access Items using so called Alpha-ItemSelectors, when the number of ItemSelectors is too large to display. Both ways of using Alpha ItemSelectors can use either the Position Dependent or Position Independent Alpha-ItemSelectors.

Alpha ItemSelector Access to Lists: Consider selection of a word or phrase from a very long list of words or phrases, such as might be needed in a list of tens of thousands of ItemSelectors or even the whole of the unabridged US dictionary of words, which could be as large as a million words. Suppose the user needs to find and select a word or phrase.

Typing the word or phrase is the most efficient way to do this. Quite often the software application needs to select the matched word or provide some feedback to the user. This requires long list searches, but more than that, if incremental feedback is desirable, say feedback after each character is typed, then repeated extensive searches are needed. Additionally, if fault tolerant typing input is needed, approximate matches are needed. Usually approximate matches take more processor time than exact ones, because more compares need to be performed. All these are quite processor intensive, and could result in slower reponses, and are complicated to implement.

Using the TIE Matrix to do the searching is considerably more efficient as it achieves both the objective of speedy response and fault tolerant text recognition. It can therefore be used in many applications in place of customary search methods. To implement the classification technology, each word or phrase is classified using the 26 letters of the alphabet as individual ItemSelectors. The Matrix for the whole list is quite manageable in size and accessibility.

For example if the vocabulary is 100,000 words or phrases and each word or phrase on average contains 10 characters, the RAM required to keep the whole Matrix in memory, using the Bitmap is about 3.2 MB and using ItemSelector vector, double matrix implementation only 8 MB. And even for one million words, the Bitmap takes only 32 MB RAM, whereas the vector double matrix only 80 MB. Each letter that is typed is treated like a selected conjunctive ItemSelector, where the displayed list of matching words is progressively reduced as more characters are added by typing. A list of the first so many matches is displayed, the list updating as each new character is typed. Usually, well before the completion of the typing the list of displayed matches is sufficiently short for the user to be able to point and click on the selected word.

Suppose, however, that even after the last character is typed the list is still too long to see in full. This happens when the word is quite short. The user can then indicate actual completion by typing a special key, such as Enter, which triggers an automatic addition of all the letters of the alphabet not in the word (each preceded by the Boolean NOT operator) and combined Conjunctively. This final step almost always narrows the choice down very considerably, to a short remainder.

Another practical arrangement is to assume that the first character typed must match the position precisely. A one character match usually takes very little time. Subsequent characters are then searched through the list using the TIE matrix. The advantage of such a system is that the selection of words through typing is therefore automatically fault-tolerant of the most common typographical errors.

Because the Matrix is not dependent on the order of ItemSelector assignment, the selection of words through typing is not dependent on the order in which the characters are typed—being tolerant of one of the common typographical errors—transposition typos. Further, because assigning the same ItemSelector more than once has no effect, double letters are ignored, being tolerant of the other common typing error. Finally, watching the selection and narrowing process has many advantages. For example, it enables the user to quickly see the effects of a typo and correct it before completing the selection.

UMACI Alpha ItemSelector Access to Items: Another alternative Alpha-ItemSelector implementation, appropriate to TIE applications which use long lists of ItemSelectors in ItemSelector Groups, uses the individual letters and numbers as ItemSelectors but associates them with those Items (rather than with the individual ItemSelectors). This application combines the Matrix elements for the Alpha ItemSelectors with those for all the other non-Alpha ItemSelectors and so is called the Unified Matrix Alpha ItemSelector Implementation or UMACI.

This approach to Alpha ItemSelectors can be used to advantage even when the number of ItemSelectors in a single Group is not necessarily too large to display. Using it for access to Items through each larger ItemSelector Group reduces the total number of ItemSelectors presented to the user, often making access much easier to the user.

There is however a performance price to pay for using the UMACI classification system as compared to normal Item-Selectors. When the number of ItemSelectors in a group is large, it is usually because ItemSelectors in that group are assigned of the order of one per Item. For example, in a customer database, the customer last name, when used as an ItemSelector, comprises a list about as long as the list of all Items. Therefore when we replace such an ItemSelector by listing individual letters, each as an Alpha ItemSelector, we are increasing substantially the average number of ItemSelectors per Item. The response times being proportional to this average ItemSelectors per Item, are thereby increased substantially. In some applications this may be important and so may override the benefit of a shorter ItemSelectors list.

The fault tolerant nature of the Alpha ItemSelector access to data is a great advantage in many applications. For example, in a Police database converted to TIE, there are many ItemSelector groups. Two of these are the vehicle license plate number and the driver's license number. In a database which uses these two fields in almost all its records, the number of ItemSelectors each represents is of the order of the number of records. Therefore in large databases displaying all of them would not be desirable, yet access to the data through these field values is desirable.

The use of UMACI not only solves this problem but incidentally enables both a fault-tolerant access and access through partially known data. This is particularly useful when, for example a database of vehicle registration numbers, body styles, colors, models etc. is to be searched for a partially known vehicle license plate. The narrowing introduced by successive Alpha selections is very substantial and when the other of the known vehicle features are added, the narrowing can be quite dramatic, identifying just a handful of possible vehicles.

A simple estimate will illustrate this. If the number of characters in a license plate is 7, the total number of ItemSelectors is 36 (26 letters and 10 digits) then the average narrowing factor after each character selection is 7/36. If only 5 of these are known, the reduction factor after selecting just 3 is on average $(7./36)^3=0.0074$. In a database of 1 million Items this, on average means a listing of just 7400 possible matches. Adding to that only the color (1/25) and make (1/125) reduces the average number to just 2! What is even more important, because the process of narrowing is so interactive, adjustments in the selected ItemSelectors can easily and very quickly be made during the process of access.

Efficiency Enhancements: These show how with relatively little additional RAM it is possible to speed up the response time to the first query. It has been shown that the longest response time occurs on the first ItemSelector selection. The ItemSelector selected requires the server to calculate the CRV (which is very fast) and the IRV (which is orders of magnitude slower). The response time for the CRV is proportional to $I_{AV}=NC_{AV}/n$. The response time for the IRV is proportional to $C_{AV}I_{AV}=NC_{AV}@/n$. Therefore the latter increases rapidly with the average number of ItemSelectors per Item.

When the number of Items is very large and the Number of ItemSelectors per item also large, this response time can be annoyingly long. For example, in a test database of about 1 million Items randomly assigned an average of about 150 ItemSelectors per Item out of a total of 8,000 ItemSelectors, the IRV response time to the first ItemSelector selected was of the order of 2 seconds on a 1 GHz PC. The reason was that the distribution of ItemSelectors amongst the Items was made relatively uniform and this produced no ItemSelector narrowing on most first ItemSelector selections. The average ItemSelector narrowing factor was much closer to 1 than the Item narrowing Factor. In this case it is possible to make the response time in the tens of milliseconds range by caching the IRVs of all single ItemSelector choices.

Caching First Clicks Algorithm: This may reduce required memory. It capitalizes on the fact that the great majority of the first ItemSelector selections produce very little ItemSelector narrowing. The IRV for each ItemSelector is a list of ItemSelector IDs, and the cache needs to hold all those lists. Storing them without any attempt at compression, would require about $4n^2$ bytes of RAM. So for example caching for 8,000 ItemSelectors requires 256 MB of RAM. Because for most of the ItemSelectors the list of available ItemSelectors will be almost all of them, it is much more economical to save only the unavailable ItemSelectors, when their number is less than 50% of the total and to otherwise store the available ItemSelectors. The first element of each stored array can be used to indicate which storage is being used. The response of the server to the first query can also be of two types depending which requires less data to transmit, thus minimizing the amount of data being transmitted.

Specific embodiments of the invention have been described herein. All practical combinations of elements of the specific embodiments, the alternatives, the enhancements, and equivalents to any or all of these described elements, are contemplated as additional embodiments of the invention. Because the embodiments are too numerous to list explicitly, the scope of the invention is to be construed to cover any combination of elements falling within the range of equivalency to the elements recited in an appended claim.

We claim:

1. A method of creating a Boolean expression for identifying data Items in a database, comprising:
 a) initiating controlled-vocabulary formation of a query by presenting to a user a plurality of ItemSelectors each having a Boolean property associated therewith;
 b) accepting a plurality of ItemSelectors selected by the user from among the presented plurality of ItemSelectors, the accepted plurality of ItemSelectors including:
  i) at least a first ItemSelector having a first Boolean property associated therewith, and
  ii) at least a second ItemSelector having a different second Boolean property associated therewith; and
 c) deriving from the accepted ItemSelectors a Boolean expression encompassing the first ItemSelector and the second ItemSelector and reflecting the Boolean property of the first ItemSelector and the Boolean property of the second ItemSelector;
wherein each ItemSelector presented for selection by the user has previously been determined to describe at least one data Item in the database, when combined according to the corresponding Boolean properties with other ItemSelectors presently selected by the user.

2. The method of claim 1, wherein step (a) comprises presenting to the user a plurality of groups of ItemSelectors including:
 i) a first group consisting of ItemSelectors associated with the first Boolean property, and
 ii) a second group consisting of ItemSelectors associated with the second Boolean property.

3. The method of claim 2, wherein the first Boolean property is disjunctive, and wherein step (b)(i) comprises accepting a plurality of ItemSelectors belonging to the first group of ItemSelectors.

4. The method of claim 3, wherein step (c) comprises:
 i) disjunctively joining the plurality of chosen ItemSelectors that belong to the first group within a parenthetical expression, and
 ii) conjunctively joining the parenthetical expression to a Boolean expression containing the second ItemSelector.

5. The method of claim 4, wherein step (b)(ii) comprises accepting a plurality of ItemSelectors belonging to the second group of ItemSelectors; and further comprising an act (c)(iii) of joining the accepted plurality of ItemSelectors that belong to the second group according to the second Boolean property to form the Boolean expression containing the second ItemSelector.

6. The method of claim 1, wherein the first Boolean property is disjunctive or exclusive-disjunctive; and step (b)(i) comprises accepting a plurality of ItemSelectors that are associated with the first Boolean property.

7. The method of claim 6, wherein step (c) comprises:
 i) disjunctively joining the plurality of accepted ItemSelectors that are associated with the first Boolean property within a parenthetical expression, and
 ii) conjunctively joining the parenthetical expression to a Boolean expression containing the second ItemSelector.

8. The method of claim 1, wherein the ItemSelectors are each of a type selected from a group consisting of words, phrases, position-independent alphanumeric characters, position-dependent alphanumeric characters, numbers of alphanumeric characters in text of a data Item, value ranges, alphabetical ranges, graphical symbols, and pictures.

9. The method of claim 1, further comprising:
 d) creating a set of previously chosen ItemSelectors consisting of all ItemSelectors previously chosen by the user that have not been withdrawn;
 e) adding an ItemSelector chosen by the user to the set of previously chosen ItemSelectors to form a set of presently chosen ItemSelectors;
 f) presenting, responsive to the set of presently chosen ItemSelectors, a modified collection of ItemSelectors to the user for further selection.

10. A method of creating a Boolean expression for identifying data Items in a database, comprising:
 a) initiating controlled-vocabulary formation of a query by presenting to a user a plurality of ItemSelectors each having a Boolean property associated therewith;
 b) accepting a plurality of ItemSelectors selected by the user from among the presented plurality of ItemSelectors, the accepted plurality of ItemSelectors including:
  i) at least a first ItemSelector having a first Boolean property associated therewith, and
  ii) at least a second ItemSelector having a different second Boolean property associated therewith; and
 c) deriving from the accepted ItemSelectors a Boolean expression encompassing the first ItemSelector and the second ItemSelector and reflecting the Boolean property of the first ItemSelector and the Boolean property of the second ItemSelector;
 d) creating a set of previously chosen ItemSelectors consisting of all ItemSelectors previously chosen by the user that have not been withdrawn;

e) adding an ItemSelector chosen by the user to the set of previously chosen ItemSelectors to form a set of presently chosen ItemSelectors;

f) presenting, responsive to the set of presently chosen ItemSelectors, a modified collection of ItemSelectors to the user for further selection; and g) identifying as relevant ItemSelectors that have a property whereby addition of such ItemSelector to the set of presently chosen ItemSelectors creates a set of ItemSelectors that describe at least one data Item within the database.

11. The method of claim 10, wherein step (f) comprises restricting the modified collection of ItemSelectors to ItemSelectors that are identified relevant according to step (g).

12. The method of claim 11, wherein step (f) further comprises making available to the user all ItemSelectors preassociated with the database that are identified as relevant according to step (g).

13. The method of claim 1, wherein each ItemSelector presented to the user is a member of a predefined vocabulary of ItemSelectors developed for the particular database.

14. The method of claim 1, wherein step (a) comprises graphically displaying to the user a representation of each presented ItemSelector.

15. The method of claim 14, wherein some graphically displayed representations differ from the presented ItemSelector represented.

16. A controlled vocabulary method of interactively creating a Boolean expression for identifying data Items in a database, the method comprising:

a) assigning a multiplicity of ItemSelectors among a plurality of ItemSelector groups including a first group and a second group;

b) implicitly associating each ItemSelector assigned to the first group with a Boolean property associated with the first group, and implicitly associating each ItemSelector assigned to the second group with a Boolean property associated with the second group;

c) initiating a query formation by presenting to a user ItemSelectors assigned to the first group and ItemSelectors assigned to the second group;

d) accepting a plurality of ItemSelectors chosen by the user including at least one ItemSelector assigned to the first group and at least one ItemSelector assigned to the second group;

e) forming a first parenthetical Boolean expression including one or more chosen ItemSelectors assigned to the first group that are joined to each other according to the Boolean property of the first group;

f) forming a second parenthetical Boolean expression including one or more chosen ItemSelectors assigned to the second group that are joined to each other according to the Boolean property of the second group; and g) joining the first and second parenthetical Boolean expressions as a Boolean conjunction to create the Boolean expression identifying one or more data Items in the database;

wherein each ItemSelector presented to the user for selection has been previously associated with at least one data Item in the database.

17. The method of claim 16, wherein the Boolean property associated with the first group is different from the Boolean property associated with the second group.

18. The method of claim 16, wherein the Boolean property associated with the first group is disjunctive or exclusive-disjunctive.

19. The method of claim 16, wherein the Boolean property associated with each group is a member of a set of Boolean properties consisting of conjunctive, disjunctive, exclusive-disjunctive, and negative Boolean properties.

20. The method of claim 16, wherein step (c) comprises presenting to a user at least a third ItemSelector that is not assigned to the first group or to the second group, step (d) comprises accepting the third ItemSelector after it is chosen by the user, and step (g) comprises conjoining a Boolean expression containing the third ItemSelector to create the Boolean expression identifying one or more data Items in the database.

21. The method of claim 16, further comprising (h) creating a vocabulary of ItemSelectors sufficient to describe each data Item in the database.

22. A method of interactively creating a Boolean expression for identifying data Items in a database, the method comprising:

a) assigning a multiplicity of ItemSelectors among a plurality of ItemSelector groups including a first group and a second group;

b) implicitly associating each ItemSelector assigned to the first group with a Boolean property associated with the first group, and implicitly associating each ItemSelector assigned to the second group with a Boolean property associated with the second group;

c) presenting to a user ItemSelectors assigned to the first group and ItemSelectors assigned to the second group;

d) accepting from the user only a plurality of ItemSelectors chosen by the user from among ItemSelectors presented to the user, including at least one ItemSelector assigned to the first group and at least one ItemSelector assigned to the second group;

e) forming a first parenthetical Boolean expression including one or more chosen ItemSelectors assigned to the first group that are joined to each other according to the Boolean property of the first group;

f) forming a second parenthetical Boolean expression including one or more chosen ItemSelectors assigned to the second group that are joined to each other according to the Boolean property of the second group;

g) joining the first and second parenthetical Boolean expressions as a Boolean conjunction to create the Boolean expression identifying one or more data Items in the database; and h) determining relevant ItemSelectors as those ItemSelectors in a predefined vocabulary of ItemSelectors which, when further combined with an existing set of ItemSelectors previously chosen by the user, will create a set of Item Selectors that describe at least one data Item in the database.

23. The method of claim 22, wherein step (c) comprises restricting ItemSelectors presented to the user to those determined relevant according to step (h).

24. The method of claim 23, wherein step (c) comprises making available to the user all ItemSelectors of the predefined vocabulary that are relevant according to step (h).

25. The method of claim 16, further comprising (h) determining presently selected data Items as those data Items identified by the Boolean expression that is based upon an existing set of all ItemSelectors previously chosen and not withdrawn by the user.

26. The method of claim 25, further comprising (i) presenting data Items determined in step (h) to the user as selectable data Items.

27. The method of claim 25, further comprising (i) determining relevant ItemSelectors in each simple group, from which no ItemSelector with a disjunctive Boolean property has been chosen, as those that are related to at least one selected Item, and (j) determining relevant ItemSelectors in each complex group, from which at least one disjunctive ItemSelector has been chosen, as those that are related to at least one Item in a set of Items that is described by the existing set of ItemSelectors reduced by removing therefrom all ItemSelectors in the complex group.

28. The method of claim 27, wherein step (c) further comprises restricting ItemSelectors presented to be chosen by the user to those determined relevant in step (i).

29. The method of claim 28, wherein step (c) further comprises presenting all ItemSelectors that are members of a predefined vocabulary of ItemSelectors and are relevant according to step (i).

30. A computer program for implementing interactive procedures to aid a user searching for predefined data Items, the data Items existing in a database and being preassociated with one or more of a predefined vocabulary of ItemSelectors, the program configured to direct a computer system to perform operations comprising:

a) initiating controlled-vocabulary formation of a query by presenting graphically for selection by a user a collection of ItemSelectors from the vocabulary that each define at least one data Item in the database when combined with a set of ItemSelectors previously chosen by the user;

b) accepting an ItemSelector selected by the user from among the presented collection of ItemSelectors;

c) incorporating the ItemSelector selected in step (b) with the previously chosen set of ItemSelectors to establish a presently selected set of ItemSelectors;

d) forming a Boolean expression involving each ItemSelector in the presently selected set to describe data Items;

e) determining data Items of the database described by the Boolean expression of step (d); and f) presenting, responsive to step (b), data Items determined in step (e) for selection by the user.

31. The program of claim 30, further configured to direct a computer system to perform operations comprising (g) creating an ItemSelector look-up table having a name and a unique identifier for each ItemSelector in the database.

32. The program of claim 30, further configured to direct a computer system to perform operations comprising (g) creating an Item lookup table having a name, a location specification, and a unique identifier for each Item in the database.

33. The program of claim 30, further configured to direct a computer system to perform operations comprising (g) storing associations between the ItemSelectors and the Items preassociated therewith in an array of ItemSelector Vectors that are configured to contain Item identifiers as components.

34. The program of claim 33, wherein the components are stored in each ItemSelector Vector as an ordered set.

35. The program of claim 33, wherein the array index of each ItemSelector Vector within the array is the identifier of a corresponding ItemSelector.

36. The program of claim 30, further configured to direct a computer system to perform operations comprising (g) storing associations between the ItemSelectors and the Items preassociated therewith in an array of ItemSelector Vectors that are configured to contain ItemSelector identifiers as components.

37. The program of claim 36, further configured to direct a computer system to perform operations comprising (h) storing associations between the ItemSelectors and the Items preassociated therewith in an array of ItemSelector Vectors that are configured to contain Item identifiers as components.

38. The program of claim 36, wherein the components are stored in each ItemSelector Vector as an ordered set.

39. The program of claim 36, wherein the array index of each ItemSelector Vector within the array is the identifier of a corresponding Item.

40. The program of claim 30, further configured to direct a computer system to perform operations comprising (g) storing associations between the ItemSelectors and the Items preassociated therewith in a binary matrix wherein non-zero elements identify the associations by their position within the binary matrix.

41. A method of identifying Data Items ("DIs") in a database on the basis of a Boolean combination of associated ItemSelectors ("ISs"), comprising:

a) establishing a plurality of ItemSelector ("IS") Groups that each impose Group-specific properties on all IS members of such Group, the properties including:
      i) an IS-DI association property that defines a necessary relationship between an IS and content of an associated DI,
      ii) an intra-Group Boolean property, and
      iii) a pre-defined Group Title that limits a scope of semantic meaning of IS Group members, the plurality of Groups including different Groups having corresponding different intra-Group Boolean properties;

b) presenting to a user a plurality of ISs belonging to one or more of said plurality of IS Groups;

c) accepting a plurality of ISs chosen by the user from among the presented plurality of ISs; and d) identifying one or more DIs associated with the chosen ISs according to the corresponding Group-specific IS-DI property, in a combination that also satisfies the corresponding Group-specific intra-Group Boolean property for ISs from a common Group, and an inter-Group Boolean property.

42. The method of claim 41, wherein the pre-defined Group Title of each IS Group limits the semantic meaning of all ISs in such IS Group irrespective of a literal meaning of any IS member of such IS Group.

43. The method of claim 41, wherein the established plurality of IS Groups further includes different IS Groups having corresponding different IS-DI association properties.

44. The method of claim 43, wherein the ISs accepted in step (c) include a plurality of ISs belonging to one of the plurality of IS Groups, and at least one IS belonging to a different one of the plurality of IS Groups, and wherein the one or more DIs identified in step (d) are associated with such portion of all IS Groups from which an IS has been chosen as required to satisfy the inter-Group Boolean property, and are associated with each such IS Group by virtue of an association between the one or more DIs and so many of the ISs chosen from such IS Group as required to satisfy the intra-Group Boolean property of such IS Group.

45. A method of interactively creating a Boolean expression for identifying DataItems ("DIs") in a database, the method comprising:

a) assigning each of a multiplicity of ItemSelectors to one of a plurality of ItemSelector ("IS") Groups, each IS member of each such IS Group implicitly including:
      i) an intra-Group Boolean property corresponding to the IS Group, ii) a Boolean IS-DI association property corresponding to the IS Group, and iii) a contextual semantic meaning that is limited, irrespective of a literal semantic meaning of any IS member of such IS Group, in accordance with a pre-defined Title of the IS Group;

b) presenting, to a user, a plurality of ISs assigned to a plurality of such IS Groups;

c) accepting a plurality of ISs chosen by the user from the presented ISs as a chosen combination of ISs;

d) effectively generating a Boolean DI selection equation that reflects
   i) the IS-DI association property corresponding to each of the chosen ISs,
   ii) the intra-Group Boolean property corresponding to each of the chosen ISs belonging to an IS Group from which more than one IS has been chosen, and
   iii) an inter-Group Boolean property corresponding to all IS Groups from which ISs have been chosen; and e) identifying, as selected, one or more DIs that satisfy the Boolean DI selection equation effectively generated in step (d).

46. The method of claim 45, wherein the plurality of IS Groups includes different IS Groups having corresponding different intra-Group Boolean properties.

47. The method of claim 46, wherein the plurality of IS Groups includes different IS Groups having corresponding different IS-DI association properties.

48. The method of claim 45, wherein the plurality of IS Groups includes different IS Groups having corresponding different IS-DI association properties.

* * * * *